US012659121B2

(12) United States Patent　　　(10) Patent No.:　US 12,659,121 B2
Matsumura et al.　　　　　　　　(45) Date of Patent:　Jun. 16, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Weiqi Sun, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 307 days.

(21) Appl. No.: 18/556,981

(22) PCT Filed: May 10, 2021

(86) PCT No.: PCT/JP2021/017745
§ 371 (c)(1),
(2) Date: Oct. 24, 2023

(87) PCT Pub. No.: WO2022/239073
PCT Pub. Date: Nov. 17, 2022

(65) Prior Publication Data
US 2024/0235783 A1　　Jul. 11, 2024

(51) Int. Cl.
H04L 5/00　　(2006.01)
(52) U.S. Cl.
CPC .......... H04L 5/0053 (2013.01); H04L 5/0091 (2013.01)
(58) Field of Classification Search
CPC ............................ H04L 5/0053; H04L 5/0091
See application file for complete search history.

(56) References Cited

U.S. PATENT DOCUMENTS

2020/0314881 A1* 10/2020 Bagheri ................ H04W 72/23
2022/0312237 A1* 9/2022 Zhang ................... H04L 5/0048

OTHER PUBLICATIONS

3GPP TSG-RAN WG1 Meeting #104b-e; R1-2103089 "On Multi-TRP Reliability Enhancement" Apple Inc.; e-Meeting; Apr. 12-20, 2021 (17 pages).
3GPP TSG RAN WG1 #104-e; R1-2101598 "Discussion on MTRP for reliability" Ntt Docomo, Inc.; e-Meeting; Jan. 25-Feb. 5, 2021 (18 pages).
Office Action issued in Japanese Application No. 2023-520592; Dated Mar. 10, 2025 (4 pages).
Office Action issued in Japanese Patent Application No. 2023-520592, mailed Jul. 22, 2025 (4 pages).
(Continued)

*Primary Examiner* — Brenda H Pham
(74) *Attorney, Agent, or Firm* — Osha Bergman Watanabe & Burton LLP

(57)　　　　　ABSTRACT

A terminal according to one aspect of the present disclosure includes a receiving section that receives information related to at least two of a control resource set (CORESET) pool index associated with a CORESET, two transmission configuration indication (TCI) states associated with the CORESET, and two search space sets linked to each other, and a control section that controls, on the basis of the information, reception of a physical downlink control channel. According to one aspect of the present disclosure, it is possible to appropriately perform reception on the basis of PDCCH/CORESET configuration.

4 Claims, 31 Drawing Sheets

CORESETPoolIndex=0　　　CORESETPoolIndex=1

(56) References Cited

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).

3GPP TSG-RAN WG1 Meeting #104b-e; R1-2102960 "Enhancements on Multi-TRP for PDCCH, PUCCH and PUSCH" Xiaomi; e-Meeting, Apr. 12-20, 2021 (22 pages).

International Search Report issued in International Application No. PCT/JP2021/017745, mailed Dec. 14, 2021 (3 pages).

Written Opinion issued in International Application No. PCT/JP2021/017745; Dated Dec. 14, 2021 (3 pages).

* cited by examiner $N_{\text{LR-RLM}}$ and $N_{\text{RLM}}$ as a function of maximum number $L_{\text{max}}$ of SS/PBCH blocks per half frame

| $L_{\text{max}}$ | $N_{\text{LR-RLM}}$ | $N_{\text{RLM}}$ |
|---|---|---|
| 4 | 2 | 2 |
| 8 | 6 | 4 |
| 64 | 8 | 8 |

FIG. 1

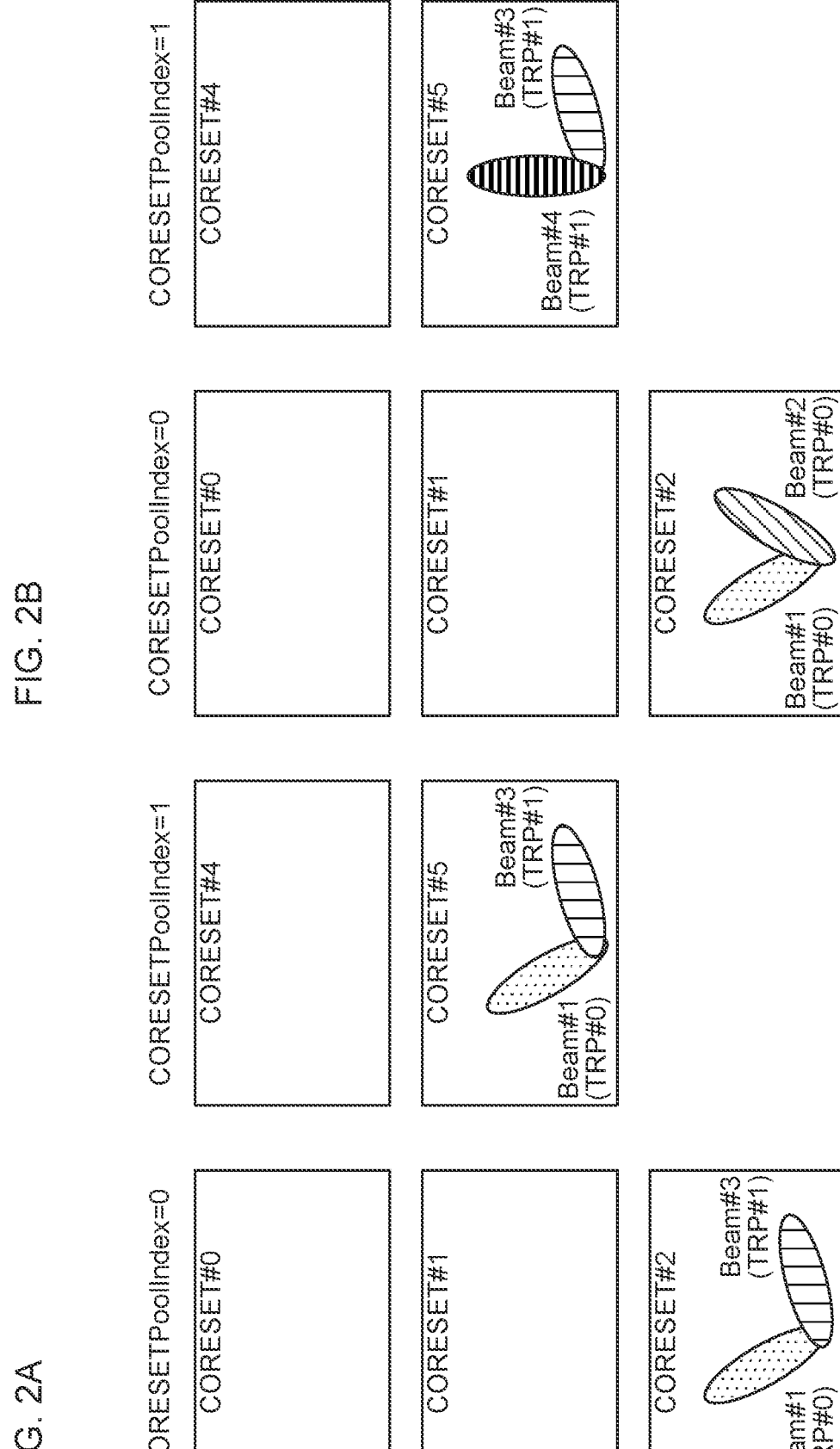

FIG. 3B

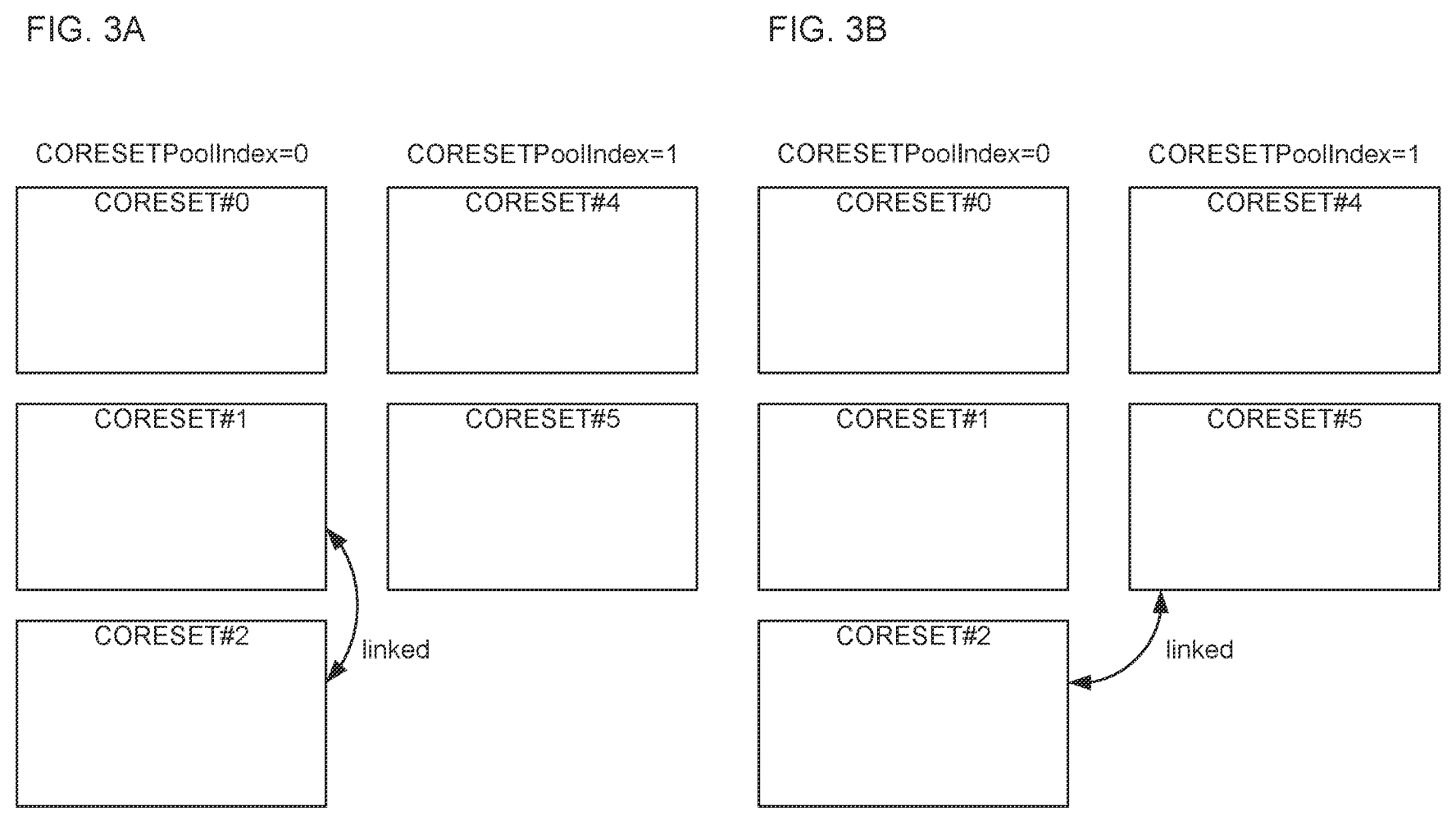

CORESETPoolIndex=1

CORESET#4

CORESET#5

CORESETPoolIndex=0

CORESET#0

CORESET#1

CORESET#2 linked

FIG. 3A

CORESETPoolIndex=1

CORESET#4

CORESET#5

CORESETPoolIndex=0

CORESET#0

CORESET#1

CORESET#2 linked (S10)
PRIORITIZE CORESET ASSOCIATED
WITH SHORTER MONITORING
PERIODICITY TO DETERMINE RS (S20)
PRIORITIZE CORESET HAVING TWO
TCI STATES TO DETERMINE RS (S30)
PRIORITIZE CORESET HAVING
HIGHER CORESET INDEX TO
DETERMINE RS CORESET#1        CSS set index = 0,
                cell index = 0

CORESET#2        USS set index = 1,
                cell index = 0

TIME

TCI state #1        TCI state #2

CORESET#1    CSS set index = 0,
cell index = 0

CORESET#2    USS set index = 1,
cell index = 0

TIME

TCI state #1    TCI state #2

TCI state #3

CORESET#1                                   CSS set index = 0,
                                            cell index = 0

CORESET#2                                   USS set index = 3,
                                            cell index = 0

CORESET#3                                   USS set index = 4,
                                            cell index = 0

CORESET#4                                   USS set index = 5,
                                            cell index = 0

TIME

TCI state #1          TCI state #2

TCI state #3

CORESET#1                        CSS set index = 0,
cell index = 0

CORESET#2                        USS set index = 1,
cell index = 0

CORESET#3                        USS set index = 2,
cell index = 0

CORESET#4                        USS set index = 3,
cell index = 0

TIME

TCI state #1          TCI state #2

TCI state #3

CORESET#1

USS set index = 1,
cell index = 0
(no association)

CORESET#2

USS set index = 3,
cell index = 0 association

CORESET#3

USS set index = 4,
cell index = 0

CORESET#4

USS set index = 5,
cell index = 0

TIME

TCI state #1          TCI state #2

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems, a terminal that receives a physical downlink control channel (PDCCH) on the basis of PDCCH and control resource set (CORESET) configuration is under study. For the future radio communication systems, cases of one or two transmission/reception points (TRPs), one or two transmission configuration indication (TCI) states, and PDCCH repetition are further under study. How a UE performs reception for at least one of these cases on the basis of PDCCH/CORESET configuration is indefinite. Unless the reception is performed appropriately, communication quality reduction, communication throughput reduction, and the like may occur.

Thus, an object of the present disclosure is to provide a terminal, a radio communication method, and a base station that appropriately perform reception on the basis of PDCCH/CORESET configuration.

Solution to Problem

A terminal according to one aspect of the present disclosure includes a receiving section that receives information related to at least two of a control resource set (CORESET) pool index associated with a CORESET, two transmission configuration indication (TCI) states associated with the CORESET, and two search space sets linked to each other, and a control section that controls, on the basis of the information, reception of a physical downlink control channel.

Advantageous Effects of Invention

According to one aspect of the present disclosure, it is possible to appropriately perform reception on the basis of PDCCH/CORESET configuration.

BRIEF DESCRIPTION OF DRAWINGS

FIG. 1 is a diagram to show an example of the number of RLM-RSs.

FIGS. 2A and 2B are each a diagram to show an example of aspect 1-1.

FIGS. 3A and 3B are each a diagram to show an example of aspect 1-2.

Figures 4A, 4B:
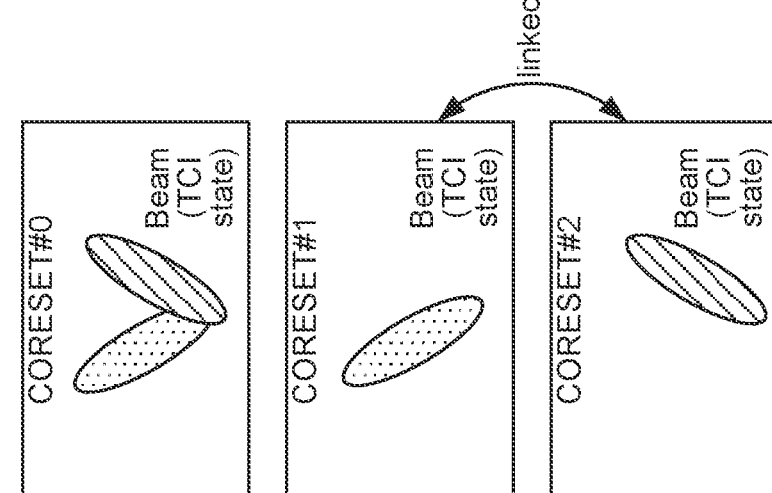
FIGS. 4A and 4B are each a diagram to show an example of aspect 1-3.

DESCRIPTION OF EMBODIMENTS (TCI, Spatial Relation, QCL)

For NR, control of reception processing (for example, at least one of reception, demapping, demodulation, and decoding) and transmission processing (for example, at least one of transmission, mapping, precoding, modulation, and coding) in a UE regarding at least one of a signal and a channel (which is expressed as a signal/channel) based on a transmission configuration indication state (TCI state) is under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter(s)) are described below:

QCL type A (QCL-A): Doppler shift, Doppler spread, average delay, and delay spread QCL type B (QCL-B): Doppler shift and Doppler spread QCL type C (QCL-C): Doppler shift and average delay QCL type D (QCL-D): Spatial reception parameter A case that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (for example, another RS). The TCI state may be configured (indicated) by higher layer signaling or physical layer signaling, or a combination of these.

Note that a channel/signal being a target of application of a TCI state may be referred to as a target channel/reference signal (RS) or simply as a target, and another signal described above may be referred to as a reference signal (reference RS) and a source RS or simply as a reference.

A channel for which the TCI state or spatial relation is configured (specified) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), a reference signal for QCL detection (also referred to as a QRS), a reference signal for demodulation (Demodulation Reference Signal (DMRS)), and the like.

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An RS of QCL type X in a TCI state may mean an RS in a relationship of QCL type X with (a DMRS of) a certain channel/signal, and this RS may be referred to as a QCL source of QCL type X in the TCI state.

(Contention Between Plurality of Channels/Signals)

In Rel-15/16 NR specifications thus far, the UE can receive, detect, or monitor only the same QCL type D channel/signal at the same time, but fails to receive, detect, or monitor a plurality of different QCL type D channels/signals at the same time. Thus, in a case where contention between a plurality of channels/signals occurs (in other words, the plurality of channels/signals are transmitted/received at an overlapped time), such constraints as those mentioned below (which may be referred to as a priority rule, a QCL application rule, or the like) are defined in the Rel-15/16 NR specifications in order to assure that the plurality of channels/signals correspond to the same QCL type D or in order to avoid such cases.

Note that in the present disclosure, contention between a plurality of channels/signals may mean a case that reception (or transmission) of a plurality of different QCL type D channels/signals in the same time resource (period) is scheduled (or configured) (QCL type D contention).

In the present disclosure, a case that QCL type D (reference RS) of a certain channel/signal and QCL type D (reference RS) of another channel/signal are different from each other may mean that a beam used for communication of the certain channel/signal and a beam used for communication of such another channel/signal are different from each other. In the present disclosure, a case that QCL type D (reference RS) of a certain channel/signal and QCL type D (reference RS) of another channel/signal are different from each other may be represented as a case that QCL types D of the certain channel/signal and such another channel/signal are different from each other, a case that QCL type D characteristics of these channels/signals are different from each other, a case that "QCL types D" are different from each other, or the like.

<PDCCH vs. PDCCH>

In a case where single cell operation is configured for the UE or where operation for carrier aggregation in the same frequency band is configured for the UE, and where in a plurality of CORESETs having the same or different QCL type D characteristics in an active DL BWP of one or more cells, PDCCH candidates are monitored in an overlapped monitoring occasion, PDCCHs in only a certain CORESET and a CORESET having the same QCL type D characteristics as those of the CORESET, out of the plurality of CORESETs, are monitored.

This "certain CORESET" corresponds to a common search space (CSS) set with the lowest index in a cell with the lowest index including CSS sets, if any, and, if not, corresponds to a UE-specific search space (USS) set with the lowest index in a cell with the lowest index. The lowest USS set index is determined across all USS sets having at least one PDCCH candidate in the overlapped PDCCH monitoring occasion.

In short, when monitoring PDCCH candidates in an overlapped monitoring occasion, the UE determines a monitoring target CORESET in accordance with a priority rule in which a CSS set is preferentially monitored over a USS set and in which, between the same kind (type) of (CSS or USS) SS sets, an SS set with a lower index (that is, one with a lower cell index, and moreover, one with a lower SS set index in a case of the same cell index) is preferentially monitored.

Note that the SS set index may correspond to a value configured by an RRC parameter "SearchSpaceId" for identifying a search space. Note that in the present disclosure, a CSS set index may mean an SS set index for an SS set with a search space type (RRC parameter "searchSpaceType") indicating CSS. In the present disclosure, a USS set index may mean an SS set index for an SS set with a search space type (RRC parameter "searchSpaceType") indicating USS.

<PDCCH vs. PDSCH>

When offset between reception of DL DCI and a corresponding PDSCH (which may be referred to as scheduling offset) is less than a certain threshold value (timeDurationForQCL), the UE may assume that a DMRS port for a PDSCH in a certain serving cell is QCL with a reference signal related to a QCL parameter for a PDCCH of a CORESET having the lowest CORESET ID (controlResourceSetId) related to a search space monitored in the latest slot in which one or more CORESETs in an active BWP of the serving cell are monitored. In this case, it may be indicated that the PDSCH follows a default TCI state, default QCL is referred to/assumed, or the like.

In a case where the PDSCH follows the default TCI state, when "QCL type D (signal)" of a DMRS for the PDSCH is different from "QCL type D (signal)" ('QCL-TypeD') of a DMRS for a PDCCH overlapping with the PDSCH in at least 1 symbol, the UE may assume (expect) that reception of a PDCCH related to the CORESET is prioritized (a priority rule between the PDCCH and the PDSCH). Note that these operations may be applied to a case of intra-band carrier aggregation (CA) (case where the above-described PDSCH and the above-described CORESET are present in different component carriers).

For example, when the PDCCH and the PDSCH have different QCL types D, and overlap with each other in some symbols, the UE may preferentially receive the PDCCH, and may not receive (for example, may drop) the PDSCH overlapping with the PDCCH. The UE may receive a part of the PDSCH not overlapping with the PDCCH.

<CSI-RS vs. PDCCH>

With respect to a CSI-RS resource related to a non-zero power (NZP)-CSI-RS resource set for which a repetition-related higher layer parameter ('repetition') is 'ON,' the UE may not assume, for a symbol in which monitoring of a CORESET is configured, that a CSI-RS is configured (that is, the CORESET and the CSI-RS resource in this case do not temporally overlap with each other).

On the other hand, with respect to an NZP-CSI-RS resource set (for which 'repetition' is not 'ON') other than that, when a CSI-RS resource and a search space set related to a CORESET are configured for the UE in the same OFDM symbol, the UE may assume that the CSI-RS and a PDCCH DMRS transmitted in all search space sets related to the CORESET are QCL with each other for "QCL type D" (when "QCL type D" is applicable). In other words, for a CSI-RS for which repetition is not ON, the UE may assume the same QCL as that of an overlapped PDCCH (CORESET). Note that these operations may be applied to a case of intra-band CA (case where the above-described CSI-RS and the above-described CORESET are present in different component carriers).

Note that in the present disclosure, an OFDM symbol and a symbol may be interchangeably interpreted.

<CSI-RS vs. SSB>

The UE for which a CSI-RS resource related to an NZP-CSI-RS resource set for which a repetition-related higher layer parameter ('repetition') is configured is configured in the same OFDM symbol as that of an SS/PBCH block may assume that the CSI-RS and the SS/PBCH block are QCL with each other for "QCL type D" (when "QCL type D" is applicable). In other words, for the CSI-RS for which the repetition-related higher layer parameter is configured, the UE may assume the same QCL as that of an overlapped SS/PBCH block.

<PDSCH vs. SSB>

When receiving an SS/PBCH block and a DMRS for a PDSCH in the same OFDM symbol, the UE may assume that the DMRS and the SS/PBCH block are QCL with each other for "QCL type D" (when "QCL type D" is applicable). In other words, for the PDSCH, the UE may assume the same QCL as that of an overlapped SS/PBCH block.

<A-CSI-RS vs. Another DL Signal>

In Rel-16 NR specifications, when scheduling offset for an aperiodic CSI-RS (A-CSI-RS) is greater than or equal to a threshold value determined on the basis of a beam switch timing reported by the UE, the UE may assume (expect) that QCL assumption in a specified TCI state for A-CSI-RS resources in a CSI triggering state specified by a CSI trigger (request) field in DCI is applied (the UE is expected to apply the QCL assumptions in the indicated TCI states for the aperiodic CSI-RS resources in the CSI triggering state indicated by the CSI trigger field in DCI). That is, in this case, the UE may receive the A-CSI-RS on the basis of the TCI state specified by the DCI.

Here, the scheduling offset may mean offset between the last symbol for a PDCCH to transmit the DCI for triggering an A-CSI-RS resource set (or the last slot including the PDCCH) and the first symbol (or slot) for A-CSI-RS resources of the resource set. A unit of the offset may be a symbol unit. Information about the scheduling offset for the A-CSI-RS may correspond to an RRC parameter "aperiodicTriggeringOffset."

(A UE capability related to) the beam switching timing reported by the UE may be referred to as an A-CSI-RS beam switching timing, just a beam switching timing, a beam switch timing (RRC parameter "beamSwitchTiming"), or the like.

The beam switch timing may take a different value for each subcarrier spacing (for example, 60 kHz or 120 kHz). The beam switch timing can take values, such as 14, 28, 48, 224, and 336 symbols.

The threshold value determined on the basis of the beam switch timing may be a beam switch timing value to be reported, may be a specific beam switch timing value (for example, 48), or may be a value obtained by adding certain offset (for example, offset with consideration of subcarrier spacing) to these.

When the scheduling offset for the A-CSI-RS is less than the threshold value determined on the basis of the beam switch timing reported by the UE, the UE may, if another DL signal having an indicated TCI state is present in the same symbol as that for the A-CSI-RS, apply QCL assumption for such another DL signal in reception of the A-CSI-RS. This specification takes certain time to switch a UE receive beam corresponding to a TCI state indicated by the DCI after demodulating triggering DCI, and thus intends to suppress a case where the switch is not in time for reception of the A-CSI-RS.

Note that such another DL signal mentioned here may be at least one of a PDSCH having scheduling offset greater than or equal to a certain threshold value (UE capability information "timeDurationForQCL") (that is, offset from reception of DCI to a start of reception of a PDSCH scheduled by the DCI is greater than or equal to the certain threshold value), an A-CSI-RS having scheduling offset greater than or equal to the threshold value determined on the basis of the beam switch timing reported by the UE (that is, another A-CSI-RS), a P-CSI-RS, and an SP-CSI-RS.

timeDurationForQCL may be defined by the shortest time (for example, the number of OFDM symbols) in which the UE receives a PDCCH and in which spatial QCL information of the PDCCH (DCI) is applied for PDSCH processing.

timeDurationForQCL may be referred to as a time length (time duration) for QCL, "Threshold," "Threshold for offset between a DCI indicating a TCI state and a PDSCH scheduled by the DCI," "Threshold-Sched-Offset," a schedule offset threshold value, a scheduling offset threshold value, or the like. timeDurationForQCL can take values, such as 7, 14, and 28 symbols.

Note that in the present disclosure, the threshold value related to another DL signal may correspond to the beam switch timing in a case where such another DL signal is an A-CSI-RS, and may correspond to a value of timeDurationForQCL reported by the UE in a case where such another DL signal is a PDSCH.

Note that a case that the above-mentioned QCL assumption for such another DL signal can be applied to the A-CSI-RS may be limited to a case where an NZP CSI-RS resource set to define the A-CSI-RS resource does not have higher layer parameters "trs-Info" and "repetition."

For the NZP CSI-RS resource set for which "trs-Info" is set to "true," antenna ports for all NZP CSI-RS resources of the resource set may be the same. For the NZP CSI-RS resource set for which "repetition" is set to "off," the UE may not assume that NZP CSI-RS resources in the resource set are transmitted by using the same downlink spatial domain transmission filter.

Note that when scheduling offset for an A-CSI-RS is less than a threshold value determined on the basis of a beam switch timing reported by the UE, and the above-mentioned another DL signal having the indicated TCI state is absent in the same symbol as that of the A-CSI-RS, and moreover, at least one CORESET is configured in a BWP for receiving the A-CSI-RS, the UE may apply, in reception of the A-CSI-RS, QCL assumption for a CORESET having the lowest CORESET-ID in the latest slot in which one or more CORESETs in an active BWP of a serving cell are monitored, the CORESET being associated with a search space to be monitored (the UE applies the QCL assumption used for the CORESET associated with a monitored search space with the lowest controlResourceSetId in the latest slot in which one or more CORESETs within the active BWP of the serving cell are monitored).

Note that when scheduling offset for an A-CSI-RS is less than the beam switch timing reported by the UE, and the above-mentioned another DL signal having the indicated TCI state is absent in the same symbol as that of the A-CSI-RS, and moreover, a CORESET is not configured in a BWP for receiving the A-CSI-RS, and a specific higher layer parameter (for example, an RRC parameter for enabling a default beam (which may be referred to as enableDefaultBeamForCCS or the like)) is configured, the UE may apply, in reception of the A-CSI-RS, QCL assumption for a TCI state corresponding to the lowest TCI state ID to be activated, the TCI state being applicable to a PDSCH in an active BWP for receiving the A-CSI-RS.

(Multiple TRPs)

For NR, one or a plurality of transmission/reception points (TRPs) (multiple TRPs (multi TRP (MTRP))) that perform DL transmission to a UE by using one or a plurality of panels (multiple panels) are under study. Also, the UE that performs UL transmission to one or the plurality of TRPs by using one or a plurality of panels is under study.

Note that the plurality of TRPs may correspond to the same cell identifier (ID), or may correspond to different cell IDs. The cell ID may be a physical cell ID, or may be a virtual cell ID.

The multiple TRPs (for example, TRP #1 and TRP #2) may be connected to each other by an ideal/non-ideal backhaul, and information, data, and the like may be exchanged. From respective TRPs of the multiple TRPs, different codewords (Code Word, CWs) and different layers may be transmitted. As a form of multi-TRP transmission, non-coherent joint transmission (NCJT) may be used.

In the NCJT, for example, TRP #1 performs modulation mapping and layer mapping for a first codeword to transmit a first number of layers (for example, 2 layers) and to transmit a first PDSCH by using first precoding. Also, TRP #2 performs modulation mapping and layer mapping for a second codeword to transmit a second number of layers (for example, 2 layers) and to transmit a second PDSCH by using second precoding.

Note that a plurality of PDSCHs (multiple PDSCHs) subject to the NCJT may be defined as PDSCHs partially or fully overlapping with each other in relation to at least one of time and frequency domains. That is, a first PDSCH from a first TRP and a second PDSCH from a second TRP may overlap with each other in at least one of time and frequency resources.

It may be assumed that these first PDSCH and second PDSCH are not in a quasi-co-location (QCL) relationship (not quasi-co-located). Reception of the multiple PDSCHs may be interpreted as simultaneous reception of PDSCHs of a QCL type other than a certain QCL type (for example, QCL type D).

A plurality of PDSCHs (which may be referred to as multiple PDSCHs) from the multiple TRPs may be scheduled by using one piece of DCI (single DCI, single PDCCH) (single master mode, multiple TRPs based on single DCI (single-DCI based multi-TRP)). A respective plurality of PDSCHs from the multiple TRPs may be scheduled by using a plurality of pieces of DCI (multiple DCI, multiple PDCCHs) (multi-master mode, multi-DCI-based multiple TRPs (multi-DCI based multi-TRP)).

For URLLC for multiple TRPs, support for repetition of a PDSCH (transport block (TB) or codeword (CW)) across the multiple TRPs is under study. Support for repetition schemes (URLLC schemes, for example, schemes 1, 2a, 2b, 3, and 4) across the multiple TRPs on a frequency domain, a layer (spatial) domain, or a time domain is under study. In scheme 1, multiple PDSCHs from the multiple TRPs are space division multiplexed (SDMed). In schemes 2a and 2b, PDSCHs from the multiple TRPs are frequency division multiplexed (FDMed). In scheme 2a, redundancy versions (RVs) for the multiple TRPs are the same. In scheme 2b, the RVs for the multiple TRPs may be the same, or may be different from each other. In schemes 3 and 4, multiple PDSCHs from the multiple TRPs are time division multiplexed (TDMed). In scheme 3, the multiple PDSCHs from the multiple TRPs are transmitted in one slot. In scheme 4, the multiple PDSCHs from the multiple TRPs are transmitted in different slots.

According to such a multi-TRP scenario, more flexible transmission control using a channel with satisfactory quality is possible.

In order to support intra-cell (having the same cell ID) and inter-cell (having different cell IDs) multi-TRP transmissions based on multiple PDCCHs, in RRC configuration information for linking a plurality of pairs of PDCCHs and PDSCHs having multiple TRPs, one control resource set (CORESET) in PDCCH configuration information (PDCCH-Config) may correspond to one TRP.

The UE may judge that the multiple TRPs are multi-DCI-based multiple TRPs when at least one of condition 1 and condition 2 below is satisfied. In this case, the TRPs may be interpreted as CORESET pool indices.
[Condition 1]
A CORESET pool index with "1" is configured.
[Condition 2]
Two different values (for example, 0 and 1) of CORESET pool indices are configured.

The UE may judge that the multiple TRPs are multiple TRPs based on single DCI when the following condition is satisfied. In this case, two TRPs may be interpreted as two TCI states indicated by a MAC CE/DCI.
[Condition]
In order to indicate one or two TCI states for one codepoint of a TCI field in DCI, an "enhanced TCI state activation/deactivation MAC CE for a UE-specific PDSCH (Enhanced TCI states Activation/Deactivation for UE-specific PDSCH MAC CE)" is used.

DCI for common beam indication may be a UE-specific DCI format (for example, DL DCI format (for example, 1_1 or 1_2) or UL DCI format (for example, 0_1 or 0_2)), or may be a UE-group common DCI format.

(Multi-TRP PDCCH)

For reliability of a multi-TRP PDCCH based on a non-single frequency network (SFN), study 1 to study 3 below are under study.
[Study 1] Coding/rate matching is based on one repetition, and the same code bit is repeated in another repetition.
[Study 2] Respective repetitions have the same number of control channel elements (CCEs) and the same code bit, and correspond to the same DCI payload.
[Study 3] Two or more PDCCH candidates are explicitly linked to each other. The UE recognizes the link before decoding.

Choice 1-2, choice 1-3, choice 2, and choice 3 below for PDCCH repetition are under study.
[Choice 1-2]
Two sets of PDCCH candidates (in a given search space (SS) set) are associated with two respective TCI states for a CORESET. Here, the same CORESET, the same SS set, and PDCCH repetition in different monitoring occasions are used.
[Choice 1-3]
Two sets of PDCCH candidates are associated with two respective SS sets. Both of the SS sets are associated with a CORESET, and each SS set is associated with only one TCI state for the CORESET. Here, the same CORESET and two SS sets are used.
[Choice 2]
One SS set is associated with two different CORESETs.
[Choice 3]
Two SS sets are associated with two respective CORESETs.

For a non-SFN scheme, study 2, and choice 3, support for study 3 is under study.

For enhancement of the reliability of the multi-TRP PDCCH, a multiplexing scheme below is under study.
[FDM] Any one of two sets of REG bundles, CCEs of PDCCHs to be transmitted, two non-overlapped PDCCH repetitions (in a frequency) to be transmitted, and non-overlapped PDCCHs (in a frequency) to be transmitted in multiple occasions (multi-chance) is associated with different TCI states.
[SFN] A PDCCH DMRS is associated with two TCI states in all REGs/CCEs of PDCCHs.

A case that two SS sets linked to each other for PDCCH repetition are configured by an RRC IE/MAC CE is under study. A case that two PDCCH candidates linked to each other for PDCCH repetition are two PDCCH candidates having the same aggregation level and the same candidate index in two SS sets linked to each other is under study.

(Radio Link Monitoring (RLM))

In NR, radio link monitoring (RLM) is used.

In NR, a base station may configure, for the UE, a radio link monitoring reference signal (Radio Link Monitoring RS (RLM-RS)) for each BWP by using higher layer signaling. The UE may receive RLM configuration information (for example, an information element "RadioLinkMonitoring-Config" of RRC).

The RLM configuration information may include failure detection resource configuration information (for example, a higher layer parameter "failureDetectionResourcesToAdd-ModList"). The failure detection resource configuration information may include a parameter related to the RLM-RS (for example, a higher layer parameter "RadioLinkMonitor-ingRS").

The parameter related to the RLM-RS may include information indicating that the parameter corresponds to the purpose of RLM, an index corresponding to a resource of the RLM-RS (for example, an index included in a higher layer parameter "failureDetectionResources" (RadioLinkMonitoringRS in failureDetectionResourcesToAddModList)), and the like. For example, the index may be a CSI-RS resource configuration index (for example, a non-zero power CSI-RS resource ID), or may be an SS/PBCH block index (SSB index). The information about the purpose may indicate beam failure, (cell level) Radio Link Failure (RLF), or both of them.

The UE may identify an RLM-RS resource on the basis of the index corresponding to the resource of the RLM-RS, and may perform RLM by using the RLM-RS resource.

In RLM procedure in Rel. 16, the UE follows implicit RLM-RS determination (implicit RS determination) procedure below.

[Implicit RLM-RS Determination Procedure]

If the RLM-RS (RadioLinkMonitoringRS) is not provided for the UE, and a TCI state including one or more CSI-RSs for PDCCH reception is provided for the UE, the UE follows procedure 1 to procedure 4 below.

[[Procedure 1]]

If an active TCI state for the PDCCH reception includes only one RS, the UE uses, for RLM, that RS provided for the active TCI state for the PDCCH reception.

[[Procedure 2]]

If the active TCI state for the PDCCH reception includes two RSs, the UE assumes that one RS has QCL type D, and the UE uses, for RLM, that RS having QCL type D. The UE does not assume that both of the RSs have QCL type D.

[[Procedure 3]]

The UE is not required to use an aperiodic or semi-persistent RS for RLM.

[[Procedure 4]]

For $L_{max}=4$, the UE selects, in order starting from the lowest monitoring periodicity, $N_{RLM}$ RSs provided for the active TCI state for the PDCCH reception in a plurality of CORESETs associated with a plurality of search space sets. If more than one CORESET is associated with a plurality of search space sets having the same monitoring periodicity, the UE determines a CORESET order starting from the highest CORESET index.

Here, $L_{max}$ is a maximum number of SS/PBCH block indices in a cell. A maximum number of SS/PBCH blocks transmitted in a half-frame is $L_{max}$.

Thus, when the RLM-RS is not provided for the UE, the UE performs implicit RLM-RS determination, and uses, for RLM, an active TCI state for the PDCCH reception. When $L_{max}=4$, the UE selects $N_{RL}$ RSs first in ascending order of monitoring periodicities of the search space sets, and subsequently in descending order of CORESET indices. The UE selects a CORESET.

Up to $N_{LR-RLM}$ RLM-RSs for link recovery procedure and RLM can be configured for the UE. Up to $N_{RLM}$ RLM-RSs out of $N_{LR-RLM}$ RLM-RSs are used for the RLM depending on $L_{max}$. In Rel. 16, as shown in FIG. 1, $N_{RLM}=2$ when $L_{max}=4$, $N_{RLM}=4$ when $L_{max}=8$, and $N_{RLM}=8$ when $L_{max}=64$.

(Beam Failure Detection (BFD)/Beam Failure Recovery (BFR))

In NR, communication is performed by using beam forming. For example, a UE and a base station (for example, a gNB (gNodeB)) may use a beam used for signal transmission (also referred to as a transmit beam, Tx beam, or the like) and a beam used for signal reception (also referred to as a receive beam, Rx beam, or the like).

Using the beam forming is susceptible to interference from an obstruction, and thus it is assumed that radio link quality deteriorates. Due to deterioration of the radio link quality, radio link failure (RLF) may occur frequently. Occurrence of the RLF requires reconnection of a cell, and thus frequent occurrence of the RLF causes deterioration of system throughput.

In NR, in order to suppress occurrence of the RLF, procedure for switching to another beam (which may be referred to as beam recovery (BR), beam failure recovery (BFR), L1/L2 (Layer 1/Layer 2) beam recovery, or the like) is performed when quality of a specific beam deteriorates. Note that the BFR procedure may be simply referred to as BFR.

Note that beam failure (BF) in the present disclosure may be referred to as link failure.

For example, in an initial state, the UE performs measurement based on a reference signal (RS) resource transmitted by using two beams.

The RS may be at least one of a synchronization signal block (SSB) and an RS for channel state measurement (Channel State Information RS (CSI-RS)). Note that the SSB may be referred to as an SS/PBCH (Physical Broadcast Channel) block or the like.

The RS may be at least one of a primary synchronization signal (Primary SS (PSS)), a secondary synchronization signal (Secondary SS (SSS)), a mobility reference signal (Mobility RS (MRS)), a signal included in the SSB, the SSB, the CSI-RS, a demodulation reference signal (DMRS), a beam-specific signal, and the like, or may be a signal constituted by expanding, changing, or the like these signals. The RS measured at step S101 may be referred to as an RS for beam failure detection (Beam Failure Detection RS (BFD-RS)), an RS used for beam recovery procedure (BFR-RS), or the like.

Due to interference of a radio wave from the base station, the UE fails to detect the BFD-RS (or quality of reception of the RS deteriorates). Such interference may occur due to, for example, influence of an obstruction, fading, interference, and the like between the UE and the base station.

The UE detects beam failure when a certain condition is satisfied. For example, the UE may detect occurrence of the beam failure when a BLER (Block Error Rate) for all of configured BFD-RSs (BFD-RS resource configurations) is less than a threshold value. When occurrence of the beam failure is detected, a lower layer (physical (PHY) layer) of the UE may notify (indicate) a beam failure instance for a higher layer (MAC layer).

Note that judgment standards (criteria) are not limited to the BLER, and may be reference signal received power in the physical layer (Layer 1 Reference Signal Received Power (L1-RSRP)). In place of the RS measurement or in addition to the RS measurement, beam failure detection may be performed on the basis of a downlink control channel (Physical Downlink Control Channel (PDCCH)) or the like. The BFD-RS may be expected to be quasi-co-location (QCL) with a DMRS for a PDCCH monitored by the UE.

Here, QCL is an indicator indicating statistical properties of the channel. For example, when a certain signal/channel and another signal/channel are in a relationship of QCL, it may be indicated that it is assumable that at least one of a Doppler shift, a Doppler spread, an average delay, a delay spread, and a spatial parameter (for example, a spatial reception parameter (Spatial Rx Parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

Information related to the BFD-RS (for example, indices, resources, numbers, the number of ports, precoding, and the like for the RS), information related to the beam failure detection (BFD) (for example, the above-mentioned threshold value), and the like may be configured (notified) for the UE by using higher layer signaling or the like. The information related to the BFD-RS may be referred to as information related to resources for BFR or the like.

The higher layer (for example, the MAC layer) of the UE may start a certain timer (which may be referred to as a beam failure detection timer) when receiving beam failure instance notification from the PHY layer of the UE. The MAC layer of the UE may trigger BFR (for example, start any one of random access procedures mentioned below) when receiving the beam failure instance notification certain times (for example, beamFailureInstanceMaxCount configured by RRC) or more until the timer expires.

When there is no notification from the UE or when receiving a certain signal (beam recovery request) from the UE, the base station may judge that the UE has detected beam failure.

For beam recovery, the UE starts a search for a new candidate beam for use in new communication. The UE may select, by measuring a certain RS, the new candidate beam corresponding to the RS. Here, the RS to be measured may be referred to as a new candidate RS, an RS for new candidate beam identification (New Candidate Beam Identification RS (NCBI-RS)), a CBI-RS, a CB-RS (Candidate Beam RS), or the like. The NCBI-RS may be the same as the BFD-RS, or may be different from the BFD-RS. Note that the new candidate beam may be simply referred to as a candidate beam, or may be referred to as a candidate RS.

The UE may determine a beam corresponding to an RS satisfying a certain condition as the new candidate beam. For example, the UE may determine the new candidate beam on the basis of an RS with L1-RSRP exceeding a threshold value, out of configured NCBI-RSs. Note that judgment standards (criteria) are not limited to the L1-RSRP. The L1-RSRP related to an SSB may be referred to as SS-RSRP. The L1-RSRP related to a CSI-RS may be referred to as CSI-RSRP.

Information related to the NCBI-RS (for example, resources, numbers, the number of ports, precoding, and the like for the RS), information related to new candidate beam identification (NCBI) (for example, the above-mentioned threshold value), and the like may be configured (notified) for the UE by using higher layer signaling or the like. Information related to the new candidate RS (or the NCBI-RS) may be acquired on the basis of information related to the BFD-RS. The information related to the NCBI-RS may be referred to as information related to NCBI resources or the like.

Note that the BFD-RS, the NCBI-RS, and the like may be interpreted as a radio link monitoring reference signal (Radio Link Monitoring RS (RLM-RS)).

The UE that has identified the new candidate beam transmits a beam recovery request (Beam Failure Recovery reQuest (BFRQ)). The beam recovery request may be referred to as a beam recovery request signal, a beam failure recovery request signal, or the like.

The BFRQ may be transmitted by using, for example, at least one of an uplink control channel (Physical Uplink Control Channel (PUCCH)), a random access channel (Physical Random Access Channel (PRACH)), an uplink shared channel (Physical Uplink Shared Channel (PUSCH)), and a configured grant (CG) PUSCH.

The BFRQ may include information about the identified new candidate beam/new candidate RS. Resources for the BFRQ may be associated with the new candidate beam. The information about the beam may be notified by using a beam index (BI), a port index of a certain reference signal, an RS index, a resource index (for example, a CSI-RS resource indicator (CRI) or an SSB resource indicator (SSBRI)), or the like.

For Rel-15 NR, CB-BFR (Contention-Based BFR) that is BFR based on contention-based random access (RA) procedure and CF-BFR (Contention-Free BFR) that is BFR based on non-contention-based random access procedure are under study. In the CB-BFR and the CF-BFR, the UE may transmit a preamble (also referred to as an RA preamble, a random access channel (Physical Random Access Channel (PRACH)), a RACH preamble, or the like) as the BFRQ by using a PRACH resource.

In the CB-BFR, the UE may transmit a preamble randomly selected from one or a plurality of preambles. On the other hand, in the CF-BFR, the UE may transmit a preamble allocated from the base station in a UE-specific manner. In the CB-BFR, the base station may allocate identical preambles to a plurality of UEs. In the CF-BFR, the base station may allocate a preamble in a UE-dedicated manner.

Note that the CB-BFR and the CF-BFR may be referred to as CB PRACH-based BFR (contention-based PRACH-based BFR (CBRA-BFR)) and CF PRACH-based BFR (contention-free PRACH-based BFR (CFPA-BFR)), respectively. The CBRA-BFR may be referred to as CBRA for BFR. The CFRA-BFR may be referred to as CFRA for BFR.

In both of the CB-BFR and the CF-BFR, information related to the PRACH resource (PA preamble) may be notified by, for example, higher layer signaling (RRC signaling or the like). For example, the information may include information indicating correspondence between detected DL-RSs (beams) and PRACH resources, and a different PRACH resource may be associated with each DL-RS.

The base station that has detected the BFRQ transmits a response signal (which may be referred to as a gNB response or the like) in response to the BFRQ from the UE. The response signal may include reconfiguration information about one or a plurality of beams (for example, DL-RS resource configuration information).

The response signal may be transmitted in, for example, a UE-common search space of a PDCCH. The response signal may be notified by using a PDCCH (DCI) cyclic redundancy check (CRC)-scrambled by a UE identifier (for example, a cell-radio RNTI (C-RNTI)). The UE may judge, on the basis of beam reconfiguration information, at least one of a transmit beam and a receive beam to be used.

The UE may monitor the response signal on the basis of at least one of a control resource set (COntrol REsource SET (CORESET)) for BFR and a search space set for BFR.

With respect to the CB-BFR, when the UE receives a PDCCH corresponding to a C-RNTI related to the UE itself, it may be judged that contention resolution has succeeded.

A period for the UE to monitor response from the base station (for example, the gNB) to the BFRQ may be configured. The period may be referred to as, for example, a gNB response window, a gNB window, a beam recovery request response window, or the like. The UE may perform retransmission of the BFRQ when there is no gNB response detected in the window period.

The UE may transmit, to the base station, a message indicating that beam reconfiguration has been completed. For example, the message may be transmitted on a PUCCH, or may be transmitted on a PUSCH.

Beam recovery success (BR success) may indicate, for example, a case where transmission of the message has been reached. On the other hand, beam recovery failure (BR failure) may correspond to, for example, a case that BFRQ transmission has reached a certain number of times or a case that a beam failure recovery timer (Beam-failure-recovery-Timer) has expired.

In Rel. 15, a case that beam recovery procedure (for example, BFRQ notification) for beam failure detected in an SpCell (PCell/PSCell) is performed by using random access procedure is supported. On the other hand, in Rel. 16, a case that beam recovery procedure (for example, BFRQ notification) for beam failure detected in an SCell is performed by using at least one of BFR PUCCH (for example, scheduling request (SR)) transmission and BFR MAC CE (for example, UL-SCH) transmission is supported.

For example, the UE may transmit information related to beam failure by using two MAC CE-based steps. The information related to the beam failure may include information related to a cell in which the beam failure has been detected and information related to a new candidate beam (or a new candidate RS index).

[Step 1]

When BF has been detected, a PUCCH-BFR (scheduling request (SR)) may be transmitted from the UE to the PCell/PSCell. Subsequently, a UL grant (DCI) for step 2 described below may be transmitted from the PCell/PSCell to the UE. In a case where beam failure has been detected, when a MAC CE (or a UL-SCH) for transmitting information related to a new candidate beam is present, step 1 (for example, PUCCH transmission) may be omitted to perform step 2 (for example, MAC CE transmission).

[Step 2]

Subsequently, the UE may transmit, to the base station (PCell/PSCell), information (for example, a cell index) related to a (unsuccessful) cell in which the beam failure has been detected and the information related to the new candidate beam by using the MAC CE via an uplink channel (for example, a PUSCH). After that, after BFR procedure, QCL of a PDCCH/PUCCH/PDSCH/PUSCH may be updated to a new beam after a certain period (for example, 28 symbols) from reception of a response signal from the base station.

Note that these step numbers are just numbers for description, and a plurality of steps may be combined with each other, or the order of the steps may be changed. Whether to perform the BFR may be configured for the UE by using higher layer signaling.

(BFD-RS)

In Rel. 16, for each BWP of one serving cell, set $q_0$ bar of periodic (P)-CSI-RS resource configuration indices and set $q_1$ bar of at least one of P-CSI-RS resource configuration indices and SS/PBCH block indices can be provided for the UE by failure detection resources (failureDetectionResources, failureDetectionResourcesToAddModList, RadioLinkMonitoringConfig) and a candidate beam RS list (candidateBeamRSList), an extended candidate beam RS list (candidateBeamRSListExt-r16), or a candidate beam RS list for an SCell (candidateBeamRSSCellList-r16), respectively.

Here, $q_0$ bar is an expression in which an overline is added to "$q_0$." Hereinafter, $q_0$ bar is simply expressed as $q_0$. $q_1$ bar is an expression in which an overline is added to "$q_1$." Hereinafter, $q_1$ bar is simply expressed as $q_1$.

Set $q_0$ of P-CSI-RS resources provided by the failure detection resources may be referred to as an explicit BFD-RS.

The UE may perform L1-RSRP measurement and the like by using RS resources corresponding to indices included in at least one set out of set $q_0$ and set $q_1$ to detect beam failure.

Note that in the present disclosure, a case that the above-mentioned higher layer parameter indicating information about an index corresponding to a BFD resource is provided and each of a case that a BFD resource is configured, a case that a BFD-RS is configured, and the like may be interchangeably interpreted. In the present disclosure, the BFD resource, set $q_0$ of periodic CSI-RS resource configuration indices or SSB indices, a BFD-RS, a BFD-RS set, and an RS set may be interchangeably interpreted.

For one BWP of that serving cell, if $q_0$ is not provided for the UE by failure detection resources (failureDetectionResources), the UE determines, in accordance with implicit BFD-RS determination (implicit RS determination) procedure below, an RS (set $q_0$) to be used for BFD procedure.

[Implicit BFD-RS Determination Procedure]

The UE determines that a P-CSI-RS resource configuration index having the same value as an RS index in an RS set indicated by a TCI state (TCI-State) for a corresponding CORESET used by the UE for PDCCH monitoring is included in set $q_0$. If two RS indices are present in one TCI state, set $q_0$ includes an RS index having a QCL type D configuration for a corresponding TCI state. The UE assumes that set $q_0$ includes up to two RS indices. The UE assumes a single port RS in set $q_0$.

This set $q_0$ may be referred to as an implicit BFD-RS.

Thus, the UE determines the BFD-RS (RS set) by using a PDCCH TCI state. The UE assumes that the RS set includes up to two RSs.

(PDCCH/CORESET Configuration)

For PDCCH/CORESET configuration in Rel. 15, there is case 0 below.

[Case 0]

One CORESET is not accompanied by a CORESET pool index (TRP-related information), and is configured with one TCI state.

In PDCCH/CORESET-related Rel-16 enhancement, there is case 1 below.

[Case 1]

For the multi-DCI-based multiple TRPs, a CORESET pool index (TRP-related information) is configured for each CORESET (CORESET pool index is associated with a certain CORESET).

For PDCCH/CORESET-related Rel-17 enhancement, there is case 2/case 3 below.

[Case 2]

As enhancement of the SFN, up to two TCI states are configured/activated for one CORESET by using an RRC IE/MAC CE (two TCI states are associated with a certain CORESET). The SFN may be used for both a high speed train (HST) and reliability enhancement.

[Case 3]

As repetition enhancement, two PDCCH candidates in two search space (SS) sets are linked to each other for PDCCH repetition, and each SS set is associated with a corresponding CORESET (two PDCCH candidates/two SS sets/two CORESETs are linked to each other). Two SS sets are associated with the same CORESET or different CORESETs. One CORESET can be associated with up to one TCI state by using the RRC IE/MAC CE. If the two SS sets are associated with different CORESETs, that PDCCH repetition is multi-TRP repetition. If the two SS sets are associated with the same CORESET (same TCI state), that PDCCH repetition is single-TRP repetition.

<Issue 1>

Whether any of case 0 to case 3 mentioned above can be simultaneously (in combination) configured for the UE like at least one of cases A to D below is an issue.

[Case A] Case 1+Case 2
[Case B] Case 1+Case 3
[Case C] Case 2+Case 3
[Case D] Case 1+Case 2+Case 3

<Issue 2>

Whether enhancement related to an RLM-RS/BFD-RS configuration/determination rule is necessary for each combined case mentioned above is an issue.

<Issue 3>

Whether enhancement related to handling for QCL type D contention is necessary for each combined case mentioned above is an issue.

How a UE performs reception for at least one of these cases on the basis of PDCCH/CORESET configuration is indefinite. Unless the reception is performed appropriately, communication quality reduction, communication throughput reduction, and the like may occur.

Thus, the inventors of the present invention came up with the idea of a reception method based on PDCCH/CORESET configuration.

Embodiments according to the present disclosure will be described in detail with reference to the drawings as follows. The radio communication methods according to respective embodiments may each be employed individually, or may be employed in combination.

In the present disclosure, "A/B/C" and "at least one of A, B, and C" may be interchangeably interpreted. In the present disclosure, a cell, a serving cell, a CC, a carrier, a BWP, a DL BWP, a UL BWP, an active DL BWP, an active UL BWP, and a band may be interchangeably interpreted. In the present disclosure, an index, an ID, an indicator, and a resource ID may be interchangeably interpreted. In the present disclosure, a sequence, a list, a set, a group, a cluster, a subset, and the like may be interchangeably interpreted. In the present disclosure, "support," "control," "controllable," "operate," and "operable" may be interchangeably interpreted.

In the present disclosure, configuration (configure), activation (activate), update, indication (indicate), enabling (enable), specification (specify), and selection (select) may be interchangeably interpreted.

In the present disclosure, link, have a linkage, associate, correspond, map, repeat, and relate may be interchangeably interpreted. In the present disclosure, allocate, assign, monitor, and map may be interchangeably interpreted.

In the present disclosure, the higher layer signaling may be, for example, any one or combinations of Radio Resource Control (RRC) signaling, Medium Access Control (MAC) signaling, broadcast information, and the like. In the present disclosure, RRC, RRC signaling, an RRC parameter, a higher layer parameter, an RRC information element (IE), an RRC message, and configuration may be interchangeably interpreted.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

In the present disclosure, a MAC CE and an activation/deactivation command may be interchangeably interpreted.

In the present disclosure, a beam, a spatial domain filter, a spatial setting, a TCI state, a UL TCI state, a unified TCI state, a unified beam, a common TCI state, a common beam, TCI assumption, QCL assumption, a QCL parameter, a spatial domain reception filter, a UE spatial domain reception filter, a UE receive beam, a DL beam, a DL receive beam, DL precoding, a DL precoder, a DL-RS, an RS of QCL type D in a TCI state/QCL assumption, an RS of QCL type A in a TCI state/QCL assumption, a spatial relation, a spatial domain transmission filter, a UE spatial domain transmission filter, a UE transmit beam, a UL beam, a UL transmit beam, UL precoding, a UL precoder, a PL-RS, an antenna port, a panel group, and a beam group may be interchangeably interpreted. In the present disclosure, a QCL type X-RS, a DL-RS associated with QCL type X, a DL-RS having QCL type X, a DL-RS source, an SSB, a CSI-RS, and an SRS may be interchangeably interpreted.

In the present disclosure, a panel, an Uplink (UL) transmission entity, a TRP, a spatial relation, a control resource set (CORESET), a PDSCH, a codeword, a base station, an antenna port for a certain signal (for example, a demodulation reference signal (DMRS) port), an antenna port group for a certain signal (for example, a DMRS port group), a group for multiplexing (for example, a code division multiplexing (CDM) group, a reference signal group, or a CORESET group), a CORESET pool, a CORESET subset, a CW, a redundancy version (RV), and a layer (MIMO layer, transmission layer, spatial layer) may be interchangeably interpreted.

The Panel may be related to at least one of a group index of an SSB/CSI-RS group, a group index of group-based beam report, and a group index of an SSB/CSI-RS group for group-based beam report.

A panel Identifier (ID) and a panel may be interchangeably interpreted. In other words, a TRP ID and a TRP, a CORESET group ID and a CORESET group, and the like may be interchangeably interpreted.

In the present disclosure, a TRP, a transmission point, a panel, a DMRS port group, a CORESET pool, and one of two TCI states associated with one codepoint of a TCI field may be interchangeably interpreted.

In the present disclosure, it may be assumed that a single PDCCH is supported when multi-TRP uses ideal backhaul. It may be assumed that multi-PDCCH is supported when multi-TRP uses non-ideal backhaul.

Note that the ideal backhaul may be referred to as DMRS port group type 1, reference signal related group type 1, antenna port group type 1, CORESET pool type 1, and the like. The non-ideal backhaul may be referred to as DMRS port group type 2, reference signal related group type 2, antenna port group type 2, CORESET pool type 2, and the like. The names are not limited to these.

In the present disclosure, a single TRP, a single-TRP system, single-TRP transmission, and a single PDSCH may be interchangeably interpreted. In the present disclosure, multi-TRP, multi-TRP system, multi-TRP transmission, and multi-PDSCH may be interchangeably interpreted. In the present disclosure, single DCI, a single PDCCH, multi-TRP based on single DCI, and two TCI states in at least one TCI codepoint being activated may be interchangeably interpreted.

In the present disclosure, a single TRP, a channel using a single TRP, a channel using one TCI state/spatial relation, multi-TRP being not enabled by RRC/DCI, a plurality of TCI states/spatial relations being not enabled by RRC/DCI, and a CORESET pool index (CORESETPoolIndex) value "1" being not configured for any CORESET and any codepoint of a TCI field being not mapped to two TCI states may be interchangeably interpreted.

In the present disclosure, multi-TRP, a channel using multi-TRP, a channel using a plurality of TCI states/spatial relations, multi-TRP being enabled by RRC/DCI, a plurality of TCI states/spatial relations being enabled by RRC/DCI, and at least one of single DCI-based multi-TRP and multi-DCI-based multi-TRP may be interchangeably interpreted. In the present disclosure, multi-DCI-based multi-TRP and a CORESET pool index (CORESETPoolIndex) value "1" being configured for a CORESET may be interchangeably interpreted. In the present disclosure, multi-TRP based on single DCI and at least one codepoint in a TCI field being mapped to two TCI states may be interchangeably interpreted.

In the present disclosure, TRP #1 (first TRP, TRP #0) may correspond to CORESET pool index=0, or may correspond to a first TCI state out of two TCI states corresponding to one codepoint of a TCI field. TRP #2 (second TRP, TRP #1) may correspond to CORESET pool index=1, or may correspond to a second TCI state out of the two TCI states corresponding to one codepoint of the TCI field.

In the present disclosure, a DMRS, a DMRS port, and an antenna port may be interchangeably interpreted.

In the present disclosure, QCL and QCL type D may be interchangeably interpreted.

In the present disclosure, a plurality of SS sets (SS set pair) having a linkage (association, connection) and SS sets linked to each other may mean that one SS set is linked to another SS set for PDCCH repetition via an RRC IE/MAC CE. An SS set (individual SS set) not having a linkage may mean that the SS set is unlinked to another SS set via an RRC IE/MAC CE.

In the present disclosure, "having a linkage," "linked," and "pair" may be interchangeably interpreted. In the present disclosure, "not having a linkage," "unlinked," and "individual" may be interchangeably interpreted.

In the present disclosure, SS sets linked to each other, CORESETs linked to each other, PDCCH candidates linked to each other, CORESETs associated with SS sets linked to each other, and PDCCH candidates in SS sets linked to each other may be interchangeably interpreted. In the present disclosure, two CORESETs linked to each other may mean two CORESETs associated with respective two SS sets linked to each other. In the present disclosure, two PDCCH candidates linked to each other may be two PDCCH candidates having the same aggregation level and the same candidate index in two SS sets linked to each other.

In the present disclosure, DL signal (PDSCH/PDCCH) reception using an SFN may mean at least one of use of identical time and frequency resources and reception of identical data (PDSCH) or control information (PDCCH) in reception from a plurality of TRPs. The DL signal reception using the SFN may mean at least one of use of identical time and frequency resources and reception of identical data or control information in reception using a plurality of TCI states/spatial domain filters/beams/QCLs.

Radio Communication Method

First Embodiment

An embodiment for issue 1 mentioned above will be described.

<<Aspect 1-1>> Case A (Case 1+Case 2)

A UE may follow either option 1 or option 2 below.

[Option 1]

Case A is not supported.

For example, if a CORESET pool index is configured (for an arbitrary (at least one) CORESET), configuration/activation of two TCI states for any CORESET fails.

In Rel. 16, if a CORESET pool index is configured for at least one CORESET, a CORESET pool index of a remaining CORESET (for which the CORESET pool index is not configured) is assumed to be 0.

[Option 2]

Case A can be configured. Case A may be configured depending on a UE capability.

The UE may follow at least one of option 2-1 to option 2-2 below.

[[Option 2-1]]

If a CORESET pool index is configured (for an arbitrary CORESET), an RRC IE/MAC CE can configure/activate two TCI states for one CORESET.

Option 2-1 may be employed in an arbitrary CORESET, or may be employed in an arbitrary CORESET except CORESET #0 (CORESET having index 0).

The UE may follow any one of choice 1 to choice 3 below.

[[[Choice 1]]] Two TCI states for one CORESET originate from different TRPs (are associated with different CORESET pool indices).

[[[Choice 2]]] Two TCI states for one CORESET originate from the same TRP (are associated with the same CORESET pool index).

[[[Choice 3]]] Two TCI states for one CORESET is not limited.

[[Option 2-2]]

If a CORESET pool index is configured for one CORESET, an RRC IE/MAC CE fails to configure/activate two TCI states for the CORESET. For a CORESET for which a CORESET pool index is not explicitly configured, the RRC IE/MAC CE can configure/activate two TCI states for the CORESET.

If a CORESET pool index is explicitly configured for one CORESET, the UE applies CORESET pool index=0 to the CORESET. Any one of choice 1 to choice 3 as those of option 2-1 may be employed in option 2-2.

A UE capability for at least one of option 2-1 to option 2-2 may be defined in specifications.

FIG. 2A is a diagram to show an example of choice 1 in option 2-1/option 2-2. In this example, CORESET pool index=0 is configured for each of CORESET #0, CORESET #1, and CORESET #2, and CORESET pool index=1 is configured for each of CORESET #4 and CORESET #5. Beam (TCI state) #1 is associated with CORESET pool index=0 (TRP #0), and beam (TCI state) #3 is associated with CORESET pool index=1 (TRP #1).

In choice 1, when two TCI states, TCI state #1 and TCI state #3, are activated for CORESET #2 from TRP #0, the two TCI states originate from respective different TRP #0 and TRP #1. When two TCI states, TCI state #1 and TCI state #3, are activated for CORESET #5 from TRP #1, the two TCI states originate from respective different TRP #0 and TRP #1. Here, there is a case where a TRP corresponding to a TCI state does not correspond to a CORESET pool index.

FIG. 2B is a diagram to show an example of choice 2 in option 2-1/option 2-2. In this example, CORESET pool index=0 is configured for each of CORESET #0, CORESET #1, and CORESET #2, and CORESET pool index=1 is configured for each of CORESET #4 and CORESET #5. Beam (TCI state) #1 and beam (TCI state) #2 are associated with CORESET pool index=0 (TRP #0), and beam (TCI state) #3 and beam (TCI state) #4 are associated with CORESET pool index=1 (TRP #1).

In choice 2, when two TCI states, TCI state #1 and TCI state #2, are activated for CORESET #2 from TRP #0, the two TCI states originate from same TRP #0. When two TCI states, TCI state #3 and TCI state #4, are activated for CORESET #5 from TRP #1, the two TCI states originate from same TRP #1. Here, there is a case where a TRP corresponding to a TCI state does not correspond to multi-TRP repetition using two TCI states.

<<Aspect 1-2>> Case B (Case 1+Case+3)

The UE may follow either option 1 or option 2 below.

[Option 1]

Case B is not supported.

For example, if a CORESET pool index is configured (for an arbitrary (at least one) CORESET), linking of any PDCCH candidate for repetition fails.

In Rel. 16, if a CORESET pool index is configured for at least one CORESET, a CORESET pool index of a remaining CORESET (for which the CORESET pool index is not configured) is assumed to be 0.

[Option 2]

Case B can be configured. Case B may be configured depending on a UE capability.

The UE may follow at least one of option 2-1 to option 2-3 below.

[[Option 2-1]]

If a CORESET pool index is configured (for an arbitrary CORESET), linking of two PDCCH candidates to each other for repetition may be configured, the two PDCCH candidates being from two CORESETs associated with the same CORESET pool index. This option is preferable for TDMed repetition.

[[Option 2-2]]

If a CORESET pool index is configured (for an arbitrary CORESET), linking of two PDCCH candidates to each other for repetition may be configured, the two PDCCH candidates being from two CORESETs associated with different CORESET pool indices. This option can be employed in TDMed/FDMed repetition.

[[Option 2-3]]

If a CORESET pool index is configured (for an arbitrary CORESET), there is no limitation on two PDCCH candidates linked to each other for repetition.

A UE capability for at least one of option 2-1 to option 2-3 may be defined in specifications.

Each option of option 2-1 to option 2-3 may be employed. For each option of option 2-1 to option 2-3, at least one of limitation 1 and limitation 2 below may be considered (depending on the UE capability).

[Limitation 1] A configurable maximum number of PDCCH candidates/CORESETs to be linked to each other with repetition for each CORESET pool index for each cell.

[Limitation 2] Repetition configuration is limited to only one certain CORESET pool index.

FIG. 3A is a diagram to show an example of option 2-1. In this example, CORESET pool index=0 is configured for each of CORESET #0, CORESET #1, and CORESET #2, and CORESET pool index=1 is configured for each of CORESET #4 and CORESET #5. For the repetition, CORESET #1 and CORESET #2 for which the same CORESET pool index is configured are linked to each other.

FIG. 3B is a diagram to show an example of option 2-2. In this example, CORESET pool index=0 is configured for each of CORESET #0, CORESET #1, and CORESET #2, and CORESET pool index=1 is configured for each of CORESET #4 and CORESET #5. For the repetition, CORESET #2 and CORESET #5 for which different CORESET pool indices are configured are linked to each other.

In terms of the CORESETs, there is no difference between single DCI-based multiple TRPs (Rel. 16) and a single DCI-based single TRP (Rel. 15). In case 3, when the single DCI-based multiple TRPs (Rel. 16) and the single DCI-based single TRP (Rel. 15) are distinguished from each other, PDSCH configuration may be considered. For example, if case 3 is configured by an RRC IE, whether the UE assumes that an enhanced TCI state activation/deactivation MAC CE for a UE-specific PDSCH (Enhanced TCI states Activation/Deactivation for UE-specific PDSCH MAC CE) for activating one or two TCI states for a codepoint of PDSCH scheduling DCI (TCI field) is received may follow either option 1 or option 2 below.

[Choice 1] The UE does not assume reception of the "enhanced" TCI state activation/deactivation MAC CE for the UE-specific PDSCH, and can receive only a TCI state activation/deactivation MAC CE for the UE-specific PDSCH (TCI states Activation/Deactivation for UE-specific PDSCH MAC CE).

[Choice 2] The UE can receive the "enhanced" TCI state activation/deactivation MAC CE for the UE-specific PDSCH. This may mean that PDCCH repetition for the single DCI-based multiple TRPs can be supported.

<<Aspect 1-3>> Case C (Case 2+Case 3)

The UE may follow either option 1 or option 2 below.

[Option 1]

Case C is not supported.

For example, if linking of two PDCCH candidates to each other for repetition is configured, configuration/activation of two TCI states for any CORESET fails.

[Option 2]

Case C can be configured. Case C may be configured depending on a UE capability.

The UE may follow at least one of option 2-1 to option 2-2 below.

[[Option 2-1]]

If linking of two PDCCH candidates (from two CORESETs) to each other for repetition is configured, only one TCI state is configured/activated for a CORESET having the linked PDCCH candidate. One or two TCI states can be configured/activated for a CORESET not having the linked PDCCH candidate.

[[Option 2-2]]

If linking of two PDCCH candidates (from two CORESETs) to each other for repetition is configured, one or two TCI states can be configured/activated for an arbitrary CORESET (even when the CORESET is a CORESET having the linked PDCCH candidate). The UE is required to simultaneously monitor two or more beams (TCI states).

A UE capability for at least one of option 2-1 to option 2-2 may be defined in specifications.

FIG. 4A is a diagram to show an example of option 2-1. In this example, CORESET #0, CORESET #1, and CORE- SET #2 are configured. For the repetition, CORESET #1 and CORESET #2 are linked to each other. Only one TCI state is configured/activated for each of CORESET #1 and CORESET #2. Two TCI states can be configured/activated for CORESET #0.

FIG. 4B is a diagram to show an example of option 2-2. In this example, CORESET #0, CORESET #1, and CORESET #2 are configured. For the repetition, CORESET #1 and CORESET #2 are linked to each other. For each of CORESET #1 and CORESET #2, there is no limitation of option 2-1, and two TCI states can be configured/activated. Two TCI states can be configured/activated for CORESET #0.

<<Aspect 1-4>> Case D (Case 1+Case 2+Case 3)

The UE may follow either option 1 or option 2 below.

[Option 1]

Case D is not supported. According to this option, operation is simplified.

[Option 2]

With limitation based on a combination of options in aspect 1-1 to aspect 1-3 mentioned above, case D can be supported. Case D may be configured depending on a UE capability.

For example, option 2-1 of aspect 1-3 may be employed in a certain CORESET pool index.

Figure 5:
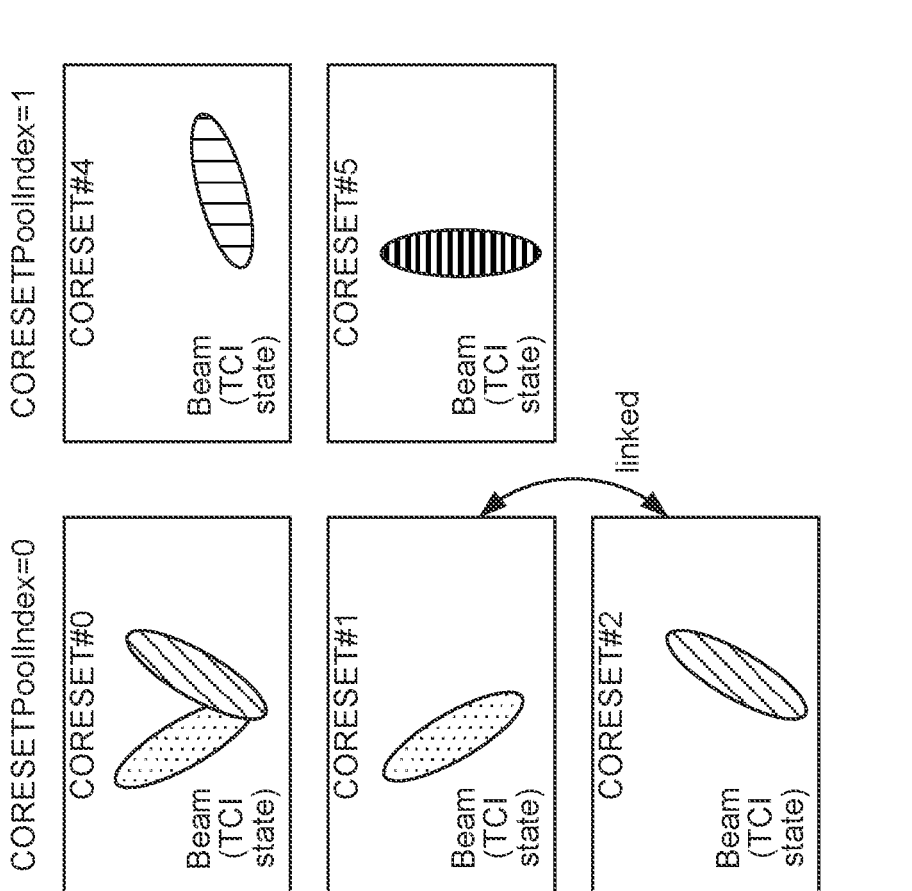
FIG. 5 is a diagram to show an example of aspect 1-4.

FIG. 5 is a diagram to show an example of case D. In this example, CORESET pool index=0 is configured for each of CORESET #0, CORESET #1, and CORESET #2, and CORESET pool index=1 is configured for each of CORESET #4 and CORESET #5. For the repetition, CORESET #1 and CORESET #2 for which the same CORESET pool index is configured are linked to each other. In this example, option 2-1 of aspect 1-3 is employed for CORESET pool index=0. Only one TCI state is configured/activated for each of CORESET #1 and CORESET #2. Two TCI states can be configured/activated for CORESET #0. Only one TCI state is configured/activated for each of CORESET #4 and CORESET #5.

<<Aspect 1-5>> Others

The above-mentioned options may be employed in other cases.

For example, at least one of variation 1 to variation 4 below may be employed.

[Variation 1] Option 2-1 of aspect 1-2 is employed in case B (case 1+case 3).

[Variation 2] Option 2-2 of aspect 1-2 is employed in case B (case 1+case 3).

[Variation 3] Option 2-3 of aspect 1-2 is employed in case B (case 1+case 3).

[Variation 4] Option 2-1 of aspect 1-3 is employed in case C (case 2+case 3).

According to this embodiment, whether two or more of case 1 to case 3 are configured simultaneously (in combination) is definite.

Second Embodiment

An embodiment for issue 2 mentioned above will be described.

A first embodiment may be employed in each case.

(Explicit) configuration/(implicit) determination of an RLM-RS/BFD-RS may follow at least one of determination method 1 to determination method 7 below.

[Determination method 1] An implicit RS determination rule for per-TRP BFR is applied to case 1 (case 2/case 3 does not occur, and only case 1 occurs).

[Determination method 2] A rule for implicit RS determination for per-cell BFR and per-TRP BFR is applied to case 2 (case 1/case 3 does not occur, and only case 2 occurs). In this case, whether different priorities are considered for a CORESET having two TCI states is an issue. Also, whether enhancement of BLER calculation for a PDCCH is necessary is an issue. Assumption for hypothetical (hypothetical) BLER calculation for the PDCCH may be either assumption 1 or assumption 2 below.

[[Assumption 1]] An RS or a CSI-RS/SSB in two TCI states is directly used for the BFD-RS.

[[Assumption 2]] A UE calculates one hypothetical BLER under SFN assumption for a BFD-RS pair.

[Determination method 3] Whether enhancement of a BFD-RS for each TRP is considered for case 3 (case 1/case 2 does not occur, and only case 3 occurs) is an issue. Also, whether different priorities for CORESETs linked to each other are considered is an issue.

[Determination method 4] When option 2-1 of aspect 1-2 is employed in case B (case 1+case 3), there is an issue similar to that in determination method 3.

[Determination method 5] When option 2-2 of aspect 1-2 is employed in case B (case 1+case 3), there is an issue similar to that in determination method 3.

[Determination method 6] When option 2-3 of aspect 1-2 is employed in case B (case 1+case 3), there is an issue similar to that in determination method 3.

[Determination method 7] When option 2-1 of aspect 1-3 is employed in case C (case 2+case 3), there is an issue similar to that in determination method 2 and determination method 3.

In the present disclosure, an implicit RS may, when an RS is not explicitly configured, indicate an RS selected/determined in accordance with a specific rule.

<<Aspect 2-1>>

In this aspect, case 2 is assumed. That is, up to two TCI states can be configured/activated for one CORESET by using an RRC IE/MAC CE.

How to determine an implicit RS for at least one of RLM and per-cell BFD is an issue. For example, whether different priorities are considered for a CORESET having two TCI states is an issue.

Determination of the implicit RS for at least one of the RLM and the per-cell BFD may follow at least one of option 0 to option 2 and variation 1 to variation 3 below.

[Option 0]

A rule similar to that in Rel. 16.

The UE selects, in order starting from the shortest monitoring periodicity (in ascending order of monitoring periodicities), N RSs provided for an active TCI state for PDCCH reception in a CORESET associated with an SS set having the monitoring periodicity. If more than one CORESET is associated with SS sets having the same monitoring periodicity, the UE determines RSs in CORESET order starting from the highest CORESET index (in descending order of CORESET indices).

[Option 1]

RSs are selected first in order of monitoring periodicities of SS sets, subsequently in order according to whether two TCI states are present, and subsequently in order of CORESET indices.

The UE selects, in order starting from the shortest monitoring periodicity (in ascending order of monitoring periodicities), N RSs provided for an active TCI state for PDCCH reception in a CORESET associated with an SS set having the monitoring periodicity. If more than one CORESET is associated with SS sets having the same monitoring periodicity, the UE determines an RS on the basis of a CORE- SET having two TCI states, and subsequently determines an RS on the basis of a CORESET having one TCI state.

The UE determines RSs in CORESET order starting from the highest CORESET index (in descending order of CORESET indices), out of a plurality of CORESETs having two TCI states. The UE determines RSs in CORESET order starting from the highest CORESET index (in descending order of CORESET indices), out of a plurality of CORESETs having one TCI state.

Figure 6:
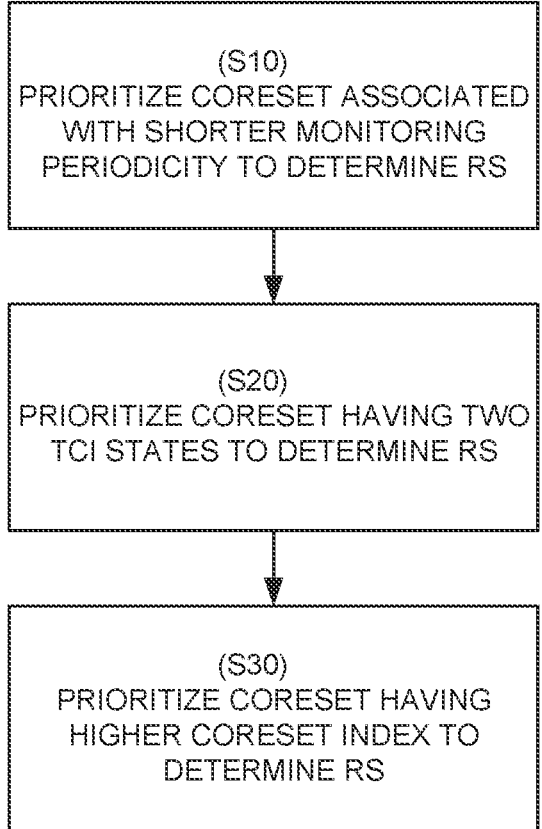
FIG. 6 is a diagram to show an example of option 1 of aspect 2-1.

In an example of FIG. 6, the UE preferentially selects a CORESET associated with a shorter monitoring periodicity, and determines an RS on the basis of a TCI state for the selected CORESET (S10). Subsequently, the UE preferentially selects, from CORESETs associated with the same monitoring periodicity, a CORESET having two TCI states, and determines an RS on the basis of a TCI state for the selected CORESET (S20). Subsequently, the UE preferentially selects, from CORESETs having a same number of TCI states, a CORESET having a higher CORESET index, and determines an RS on the basis of a TCI state for the selected CORESET (S30). The UE determines N RSs by performing this operation.

[Option 2]

RSs are selected first in order according to whether two TCI states are present, and subsequently in order of CORESET indices.

The UE selects N RSs provided for an active TCI state for PDCCH reception in a CORESET having two TCI states. Subsequently, the UE determines an RS on the basis of a CORESET having one TCI state.

The UE determines RSs in CORESET order starting from the highest CORESET index (in descending order of CORESET indices), out of a plurality of CORESETs having two TCI states. The UE determines RSs in CORESET order starting from the highest CORESET index (in descending order of CORESET indices), out of a plurality of CORESETs having one TCI state.

Figure 7:
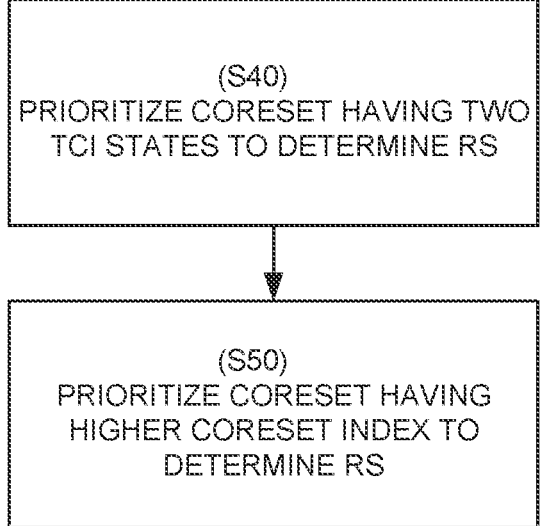
FIG. 7 is a diagram to show an example of option 2 of aspect 2-1.

In an example of FIG. 7, the UE preferentially selects a CORESET having two TCI states, and determines an RS on the basis of a TCI state for the selected CORESET (S40). Subsequently, the UE preferentially selects, from CORESETs having a same number of TCI states, a CORESET having a higher CORESET index, and determines an RS on the basis of a TCI state for the selected CORESET (S50). The UE determines N RSs by performing this operation.

[Variation 1]

In option 1/option 2, the UE first determines an RS on the basis of a CORESET having one TCI state, and subsequently determines an RS on the basis of a CORESET having two TCI states.

[Variation 2]

In option 1/option 2, the UE determines an RS on the basis of only a CORESET having one TCI state, or determines an RS on the basis of only a CORESET having two TCI states.

[Variation 3]

In option 1/option 2, the UE determines an RS by considering factors of the monitoring periodicities of the SS sets, the CORESET indices, and the number of TCI states for the CORESET. Switching between priorities (order) of these factors may be performed.

<<Aspect 2-2>>

In this aspect, case 2 is assumed. That is, up to two TCI states can be configured/activated for one CORESET by using an RRC IE/MAC CE.

How to determine an implicit RS for per-TRP BFD is an issue. For example, whether different priorities are considered for a CORESET having two TCI states is an issue.

Determination of the implicit RS for the per-TRP BFD may follow at least one of option 0 to option 2 and variation 1 to variation 3 below.

[Option 0]

A rule similar to that in Rel. 16.

For each TRP, the UE selects, in order starting from the shortest monitoring periodicity (in ascending order of monitoring periodicities), N RSs provided for an active TCI state for PDCCH reception in a CORESET associated with an SS set having the monitoring periodicity. If more than one CORESET is associated with SS sets having the same monitoring periodicity, the UE determines RSs in CORESET order starting from the highest CORESET index (in descending order of CORESET indices).

[Option 1]

RSs are selected first in order of monitoring periodicities of SS sets, subsequently in order according to whether two TCI states are present, and subsequently in order of CORESET indices.

For each TRP, the UE selects, in order starting from the shortest monitoring periodicity (in ascending order of monitoring periodicities), N RSs provided for an active TCI state for PDCCH reception in a CORESET associated with an SS set having the monitoring periodicity. If more than one CORESET is associated with SS sets having the same monitoring periodicity, the UE determines an RS on the basis of a CORESET having two TCI states, and subsequently determines an RS on the basis of a CORESET having one TCI state.

The UE determines RSs in CORESET order starting from the highest CORESET index (in descending order of CORESET indices), out of a plurality of CORESETs having two TCI states. The UE determines RSs in CORESET order starting from the highest CORESET index (in descending order of CORESET indices), out of a plurality of CORESETs having one TCI state.

[Option 2]

RSs are selected first in order according to whether two TCI states are present, and subsequently in order of CORESET indices.

For each TRP, the UE selects N RSs provided for an active TCI state for PDCCH reception in a CORESET having two TCI states. Subsequently, the UE determines an RS on the basis of a CORESET having one TCI state.

The UE determines RSs in CORESET order starting from the highest CORESET index (in descending order of CORESET indices), out of a plurality of CORESETs having two TCI states. The UE determines RSs in CORESET order starting from the highest CORESET index (in descending order of CORESET indices), out of a plurality of CORESETs having one TCI state.

[Variation 1]

In option 1/option 2, the UE first determines an RS on the basis of a CORESET having one TCI state, and subsequently determines an RS on the basis of a CORESET having two TCI states.

[Variation 2]

In option 1/option 2, the UE determines an RS on the basis of only a CORESET having one TCI state, or determines an RS on the basis of only a CORESET having two TCI states.

[Variation 3]

In option 1/option 2, the UE determines an RS by considering factors of the monitoring periodicities of the SS sets, the CORESET indices, and the number of TCI states for the CORESET. Switching between priorities (order) of these factors may be performed.

<<Aspect 2-3>>

In this aspect, case 2 is assumed. That is, up to two TCI states can be configured/activated for one CORESET by using an RRC IE/MAC CE.

In RLM/BFD, assumption for hypothetical BLER calculation for a PDCCH is an issue. For example, whether a BLER is calculated under SFN assumption using two RLM/BFD RSs in two TCI states for one CORESET is an issue.

In at least one of RLM and per-cell BFD, the UE may follow, for a CORESET having two TCI states, either option 1 or option 2 below.

[Option 1]

The UE calculates one hypothetical BLER under SFN assumption for an RLM/BFD RS in two TCI states for the CORESET.

[Option 2]

The UE calculates a hypothetical BLER under assumption for each RLM/BFD RS in each TCI state for the CORESET.

In per-TRP BFD, the UE may follow, for a CORESET having two TCI states, either option 1 or option 2 below.

[Option 1]

The UE calculates one hypothetical BLER under SFN assumption for an RLM/BFD RS in two TCI states for the CORESET. In an SFN, the UE can receive at least one SFN PDCCH. For example, when any of SFN PDCCHs has an extremely low SNR, SFN PDCCH reception is equivalent to one PDCCH reception.

[Option 2]

The UE calculates a hypothetical BLER under assumption for each RLM/BFD RS in each TCI state for the CORESET.

In the SFN PDCCH (if one TCI state is configured for the CORESET), the UE may always receive an SFN PDCCH, and option 1 may be employed. In PDCCH reception (if two SS sets are linked to each other, and are associated with the same CORESET/different CORESETs), the UE may always receive one PDCCH, and option 2 may be employed.

<<Aspect 2-4>>

In this aspect, case 3 is assumed. That is, for PDCCH repetition, two PDCCH candidates in two SS sets are linked to each other, and each SS set is associated with a corresponding CORESET.

How to determine an implicit RS for RLM/BFD is an issue. For example, whether different priorities are considered for two SS sets/CORESETs linked to each other is an issue.

Determination of the implicit RS for at least one of the RLM and the per-cell BFD may follow at least one of option 0 to option 3 and variation 1 to variation 3 below.

[Option 0]

A rule similar to that in Rel. 16.

The UE selects, in order starting from the shortest monitoring periodicity (in ascending order of monitoring periodicities), N RSs provided for an active TCI state for PDCCH reception in a CORESET associated with an SS set having the monitoring periodicity. If more than one CORESET is associated with SS sets having the same monitoring periodicity, the UE determines RSs in CORESET order starting from the highest CORESET index (in descending order of CORESET indices).

[Option 1]

RSs are selected first in order of monitoring periodicities of SS sets, subsequently in order according to whether linking is performed, and subsequently in order of CORESET indices.

The UE selects, in order starting from the shortest monitoring periodicity (in ascending order of monitoring periodicities), N RSs provided for an active TCI state for PDCCH reception in a CORESET associated with an SS set having the monitoring periodicity. If more than one CORESET is associated with SS sets having the same monitoring periodicity, the UE determines an RS on the basis of CORESETs associated with SS sets linked to each other for repetition (CORESETs linked to each other), and subsequently determines an RS on the basis of a CORESET associated with an SS set not having a linkage (CORESET not having a linkage).

The UE determines RSs in CORESET order starting from the highest CORESET index (in descending order of CORESET indices), out of CORESETs associated with SS sets linked to each other (CORESETs linked to each other). The UE determines RSs in CORESET order starting from the highest CORESET index (in descending order of CORESET indices), out of CORESETs associated with SS sets not having linkages (CORESETs not having linkages).

[Option 2]

RSs are selected first in order according to whether linking is performed, and subsequently in order of CORESET indices.

The UE selects N RSs provided for an active TCI state for PDCCH reception in CORESETs associated with SS sets linked to each other (CORESETs linked to each other). Subsequently, the UE determines an RS on the basis of a CORESET associated with an SS set not having a linkage (CORESET not having a linkage).

The UE determines RSs in CORESET order starting from the highest CORESET index (in descending order of CORESET indices), out of CORESETs associated with SS sets linked to each other (CORESETs linked to each other). The UE determines RSs in CORESET order starting from the highest CORESET index (in descending order of CORESET indices), out of CORESETs associated with SS sets not having linkages (CORESETs not having linkages).

[Option 3]

RSs are selected first in order according to whether linking is performed, subsequently in order of monitoring periodicities of SS sets, and subsequently in order of CORESET indices.

The UE selects N RSs provided for an active TCI state for PDCCH reception in CORESETs associated with SS sets linked to each other (CORESETs linked to each other). Subsequently, the UE determines an RS on the basis of a CORESET associated with an SS set not having a linkage (CORESET not having a linkage).

The UE first determines, in order starting from the shortest monitoring periodicity (in ascending order of monitoring periodicities), RSs in a CORESET associated with an SS set having the monitoring periodicity and subsequently determines RSs in CORESET order starting from the highest CORESET index (in descending order of CORESET indices), out of SS sets linked to each other (CORESETs associated with the SS sets linked to each other). The UE first determines, in order starting from the shortest monitoring periodicity (in ascending order of monitoring periodicities), RSs in a CORESET associated with an SS set having the monitoring periodicity and subsequently determines RSs in CORESET order starting from the highest CORESET index (in descending order of CORESET indices), out of CORESETs associated with SS sets not having linkages (CORESETs not having linkages).

[Variation 1]

In option 1/option 2, the UE first determines an RS on the basis of a CORESET/SS set not having a linkage, and subsequently determines an RS on the basis of CORESETs/SS sets linked to each other.

[Variation 2]

In option 1/option 2, the UE determines an RS on the basis of only CORESETs/SS sets linked to each other, or determines an RS on the basis of only a CORESET/SS set not having a linkage.

[Variation 3]

In option 1/option 2, the UE determines an RS by considering factors of the monitoring periodicities of the SS sets, the CORESET indices, and whether the CORESET/SS set has a linkage. Switching between priorities (order) of these factors may be performed.

<<Aspect 2-5>>

In this aspect, case 3 is assumed. That is, for PDCCH repetition, two PDCCH candidates in two SS sets are linked to each other, and each SS set is associated with a corresponding CORESET.

How to determine an implicit RS for per-TRP BFD is an issue. For example, whether different priorities are considered for two SS sets/CORESETs linked to each other is an issue.

Determination of the implicit RS for the per-TRP BFD may follow at least one of option 0 to option 3 and variation 1 to variation 3 below.

[Option 0]

A rule similar to that in Rel. 16.

For each TRP, the UE selects, in order starting from the shortest monitoring periodicity (in ascending order of monitoring periodicities), N RSs provided for an active TCI state for PDCCH reception in a CORESET associated with an SS set having the monitoring periodicity. If more than one CORESET is associated with SS sets having the same monitoring periodicity, the UE determines RSs in CORESET order starting from the highest CORESET index (in descending order of CORESET indices).

[Option 1]

RSs are selected first in order of monitoring periodicities of SS sets, subsequently in order according to whether linking is performed, and subsequently in order of CORESET indices.

For each TRP, the UE selects, in order starting from the shortest monitoring periodicity (in ascending order of monitoring periodicities), N RSs provided for an active TCI state for PDCCH reception in a CORESET associated with an SS set having the monitoring periodicity. If more than one CORESET is associated with SS sets having the same monitoring periodicity, the UE determines an RS on the basis of CORESETs associated with SS sets linked to each other for repetition (CORESETs linked to each other), and subsequently determines an RS on the basis of a CORESET associated with an SS set not having a linkage (CORESET not having a linkage).

The UE determines RSs in CORESET order starting from the highest CORESET index (in descending order of CORESET indices), out of CORESETs associated with SS sets linked to each other (CORESETs linked to each other). The UE determines RSs in CORESET order starting from the highest CORESET index (in descending order of CORESET indices), out of CORESETs associated with SS sets not having linkages (CORESETs not having linkages).

[Option 2]

RSs are selected first in order according to whether linking is performed, and subsequently in order of CORESET indices.

For each TRP, the UE selects N RSs provided for an active TCI state for PDCCH reception in CORESETs associated with SS sets linked to each other (CORESETs linked to each other). Subsequently, the UE determines an RS on the basis of a CORESET associated with an SS set not having a linkage (CORESET not having a linkage).

The UE determines RSs in CORESET order starting from the highest CORESET index (in descending order of CORESET indices), out of CORESETs associated with SS sets linked to each other (CORESETs linked to each other). The UE determines RSs in CORESET order starting from the highest CORESET index (in descending order of CORESET indices), out of CORESETs associated with SS sets not having linkages (CORESETs not having linkages).

[Option 3]

RSs are selected first in order according to whether linking is performed, subsequently in order of monitoring periodicities of SS sets, and subsequently in order of CORESET indices.

For each TRP, the UE selects N RSs provided for an active TCI state for PDCCH reception in CORESETs associated with SS sets linked to each other (CORESETs linked to each other). Subsequently, the UE determines an RS on the basis of a CORESET associated with an SS set not having a linkage (CORESET not having a linkage).

The UE first determines, in order starting from the shortest monitoring periodicity (in ascending order of monitoring periodicities), RSs in a CORESET associated with an SS set having the monitoring periodicity and subsequently determines RSs in CORESET order starting from the highest CORESET index (in descending order of CORESET indices), out of SS sets linked to each other (CORESETs associated with the SS sets linked to each other). The UE first determines, in order starting from the shortest monitoring periodicity (in ascending order of monitoring periodicities), RSs in a CORESET associated with an SS set having the monitoring periodicity and subsequently determines RSs in CORESET order starting from the highest CORESET index (in descending order of CORESET indices), out of CORESETs associated with SS sets not having linkages (CORESETs not having linkages).

[Variation 1]

In option 1/option 2, the UE first determines an RS on the basis of a CORESET/SS set not having a linkage, and subsequently determines an RS on the basis of CORESETs/SS sets linked to each other.

[Variation 2]

In option 1/option 2, the UE determines an RS on the basis of only CORESETs/SS sets linked to each other, or determines an RS on the basis of only a CORESET/SS set not having a linkage.

[Variation 3]

In option 1/option 2, the UE determines an RS by considering factors of the monitoring periodicities of the SS sets, the CORESET indices, and whether the CORESET/SS set has a linkage. Switching between priorities (order) of these factors may be performed.

<<Aspect 2-6>>

In this aspect, case B (case 1+case 3) is assumed.

How to determine an implicit RS for RLM/BFD is an issue.

Determination of the implicit RS for at least one of the RLM and the per-cell BFD may be similar to that of aspect 2-4.

Determination of the implicit RS for the per-TRP BFD may be similar to that of aspect 2-5.

<<Aspect 2-7>>

In this aspect, case C (case 2+case 3) is assumed.

How to determine an implicit RS for RLM/BFD is an issue.

Determination of the implicit RS for at least one of the RLM and the per-cell BFD may further follow, on the basis of aspect 2-1 and aspect 2-4, either choice 1 or choice 2 below.

[Choice 1]

The CORESET having two TCI states has a higher priority than the CORESETs linked to each other for the repetition. The UE selects N RSs provided for an active TCI state for PDCCH reception first in order starting from the CORESET having two TCI states, subsequently in order starting from the linked CORESETs associated with SS sets linked to each other for the repetition, and subsequently in order starting from the CORESET having one TCI state or from the CORESET not having the linkage.

[Choice 2]

The CORESET having two TCI states has a lower priority than the CORESETs linked to each other for the repetition. The UE selects N RSs provided for an active TCI state for PDCCH reception first in order starting from the linked CORESETs associated with the SS sets linked to each other for the repetition, subsequently in order starting from the CORESET having two TCI states, and subsequently in order starting from the CORESET having one TCI state or from the CORESET not having the linkage.

Determination of the implicit RS for the per-TRP BFD may further follow, on the basis of aspect 2-2 and aspect 2-5, either choice 1 or choice 2 below.

[Choice 1]

The CORESET having two TCI states has a higher priority than the CORESETs linked to each other for the repetition. For each TRP, the UE selects N RSs provided for an active TCI state for PDCCH reception first in order starting from the CORESET having two TCI states, subsequently in order starting from the linked CORESETs associated with SS sets linked to each other for the repetition, and subsequently in order starting from the CORESET having one TCI state or from the CORESET not having the linkage.

[Choice 2]

The CORESET having two TCI states has a lower priority than the CORESETs linked to each other for the repetition. For each TRP, the UE selects N RSs provided for an active TCI state for PDCCH reception first in order starting from the linked CORESETs associated with the SS sets linked to each other for the repetition, subsequently in order starting from the CORESET having two TCI states, and subsequently in order starting from the CORESET having one TCI state or from the CORESET not having the linkage.

[Variations]

In the determination of the implicit RS for at least one of the RIM and the per-cell BFD or in the determination of the implicit RS for the per-TRP BFD, the UE determines RSs by considering factors of the monitoring periodicities of the SS sets, the CORESET indices, the number of TCI states for the CORESET, and whether the CORESET/SS set has a linkage. Switching between priorities (order) of these factors may be performed.

A UE capability indicating whether to support the determination of the implicit RS for the per-cell/per-TRP BFD may be defined in specifications.

<<Aspect 2-8>>

Switching between aspect 2-1 and aspect 2-2 or switching between aspect 2-4 and aspect 2-5, that is, switching between per-cell BFR and per-TRP BFR will be described.

The switching may be configured by higher layer signaling. For example, when a BFD-RS is explicitly configured/ provided for the UE, the UE may follow at least one of operation 1 and operation 2 below.

[Operation 1]

If the per-TRP BFR is configured for the UE by the higher layer signaling, the UE (implicitly) derives a BFD-RS for the per-TRP BFR (implicit RS determination).

[Operation 2]

If the per-cell BFR is configured for the UE by the higher layer signaling, the UE (implicitly) derives a BFD-RS for the per-cell BFR (implicit RS determination).

Third Embodiment

An embodiment for issue 3 mentioned above will be described.

When contention between a plurality of QCL type D RSs used for respective receptions of a plurality of downlink signals (for example, PDCCHs, PDSCHs, SSBs, or CSI-RSs) occurs, the UE may control, on the basis of information related to a PDCCH/CORESET (for example, an RRC IE/MAC CE), reception of one or more downlink signals using the one or more QCL type D RSs, out of the plurality of downlink signals.

The first embodiment may be employed in each case.

In case 3 (case 1/case 2 does not occur, and only case 3 occurs), enhancement related to a case of TDM repetition is an issue. For example, whether a higher priority is given to CORESETs linked to each other for TDM PDCCH repetition is an issue.

In case B (case 1+case 3), when one CORESET/QCL type D having a higher priority is determined for each CORESET pool index, enhancement related to a case of FDM repetition is an issue.

In case C (case 2+case 3), a priority between CORESETs linked to each other for the FDM repetition and a CORESET having two TCI states is an issue.

<<Aspect 3-1>>

In this aspect, case 3 is assumed. It may be assumed that the UE can perform reception using only one QCL type D. It may be assumed that one CORESET/QCL type D with the highest priority is determined in one monitoring occasion.

Handling for QCL type D contention is an issue. For example, whether a higher priority is given to CORESETs linked to each other for TDM PDCCH repetition is an issue.

When a plurality of CORESETs having different QCL types D are present in monitoring occasions overlapping with each other, the UE may follow either option 0 or option 1 below in order to determine which CORESET is monitored by the UE. The UE can monitor a CORESET with the highest priority and a CORESET having the same QCL type D as that of the CORESET with the highest priority.

[Option 0]

A rule similar to that in Rel. 16.

Firstly, a CSS set has a higher priority than a USS set. Secondly, an SS set having a lower index has a higher priority than an SS set having a higher index.

[Option 1]

Firstly, a CSS set has a higher priority than a USS set. Secondly, if one of CORESETs/SS sets linked to each other has been monitored in an earlier (past) monitoring occasion, a CORESET/SS set linked to that CORESET/SS set has a higher priority than another CORESET/SS set in a later (future) monitoring occasion.

Thirdly, at least one of option 1-1 and option 1-2 below may be employed in a plurality of CORESETs/SS sets having the same priority level on the basis of this rule.

[[Option 1-1]]

An SS set having a lower ID has a higher priority than an SS set having a higher ID.

[[Option 1-2]]

An SS set having a lower ID of an SS set pair has a higher priority than an SS set having a higher ID of the SS set pair. The ID of the SS set pair may be a lower ID of an SS set out of a pair of SS sets linked to each other.

A CSS set has a higher priority than a USS set. Respective different options out of option 0 and option 1 may be employed in the CSS set and the USS set. For example, option 0 may be employed in the CSS set, and option 1 may be employed in the USS set.

[Variations]

In handling for PDCCH QCL type D contention, factors of whether an SS set is the CSS set or the USS set, whether an SS set ID is higher or lower, whether the SS set ID is higher or lower than the ID of the SS set pair, whether SS sets/CORESETs are linked to each other for the repetition, and whether one of SS sets/CORESETs linked to each other in an earlier monitoring occasion has been monitored are considered. Switching between priorities (order) of these factors may be performed.

Figure 8:
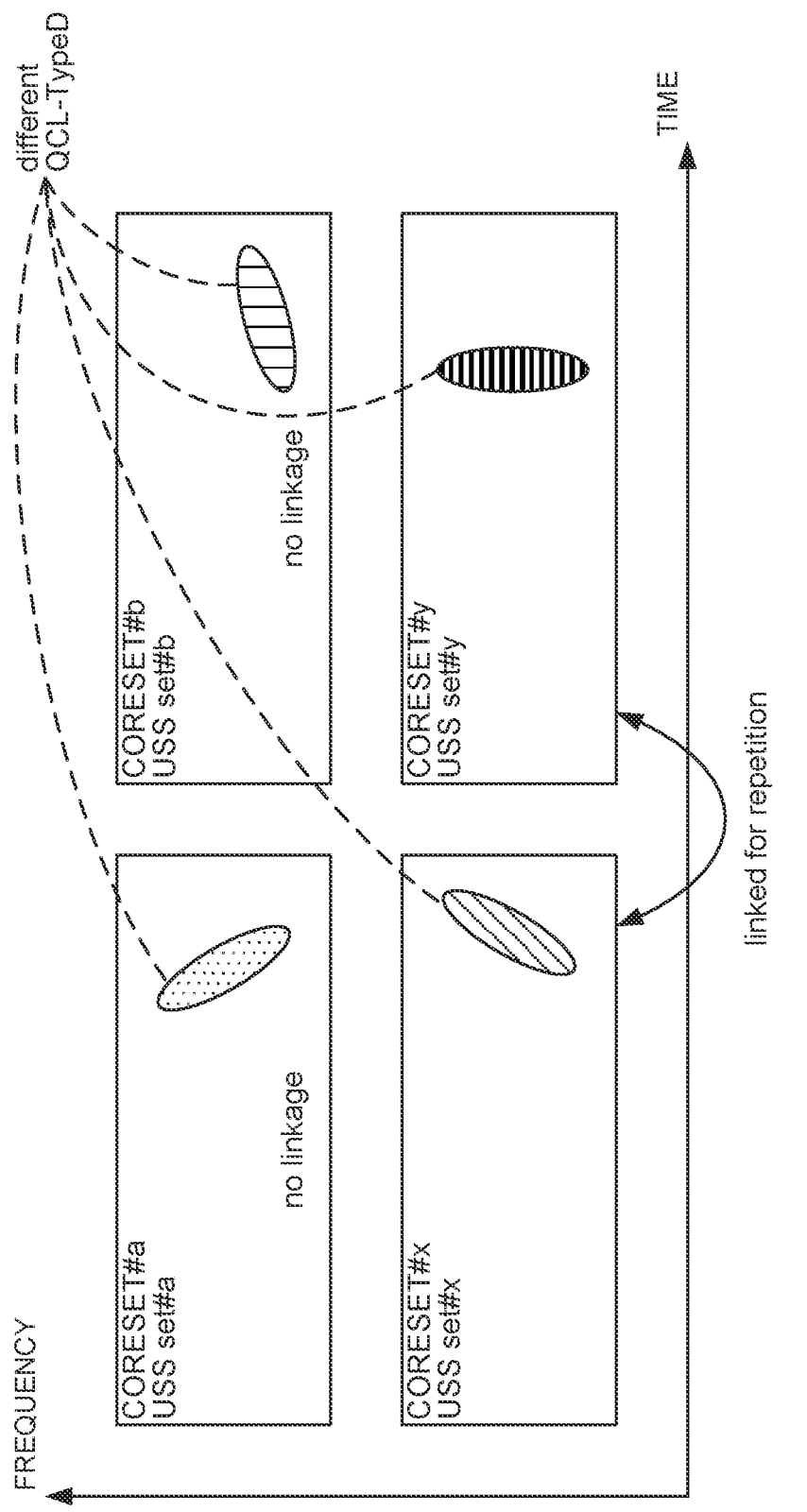
FIG. 8 is a diagram to show an example of aspect 3-1.

FIG. 8 is a diagram to show an example of aspect 3-1. CORESET #a is associated with USS set #a. CORESET #b is associated with USS set #b. CORESET #x is associated with USS set #x. CORESET #y is associated with USS set #y. CORESET #a and CORESET #b overlap with each other in a frequency. CORESET #x and CORESET #y overlap with each other in a frequency. CORESET #a and CORE-SET #x overlap with each other in a time. CORESET #b and CORESET #y overlap with each other in a time. CORESET #a and CORESET #b (USS set #a and USS set #b) do not have linkages. CORESET #x and CORESET #y (USS set #x and USS set #y) are mutually linked to each other for repetition. CORESET #a, CORESET #b, CORESET #x, and CORESET #y are associated with different QCL types D.

In this example, assume that USS set ID #a>USS set ID #x and USS set ID #b<USS set ID #y.

According to option 0, CORESET #x/USS set #x is monitored in an earlier monitoring occasion, and CORESET #b/USS set #b is monitored in a later monitoring occasion.

According to option 1, CORESET #x/USS set #x is monitored in an earlier monitoring occasion, and CORESET #y/USS set #y is monitored in a later monitoring occasion.

<<Aspect 3-2>>

In this aspect, case B (case 1+case 3) is assumed. Considering FDM PDCCH repetition, CORESETs linked to each other may be associated with different CORESET pool indices. It may be assumed that the UE can perform reception using two QCL types D. It may be assumed that one CORESET/QCL type D with the highest priority is determined for each CORESET pool index.

Handling for QCL type D contention is an issue. For example, whether a higher priority is given to CORESETs linked to each other for FDM PDCCH repetition is an issue.

When a plurality of CORESETs having different QCL types D are present in monitoring occasions overlapping with each other, the UE may follow any one of option 0 to option 2 below in order to determine which CORESET is monitored by the UE. The UE can monitor a CORESET with the highest priority and a CORESET having the same QCL type D as that of the CORESET with the highest priority.

[Option 0]

Firstly, for a plurality of CORESETs having respective CORESET pool indices, a CSS set has a higher priority than a USS set. Secondly, an SS set having a lower index has a higher priority than an SS set having a higher index.

[Option 1]

Firstly, for a plurality of CORESETs having respective CORESET pool indices, a CSS set has a higher priority than a USS set. Secondly, CORESETs/SS sets linked to each other have a higher priority than a CORESET/SS set not having a linkage.

Thirdly, at least one of option 1-1 and option 1-2 below may be employed in a plurality of CORESETs/SS sets having the same priority level on the basis of this rule.

[[Option 1-1]]

An SS set having a lower ID has a higher priority than an SS set having a higher ID.

[[Option 1-2]]

An SS set having a lower ID of an SS set pair has a higher priority than an SS set having a higher ID of the SS set pair. The ID of the SS set pair may be a lower ID of an SS set out of a pair of SS sets linked to each other.

[Option 2]

Firstly, for a plurality of CORESETs having respective CORESET pool indices, a CSS set has a higher priority than a USS set. Secondly, an SS set having a lower ID has a higher priority than an SS set having a higher ID.

Here, if CORESET pool index=0 (or 1), and one of the SS sets/CORESETs linked to each other (SS set #x/CORESET #x) is monitored, this priority rule is ignored for CORESET pool index=1 (or 0), and another of the SS sets/CORESETs linked to each other (SS set #y/CORESET #y) has a higher priority than another SS set/CORESET.

Thirdly, at least one of option 1-1 and option 1-2 below may be employed in a plurality of CORESETs/SS sets having the same priority level on the basis of this rule.

[[Option 1-1]]

An SS set having a lower ID has a higher priority than an SS set having a higher ID.

[[Option 1-2]]

An SS set having a lower ID of an SS set pair has a higher priority than an SS set having a higher ID of the SS set pair. The ID of the SS set pair may be a lower ID of an SS set out of a pair of SS sets linked to each other.

A CSS set has a higher priority than a USS set. Respective different options out of option 0 to option 2 may be employed in the CSS set and the USS set. For example, option 0 may be employed in the CSS set, and option 1 may be employed in the USS set.

[Variations]

In handling for PDCCH QCL type D contention, factors of whether an SS set is the CSS set or the USS set, whether an SS set ID is higher or lower, whether the SS set ID is higher or lower than the ID of the SS set pair, whether SS sets/CORESETs are linked to each other for the FDM repetition, and whether one of the SS sets/CORESETs linked to each other has been monitored are considered. Switching between priorities (order) of these factors may be performed.

Figure 9:
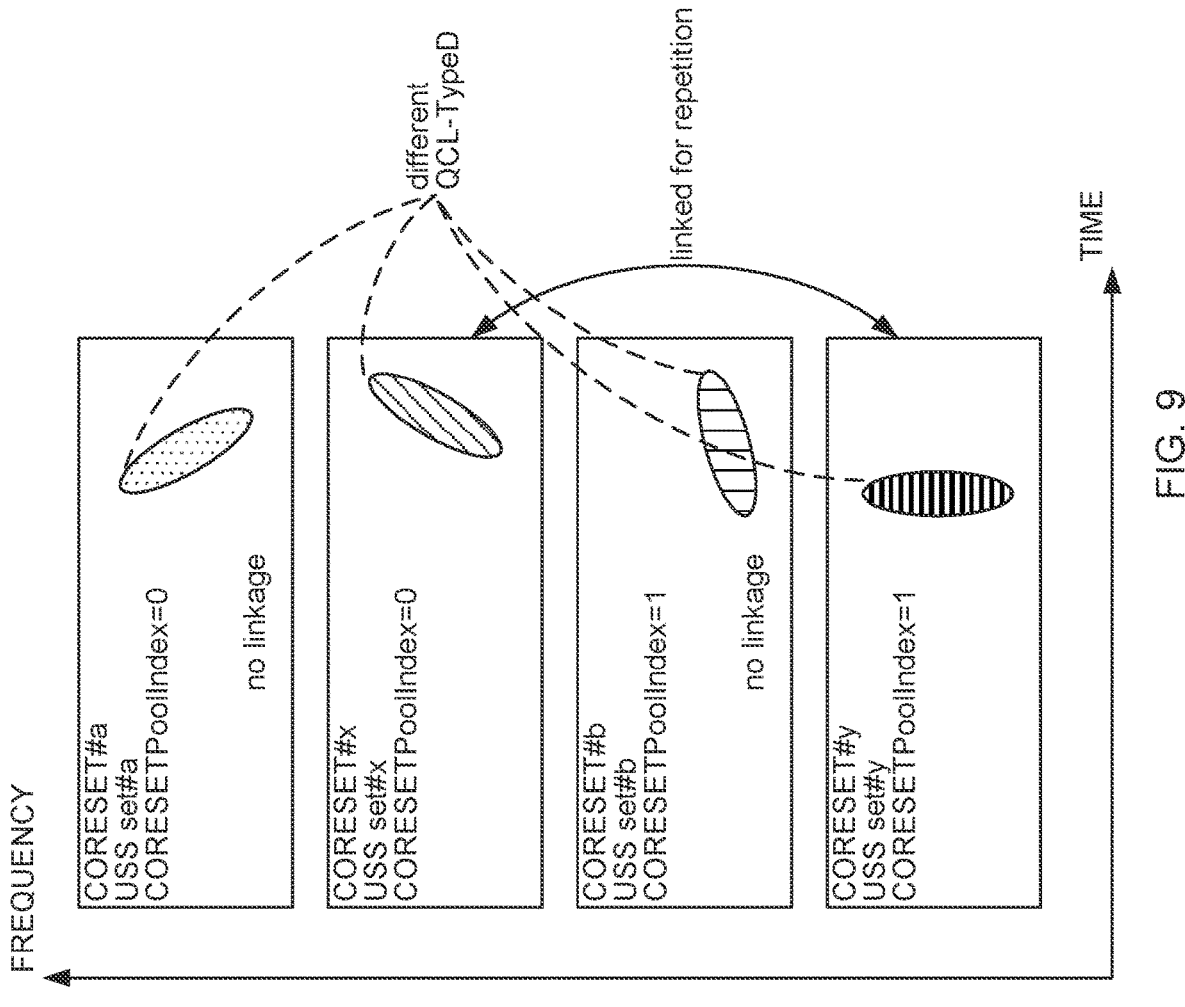
FIG. 9 is a diagram to show an example of aspect 3-2.

FIG. 9 is a diagram to show an example of aspect 3-2. CORESET #a is associated with USS set #a. CORESET #b is associated with USS set #b. CORESET #x is associated with USS set #x. CORESET #y is associated with USS set #y. CORESET #a and CORESET #x are associated with CORESET pool index=0. CORESET #b and CORESET #y are associated with CORESET pool index=1. CORESET #a, CORESET #x, CORESET #b, and CORESET #y overlap with each other in a frequency. CORESET #a and CORE-SET #b (USS set #x and USS set #y) do not have linkages. CORESET #x and CORESET #y (USS set #x and USS set #y) are mutually linked to each other for repetition. CORE- SET #a, CORESET #b, CORESET #x, and CORESET #y are associated with different QCL types D.

In a first example, assume that USS set ID #a>USS set ID #x and USS set ID #b<USS set ID #y.

According to option 0, CORESET #x/USS set #x is monitored for CORESET pool index=0, and CORESET #b/USS set #b is monitored for CORESET pool index=1.

According to option 1, CORESET #x/USS set #x is monitored for CORESET pool index=0, and CORESET #y/USS set #y is monitored for CORESET pool index=1.

According to option 2, CORESET #x/USS set #x is monitored for CORESET pool index=0, and CORESET #y/USS set #y is monitored for CORESET pool index=1.

In a second example, assume that USS set ID #a<USS set ID #x and USS set ID #b<USS set ID #y.

According to option 0, CORESET #a/USS set #a is monitored for CORESET pool index=0, and CORESET #b/USS set #b is monitored for CORESET pool index=1.

According to option 1, CORESET #x/USS set #x is monitored for CORESET pool index=0, and CORESET #y/USS set #y is monitored for CORESET pool index=1.

According to option 2, CORESET #a/USS set #a is monitored for CORESET pool index=0, and CORESET #b/USS set #b is monitored for CORESET pool index=1.

<<Aspect 3-3>>

In this aspect, case C (case 2+case 3) is assumed. It may be assumed that the UE can perform reception using two QCL types D. It may be assumed that two CORESETs/QCL types D with higher priorities are determined in each monitoring occasion.

Handling for QCL type D contention is an issue. For example, whether CORESETs linked to each other for FDM PDCCH repetition or a CORESET having two TCI states has a higher priority is an issue.

When a plurality of CORESETs having different QCL types D are present in monitoring occasions overlapping with each other, the UE may follow the following option in order to determine which CORESET is monitored by the UE. The UE can monitor a CORESET with the highest priority and a CORESET having the same QCL type D as that of the CORESET with the highest priority.

[Operation]

Embodiment Y mentioned below may be employed for a priority between a CORESET having two TCI states and a CORESET having one TCI state and for a priority between CORESETs linked to each other for FDM repetition and a CORESET not having a linkage.

Either option 1 or option 2 below may be employed between a CORESET having two TCI states and CORESETs/SS sets linked to each other for the FDM repetition.

[[Option 1]]

The CORESET having two TCI states has a higher priority than the CORESETs/SS sets linked to each other for the FDM repetition.

[[Option 2]]

The CORESETs/SS sets linked to each other for the FDM repetition have a higher priority than the CORESET having two TCI states.

[Variations]

In handling for PDCCH QCL type D contention, factors of whether an SS set is the CSS set or the USS set, whether an SS set ID is higher or lower, whether the SS set ID is higher or lower than the ID of the SS set pair, whether two TCI states are activated for a CORESET, whether SS sets/CORESETs are linked to each other for the FDM repetition, and whether one of the SS sets/CORESETs linked to each other has been monitored are considered. Switching between priorities (order) of these factors may be performed.

<<Aspect 3-4>>

At least one of assumption 1 to assumption 3 below may be assumed.

[Assumption 1]

Case 3 is assumed. Coexistence of the TDM repetition and the FDM repetition may be assumed.

It may be assumed that the UE can perform reception using two QCL types D. It may be assumed that two CORESETs/QCL types D with higher priorities are determined in each monitoring occasion.

Handling for QCL type D contention is an issue. For example, whether CORESETs linked to each other for TDM PDCCH repetition have a higher priority is an issue.

Aspect 3-1 may be employed. It is assumed that two CORESETs/SS sets with higher priorities are determined in each monitoring occasion.

Embodiment Y for the FDM repetition mentioned below may be employed in determination of the priority.

[Assumption 2]

Case B (case 1+case 3) is assumed.

It may be assumed that the UE can perform reception using two QCL types D. It may be assumed that one CORESET/QCL type D with the highest priority is determined in each monitoring occasion.

Handling for QCL type D contention is an issue. For example, whether CORESETs linked to each other for TDM PDCCH repetition have a higher priority is an issue.

Aspect 3-1 may be employed. It is assumed that one CORESET/SS set with the highest priority is determined in each monitoring occasion.

Embodiment X mentioned below may be employed in determination of the priority. Furthermore, aspect 3-2 may be employed.

[Assumption 3]

Case C (case 2+case 3) is assumed.

It may be assumed that the UE can perform reception using two QCL types D. It may be assumed that two CORESETs/QCL types D with the highest priority are determined in each monitoring occasion.

Handling for QCL type D contention is an issue. For example, whether CORESETs linked to each other for TDM PDCCH repetition have a higher priority is an issue.

Aspect 3-1 may be employed. It is assumed that two CORESETs/SS sets with the highest priority are determined in each monitoring occasion.

Embodiment Y mentioned below may be employed in determination of the priority. Furthermore, aspect 3-3 may be employed.

<<Aspect 3-5>>

At least one of aspect 3-1 to aspect 3-4 may be employed in handling for QCL type D contention between a PDCCH and another channel/RS (for example, an SSB/PDSCH/CSI-RS) in addition to QCL type D contention between a PDCCH and a PDCCH.

For example, when the contention occurs in some cases, CORESETs/SS sets linked to each other for the TDM/FDM PDCCH repetition may have a higher priority than another channel/RS (for example, an SSB/PDSCH/CSI-RS). Alternatively, when the contention occurs, CORESETs/SS sets linked to each other for a CSS set for the TDM/FDM PDCCH repetition may have a higher priority than another channel/RS (for example, an SSB/PDSCH/CSI-RS).

For example, when the contention occurs in some cases, a CORESET having two TCI states may have a higher priority than another channel/RS (for example, an SSB/

PDSCH/CSI-RS). Alternatively, when the contention occurs, a CORESET having two TCI states for the CSS set may have a higher priority than another channel/RS (for example, an SSB/PDSCH/CSI-RS).

A UE capability for each case may be defined in specifications.

According to this embodiment, a CORESET/QCL type D prioritized for QCL type D contention is definite.

Fourth Embodiment

A higher layer parameter (RRC information element)/UE capability corresponding to at least one function (characteristic, feature) in each embodiment may be defined. The UE capability may indicate whether to support this function.

A UE for which the higher layer parameter corresponding to the function is configured may perform the function. "A case that a UE for which the higher layer parameter corresponding to the function is not configured does not perform the function (for example, employs operation in Rel. 15/16)" may be defined.

A UE that has reported the UE capability indicating that the function is supported may perform the function. "A case that a UE that has not reported the UE capability indicating that the function is supported does not perform the function (for example, employs operation in Rel. 15/16)" may be defined.

When a UE has reported the UE capability indicating that the function is supported, and the higher layer parameter corresponding to the function is configured, the UE may perform the function. "A case that when a UE does not report the UE capability indicating that the function is supported or when the higher layer parameter corresponding to the function is not configured, the UE does not perform the function (for example, employs operation in Rel. 15/16)" may be defined.

The UE capability may indicate at least one of the following.

Whether to support case A

Whether to support case B

Whether to support case C

Whether to support case D

Whether to support option 2-1/option 2-2 of aspect 1-1

Whether to support option 2-1/option 2-2/option 2-3 of aspect 1-2

Whether to support option 2-1/option 2-2 of aspect 1-3

Whether to support determination of implicit RS for per-cell/per-TRP BFD

According to the above UE capability/higher layer parameter, the UE can achieve the above-described function while maintaining compatibility with existing specifications.

Embodiment X

Embodiment X1 to Embodiment X5 below will be described under assumption that Embodiment X1 to Embodiment X5 are employed in a case where a UE supports simultaneous reception of two or more different QCL type D channels/signals, but may be employed in a case other than the case.

Embodiment X1

Embodiment X1 relates to contention between a PDCCH and a PDSCH. The PDCCH and the PDSCH in description of Embodiment X1 may mean a PDCCH and a PDSCH temporally overlapping with each other.

A case of mDCI-based MTRP (Embodiment X1.1) and a case of sDCI-based MTRP (Embodiment X1.2) will each be described.

Embodiment X1.1

For the mDCI-based MTRP, when a CORESET pool index is configured for a CORESET, a priority rule between the above-mentioned PDCCH and PDSCH may be applied only to a case where the PDCCH and the PDSCH are related to the same CORESET pool index.

When the PDCCH and the PDSCH are related to different CORESET pool indices, the priority rule is unnecessary, and the UE having a capability to simultaneously receive two different QCL type D channels/signals may receive both of the PDCCH and the PDSCH related to these different QCL type D channels/signals.

Note that the UE may determine a relationship (association) between a CORESET pool index and a PDSCH on the basis of a relationship between a CORESET pool index and a PDCCH to schedule the PDSCH or on the basis of a relationship between a CORESET pool index and a PDCCH used by the PDSCH as a QCL reference destination (for example, referred to as default QCL).

For example, the UE may determine that a CORESET pool index related to a PDSCH is a CORESET pool index to which a PDCCH to schedule the PDSCH is related, or may determine that the CORESET pool index is a CORESET pool index to which a PDCCH referred to as default QCL for the PDSCH is related.

Figure 10:
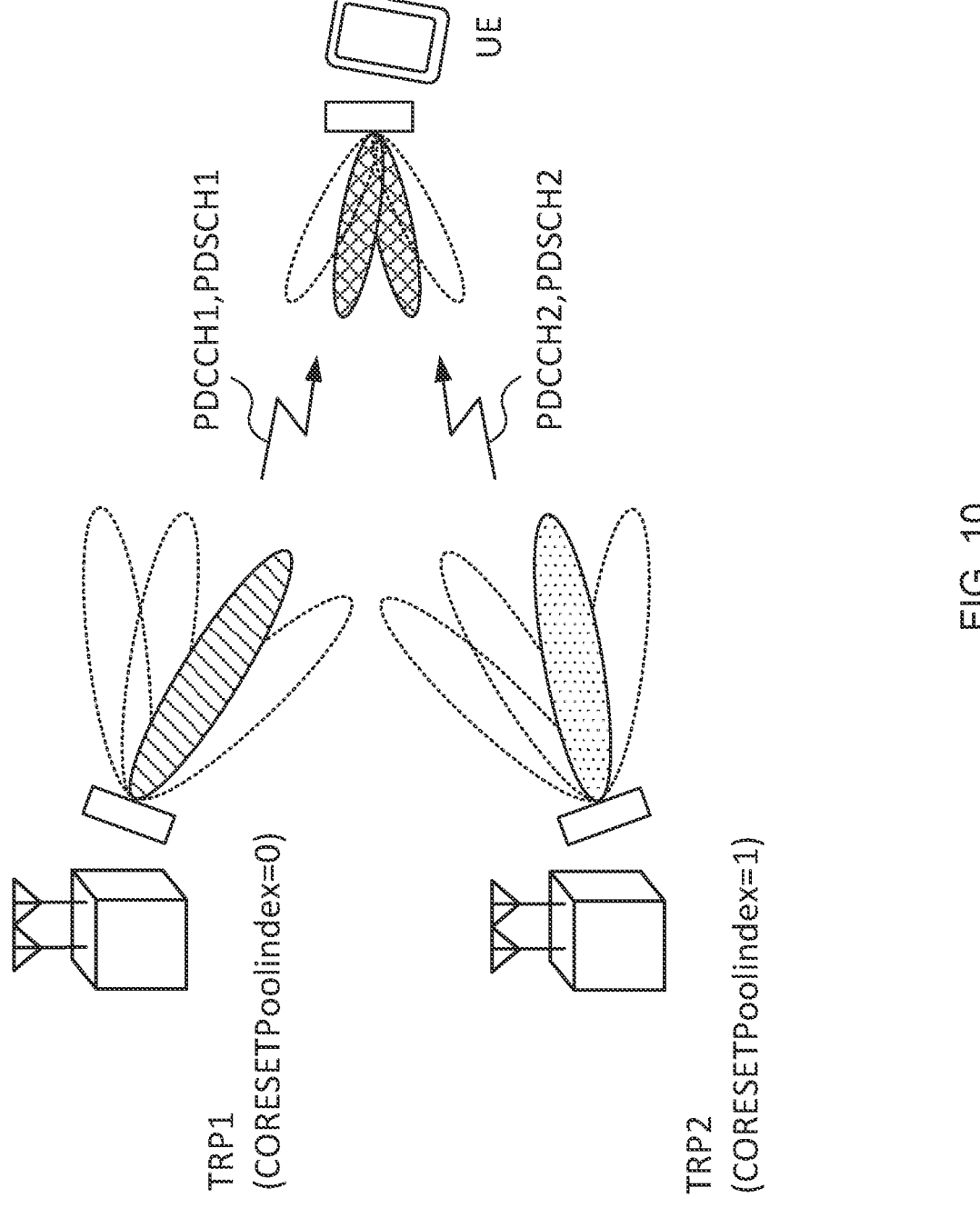
FIG. 10 is a diagram to show an example of an environment of mDCI-based MTRP for description of operation in Embodiment X1.1.

FIG. 10 is a diagram to show an example of an environment of the mDCI-based MTRP for description of operation in Embodiment X1.1. In the present example, the UE uses the mDCI-based MTRP using TRP 1 and TRP 2. TRP 1 corresponds to CORESET pool index=0, and TRP 2 corresponds to CORESET pool index=1. TRP 1 transmits PDCCH 1 and PDSCH 1 to the UE. TRP 2 transmits PDCCH 2 and PDSCH 2 to the UE.

Note that PDCCH 1 is not limited to a PDCCH (DCI) for scheduling PDSCH 1, and may mean an arbitrary PDCCH transmitted from TRP 1. Note that PDCCH 2 is not limited to a PDCCH (DCI) for scheduling PDSCH 2, and may mean an arbitrary PDCCH transmitted from TRP 2.

Figures 11A, 11B:
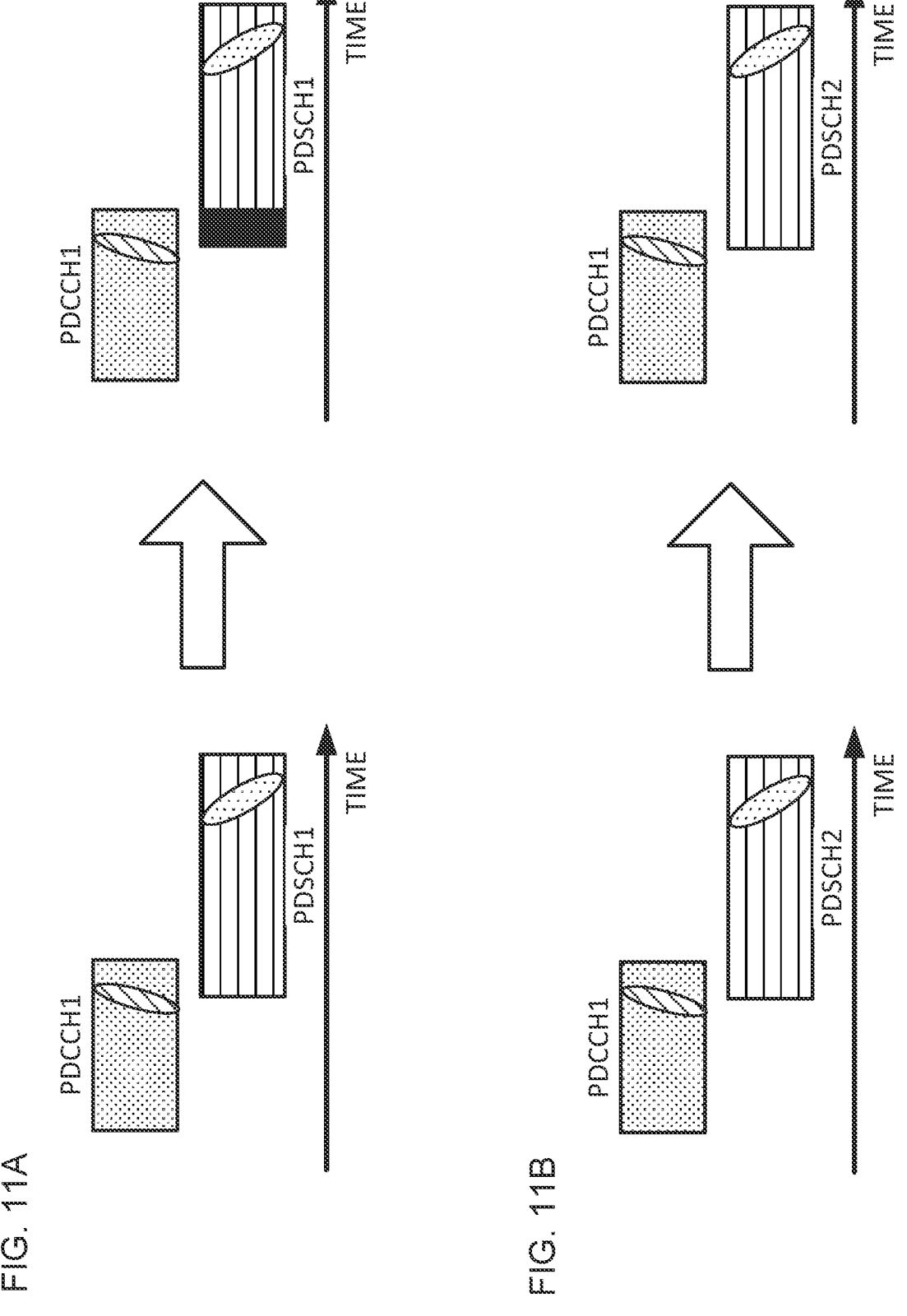
FIGS. 11A and 11B are each a diagram to show an example of a priority rule in contention between a PDCCH and a PDSCH according to Embodiment X1.1.

FIGS. 11A and 11B are each a diagram to show an example of the priority rule in contention between the PDCCH and the PDSCH according to Embodiment X1.1. As shown in FIG. 10, PDCCH 1 and PDSCH 1 correspond to TRP 1 (CORESET pool index=0), and PDCCH 2 and PDSCH 2 correspond to TRP 2 (CORESET pool index=1). Also, PDSCH 1 or PDSCH 2 in the present example follows a default TCI state.

In FIG. 11A, PDCCH 1 and PDSCH 1 corresponding to the same CORESET pool index have different QCL types D, and overlap with each other in some symbols. In this case, the UE may preferentially receive PDCCH 1, and may not receive PDSCH 1 overlapping with PDCCH 1 (which is blacked out in the diagram). The UE may receive a part of PDSCH 1 not overlapping with PDCCH 1.

In FIG. 11B, PDCCH 1 and PDSCH 2 corresponding to different CORESET pool indices have different QCL types D, and overlap with each other in some symbols. In this case, the UE may receive PDSCH 2 overlapping with PDCCH 1 simultaneously with PDCCH 1.

Embodiment X1.2

For the sDCI-based MTRP, when a plurality of (for example, two) TCI states are applied for the PDSCH (for example, indicated by DCI or indicated by default QCL), and a QCL type D channel/signal with a DMRS of the PDCCH is the same as a QCL type D channel/signal with one of the plurality of TCI states for a DMRS of the PDSCH, the priority rule is unnecessary, and the UE having a capability to simultaneously receive two different QCL type D channels/signals may receive both of the PDCCH and the PDSCH related to these different QCL type D channels/signals.

When the plurality of TCI states are applied for the PDSCH, and the QCL type D channel/signal with the DMRS of the PDCCH is different from any QCL type D channel/signal with the plurality of TCI states for the DMRS of the PDSCH, the UE may follow at least one of the following:

(1) The UE prioritizes reception of a PDCCH, and does not receive a PDSCH in a symbol overlapping with the PDCCH;

(2) The UE prioritizes reception of a PDCCH and a PDSCH related to one TCI state out of the plurality of TCI states. The UE does not receive a PDSCH related to a remaining TCI state out of the plurality of TCI states in the symbol overlapping with the PDCCH.

The prioritized TCI state for the PDSCH in the above-described (2) may be defined beforehand in specifications, may be configured/activated for the UE by higher layer signaling (for example, RRC or a MAC CE), or may be determined on the basis of a UE capability. The prioritized TCI state for the PDSCH in the above-described (2) may be a TCI state with a TCI state ID corresponding to a specific value (for example, a minimum value or a maximum value), out of the plurality of TCI states.

Figure 12:
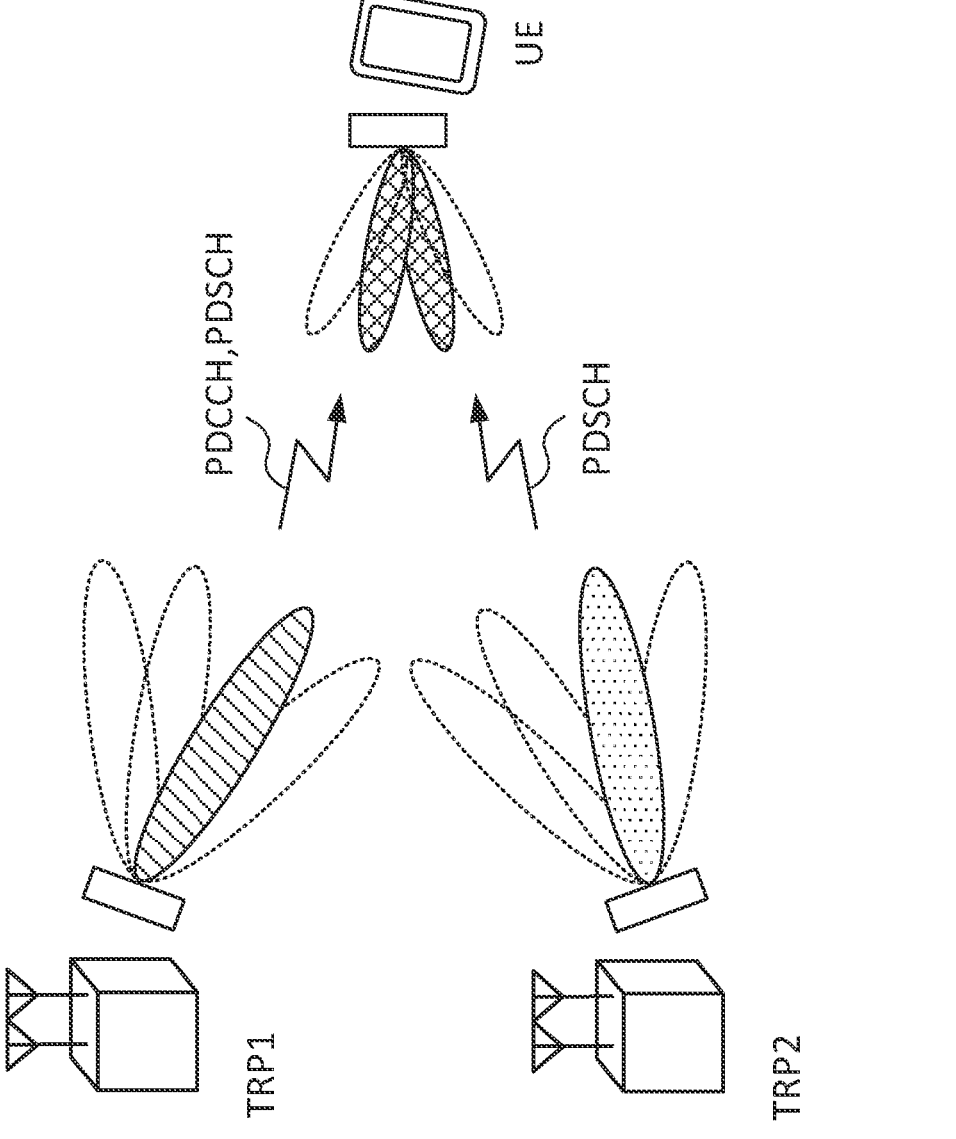
FIG. 12 is a diagram to show an example of an environment of sDCI-based MTRP for description of operation in Embodiment X1.2.

FIG. 12 is a diagram to show an example of an environment of the sDCI-based MTRP for description of operation in Embodiment X1.2. In the present example, the UE uses the sDCI-based MTRP using TRP 1 and TRP 2. TRP 1 transmits a PDCCH and a PDSCH to the UE. TRP 2 transmits a PDSCH (scheduled by the PDCCH from TRP 1) to the UE.

Note that PDCCH 1 is not limited to a PDCCH (DCI) for scheduling PDSCH 1, and may mean an arbitrary PDCCH transmitted from TRP 1.

When a TCI codepoint of DCI transmitted by the PDCCH indicates a combination of two or more TCI states, the UE receives PDSCHs corresponding to such different TCI states as those illustrated (for example, transmitted from different TRPs). In the present example, assume that the PDSCH from TRP 1 corresponds to TCI state 1 and that the PDSCH from TRP 2 corresponds to TCI state 2.

Figures 13A, 13B:
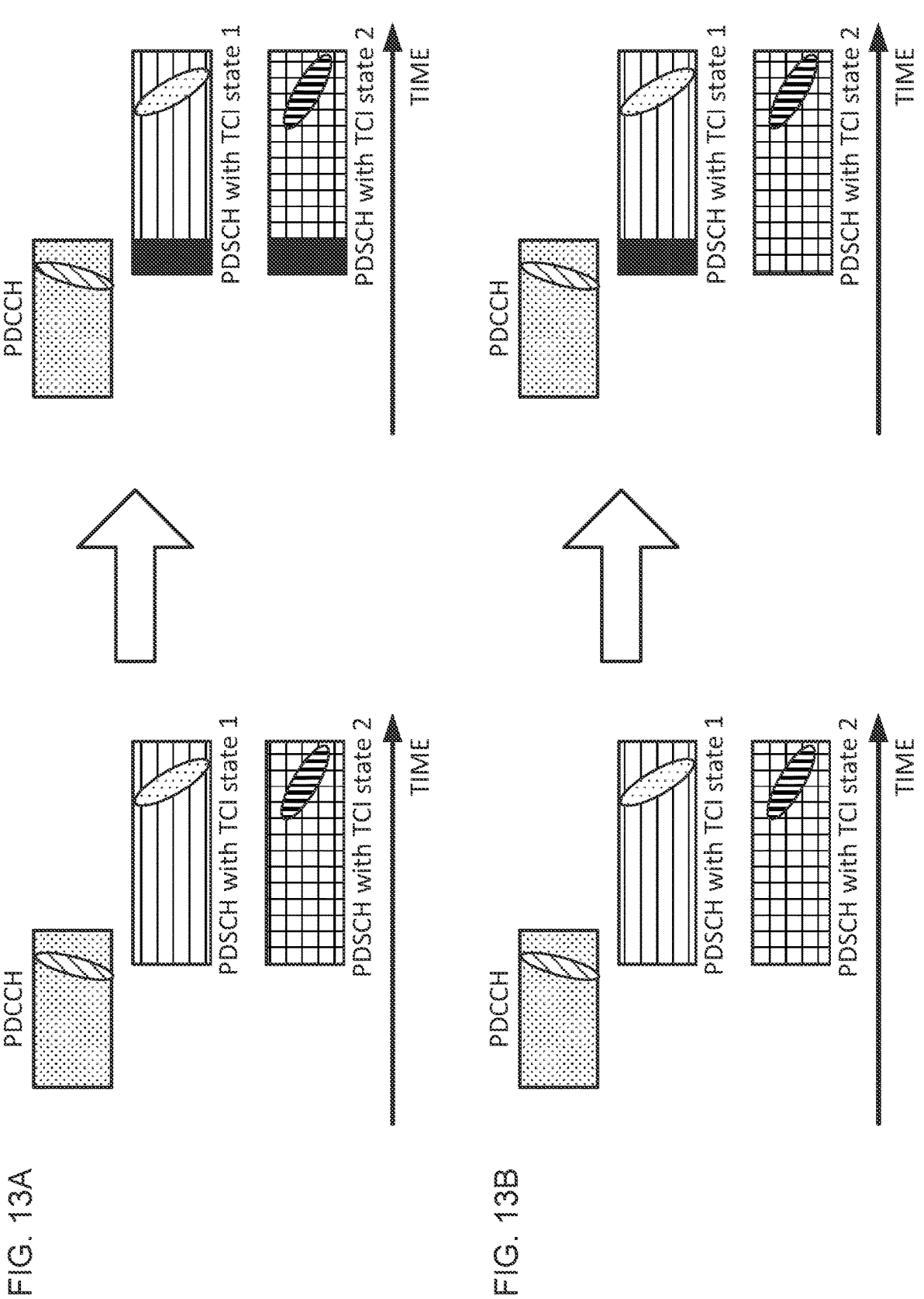
FIGS. 13A and 13B are each a diagram to show an example of a priority rule in contention between a PDCCH and a PDSCH according to Embodiment X1.2.

FIGS. 13A and 13B are each a diagram to show an example of the priority rule in contention between the PDCCH and the PDSCH according to Embodiment X1.2. As shown in this diagram, the PDCCH and PDSCH 1 corresponding to TCI state 1 correspond to TRP 1, and the PDSCH corresponding to TCI state 2 corresponds to TRP 2. Assume that QCL type D of the PDCCH is different from QCL type D of any PDSCH (QCL types D with TCI state 1 and TCI state 2). Also, the PDSCH of the present example may follow a default TCI state, or may not follow the default TCI state.

In FIG. 13A, the PDCCH has QCL type D different from that of both of the PDSCH corresponding to TCI state 1 and PDSCH 2 corresponding to TCI state 2, and overlaps with both of the PDSCHs in some symbols. In this case, the UE may preferentially receive the PDCCH, and may not receive each PDSCH overlapping with the PDCCH (which is blacked out in the diagram). The UE may receive a part of each PDSCH not overlapping with the PDCCH.

In FIG. 13B, the PDCCH has QCL type D different from that of both of the PDSCH corresponding to TCI state 1 and PDSCH 2 corresponding to TCI state 2, and overlaps with both of the PDSCHs in some symbols. In the present example, assume that a TCI state for a prioritized PDSCH is a TCI state with a TCI state ID corresponding to a maximum value, out of a plurality of TCI states specified for the PDSCH.

In this case, the UE may preferentially receive the PDCCH and the PDSCH corresponding to TCI state 2, and may not receive the PDSCH corresponding to TCI state 1 overlapping with the PDCCH (which is blacked out in the diagram). The UE may receive a part of each PDSCH not overlapping with the PDCCH.

According to Embodiment X1 described above, it is possible to appropriately handle contention between a PDCCH and a PDSCH.

Embodiment X2

Embodiment X2 relates to contention between a CSI-RS and a PDCCH (CORESET). The CSI-RS and the PDCCH in description of Embodiment X2 may mean a CSI-RS and a PDCCH temporally overlapping with each other. The PDCCH of the present disclosure and a CORESET may be interchangeably interpreted.

A case of mDCI-based MTRP (Embodiment X2.1) and a case of sDCI-based MTRP (Embodiment X2.2) will each be described.

Embodiment X2.1

For the mDCI-based MTRP, when a CORESET pool index is configured for the CORESET, direct (explicit) or indirect (implicit) configuration of a relationship between a CSI-RS resource or an NZP-CSI-RS resource set and the CORESET pool index may be supported.

With respect to a CSI-RS resource related to an NZP-CSI-RS resource set for which a repetition-related higher layer parameter ('repetition') is 'ON,' the UE may not assume, for a symbol in which monitoring of a CORESET related to a certain CORESET pool index is configured, that a CSI-RS related to the same CORESET pool index is configured. The CSI-RS resource may be arranged in a symbol overlapping with the CORESET related to a different CORESET pool index.

For a CSI-RS related to an NZP-CSI-RS resource set for which a repetition-related higher layer parameter ('repetition') is 'ON,' the UE may simultaneously receive the CSI-RS and a PDCCH related to different CORESET pool indices.

On the other hand, with respect to an NZP-CSI-RS resource set (for which 'repetition' is not 'ON') other than that, the UE may, when a CSI-RS and a CORESET are related to the same CORESET pool index, assume that the CSI-RS and a PDCCH DMRS transmitted in all search space sets related to the CORESET are QCL with each other for "QCL type D." When the CSI-RS and the CORESET are related to different CORESET pool indices, a case that the CSI-RS and a PDCCH DMRS for the CORESET correspond to different "QCL types D" may be allowed.

Embodiment X2.2

The above-mentioned existing priority rule in Rel. 16 may be applied to the sDCI-based MTRP in a manner similar to that in a single TRP case.

Note that when the UE supports simultaneous reception of a total of X (channels/signals with) QCLs, and a total number of different QCLs for a CSI-RS and a PDCCH in the same OFDM symbol is less than or equal to X, the UE may receive all of the CSI-RS and the PDCCH, and otherwise the UE may not receive all of the CSI-RS and the PDCCH. When not receiving all of the CSI-RS and the PDCCH, the UE may drop (may not receive) at least one of a part of the CSI-RS and a part of the PDCCH so that transmissions of the different QCLs are less than or equal to X.

The UE that supports simultaneous reception of a total of X (channels/signals with) QCLs may assume (expect) that the total number of different QCLs for the CSI-RS and the PDCCH in the same OFDM symbol does not exceed X.

When different QCL CSI-RSs and PDCCHs in the same OFDM symbol belong to the same group for first group-based beam reporting, the UE may receive all of the CSI-RSs and the PDCCHs. Here, the first group-based beam reporting may be defined by a case that beams in the same group can be simultaneously received by the UE. The first group-based beam reporting may be group-based beam reporting for Rel. 16/17.

The UE may assume that the above-mentioned existing priority rule in Rel. 16 is applied to a CSI-RS and a PDCCH belonging to different groups for the first group-based beam reporting.

When different QCL CSI-RSs and PDCCHs in the same OFDM symbol belong to different groups for second group-based beam reporting, the UE may receive all of the CSI-RSs and the PDCCHs. Here, the second group-based beam reporting may be defined by a case that beams in different groups can be simultaneously received by the UE. The second group-based beam reporting may be group-based beam reporting for Rel. 17.

The UE may assume that the above-mentioned existing priority rule in Rel. 16 is applied to a CSI-RS and a PDCCH belonging to the same group for the second group-based beam reporting.

According to Embodiment X2 described above, it is possible to appropriately handle contention between a CSI-RS and a PDCCH.

Embodiment X3

Embodiment X3 relates to contention between a CSI-RS and an SSB. The CSI-RS and the SSB in description of Embodiment X3 may mean a CSI-RS and an SSB temporally overlapping with each other.

A case of mDCI-based MTRP (Embodiment X3.1) and a case of sDCI-based MTRP (Embodiment X3.2) will each be described.

Embodiment X3.1

For the mDCI-based MTRP, when a CORESET pool index is configured for the CORESET, direct (explicit) or indirect (implicit) configuration of a relationship between a CSI-RS resource or an NZP-CSI-RS resource set and the CORESET pool index may be supported, or direct (explicit) or indirect (implicit) configuration of a relationship between an SSB and the CORESET pool index may be supported.

When a CSI-RS resource is configured in the same OFDM symbol as that of an SSB, and the CSI-RS and the SSB are related to the same CORESET pool index, the UE may assume that the CSI-RS and the SSB are QCL with each other for "QCL type D."

When a CSI-RS resource is configured in the same OFDM symbol as that of an SSB, and the CSI-RS and the SSB are related to different CORESET pool indices, the UE may assume that there are constraints related to QCL type D on the CSI-RS and the SSB (for example, the CSI-RS and the SSB corresponding to different "QCL types D" may be allowed).

Note that indirect configuration of a relationship between a certain channel/signal and a CORESET pool index in the present disclosure may mean, for example, deriving of a relationship based on QCL assumption or a TCI state. For example, when TCI state #3 is configured for CORESET #2 corresponding to CORESET pool index #1, SSB #4 being a source reference signal (reference signal) with TCI state #3 implicitly means SSB #4 related to CORESET pool index #1.

Embodiment X3.2

The above-mentioned existing priority rule in Rel. 16 may be applied to the sDCI-based MTRP in a manner similar to that in a single TRP case.

For the sDCI-based MTRP, Embodiment X2.2 in which the "PDCCH" is interpreted as an "SSB" may be used. For example, when the UE supports simultaneous reception of a total of X (channels/signals with) QCLs, and a total number of different QCLs for a CSI-RS and an SSB in the same OFDM symbol is less than or equal to X, the UE may receive all of the CSI-RS and the SSB, and otherwise the UE may not receive all of the CSI-RS and the SSB.

According to Embodiment X3 described above, it is possible to appropriately handle contention between a CSI-RS and an SSB.

Embodiment X4

Embodiment X4 relates to contention between a PDSCH and an SSB. The PDSCH and the SSB in description of Embodiment X4 may mean a PDSCH and an SSB temporally overlapping with each other. In Embodiment X4, the PDSCH and a DMRS for the PDSCH may be interchangeably interpreted.

A case of mDCI-based MTRP (Embodiment X4.1) and a case of sDCI-based MTRP (Embodiment X4.2) will each be described.

Embodiment X4.1

For the mDCI-based MTRP, when a CORESET pool index is configured for a CORESET, direct (explicit) or indirect (implicit) configuration of a relationship between an SSB and the CORESET pool index may be supported.

When a DMRS for a PDSCH is received in the same OFDM symbol as that of an SSB, and the PDSCH and the SSB are related to the same CORESET pool index, the UE may assume that the PDSCH and the SSB are QCL with each other for "QCL type D."

When a DMRS for a PDSCH is received in the same OFDM symbol as that of an SSB, and the PDSCH and the SSB are related to different CORESET pool indices, the UE may receive both of the PDSCH and the SSB related to these different QCL type D channels/signals.

A relationship between the CORESET pool index and the PDSCH may be determined in a manner similar to that in Embodiment X1.1.

Embodiment X4.2

For the sDCI-based MTRP, when a plurality of (for example, two) TCI states are applied for the PDSCH (for example, indicated by DCI or indicated by default QCL), and the UE receives a DMRS for the PDSCH and an SSB in the same OFDM symbol, the UE may assume that a QCL type D channel/signal with one of the plurality of TCI states for the PDSCH is QCL with the SSB for "QCL type D."

In other words, the UE may prioritize reception of an SSB and a PDSCH related to one TCI state out of the plurality of TCI states. The UE may not receive a PDSCH related to a remaining TCI state out of the plurality of TCI states in a symbol overlapping with the SSB. The prioritized TCI state for this PDSCH may be a TCI state with a TCI state ID corresponding to a specific value (for example, a minimum value or a maximum value), out of the plurality of TCI states.

According to Embodiment X4 described above, it is possible to appropriately handle contention between a PDSCH and an SSB.

Embodiment X5

Embodiment X5 relates to contention between an A-CSI-RS and another DL signal. The A-CSI-RS and another DL signal in description of Embodiment X5 may mean an A-CSI-RS and another DL signal temporally overlapping with each other.

The A-CSI-RS in Embodiment X5 corresponds to an A-CSI-RS with scheduling offset for the A-CSI-RS less than a threshold value determined on the basis of a beam switch timing reported by the UE. Another DL signal in Embodiment X5 corresponds to "the other DL signal" defined in existing Rel. 15/16. A PDSCH in Embodiment X5 indicates a PDSCH corresponding to such another DL signal.

A case of mDCI-based MTRP (Embodiment X5.1) and a case of sDCI-based MTRP (Embodiment X5.2) will each be described.

Embodiment X5.1

For the mDCI-based MTRP, when a CORESET pool index is configured for a CORESET, direct (explicit) or indirect (implicit) configuration of a relationship between an A-CSI-RS resource or an A-CSI-RS resource set and the CORESET pool index may be supported.

When the A-CSI-RS and another DL signal are related to the same CORESET pool index, the UE may prioritize QCL for such another DL signal (for example, apply QCL for such another DL signal to reception of the A-CSI-RS), and otherwise the UE may receive both of the A-CSI-RS and such another DL signal with different QCL types D.

A relationship between the CORESET pool index and the PDSCH may be determined in a manner similar to that in Embodiment X1.1.

Embodiment X5.2

For the sDCI-based MTRP, when a plurality of (for example, two) TCI states are applied for the PDSCH (for example, indicated by DCI or indicated by default QCL), and the UE receives a DMRS for the PDSCH and an A-CSI-RS in the same OFDM symbol, the UE may follow at least one of the following:

When QCL type D of the A-CSI-RS is the same as one of the plurality of TCI states, the UE receives both of the A-CSI-RS and the PDSCH; and When QCL type D of the A-CSI-RS is different from any one of the plurality of TCI states, the UE applies QCL assumption with a specific TCI state to reception of the A-CSI-RS and the PDSCH, and applies, to remaining PDSCH reception, QCL assumption with a remaining TCI state out of the plurality of TCI states. The specific TCI state may be a TCI state with a TCI state ID corresponding to a specific value (for example, a minimum value or a maximum value), out of the plurality of TCI states.

For the sDCI-based MTRP, Embodiment X2.2 in which the "CSI-RS" is interpreted as an "A-CSI-RS" and in which the "PDCCH" is interpreted as "another DL signal" may be used. For example, when the UE supports simultaneous reception of a total of X (channels/signals with) QCLs, and a total number of different QCLs for an A-CSI-RS and another DL signal in the same OFDM symbol is less than or equal to X, the UE may receive all of the A-CSI-RS and such another DL signal, and otherwise the UE may not receive all of the A-CSI-RS and such another DL signal.

Figure 14:
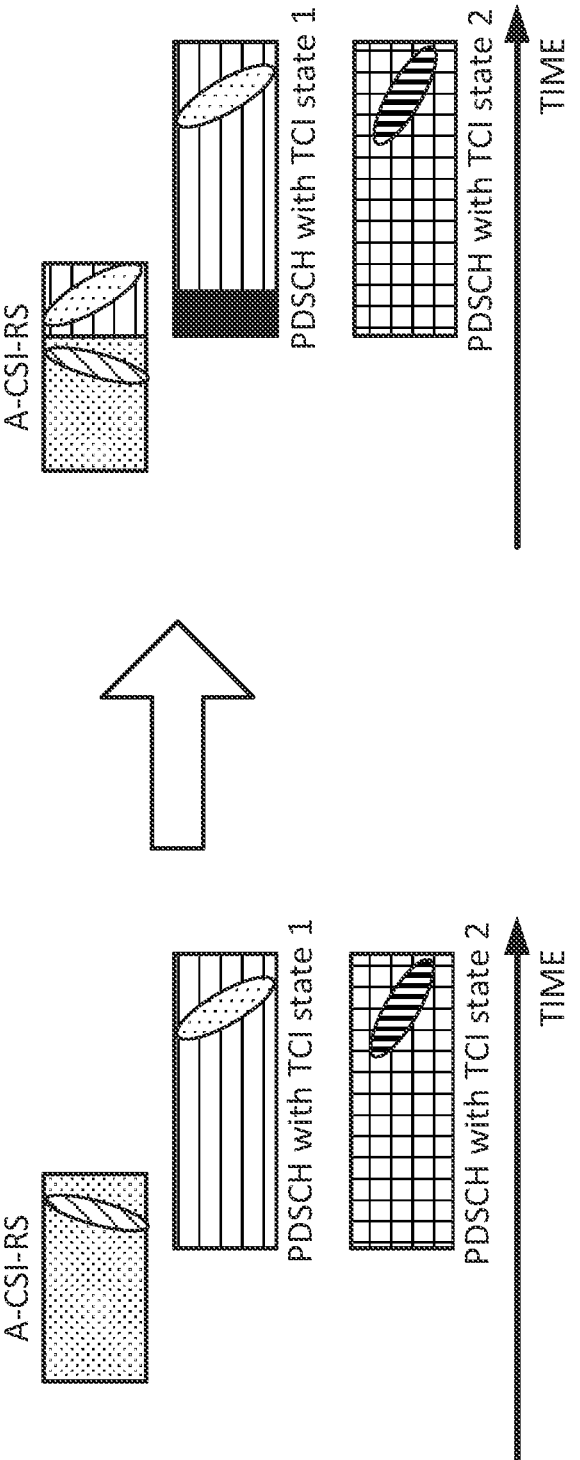
FIG. 14 is a diagram to show an example of a priority rule in contention between an A-CSI-RS and another DL signal (PDSCH) according to Embodiment X5.2.

FIG. 14 is a diagram to show an example of a priority rule in contention between the A-CSI-RS and another DL signal (PDSCH) according to Embodiment X5.2. In the present example, the A-CSI-RS has QCL type D different from that of both a PDSCH corresponding to TCI state 1 and PDSCH 2 corresponding to TCI state 2, and overlaps with both of the PDSCHs in some symbols. Assume that QCL type D of A-CSI-RS is different from QCL type D of any PDSCH (QCL types D with TCI state 1 and TCI state 2). Also, the PDSCH of the present example may follow a default TCI state, or may not follow the default TCI state.

In the present example, assume that the above-described specific TCI state (TCI state for a prioritized PDSCH) is a TCI state with a TCI state ID corresponding to a minimum value, out of a plurality of TCI states specified for a PDSCH overlapping with the A-CSI-RS.

In this case, the UE applies, in a symbol in which the A-CSI-RS and the PDSCH overlap with each other, TCI state 1 for reception of the A-CSI-RS and the PDSCH. The UE also applies TCI state 2 for reception of the PDSCH.

Note that in the present example, TCI state 1 is not applied to a part of the A-CSI-RS not overlapping with the PDSCH, but may be applied to that part.

According to Embodiment X5 described above, it is possible to appropriately handle contention between an A-CSI-RS and another DL signal.

Variations of Embodiment X

The above-mentioned embodiment describes an example in which when a CORESET pool index is configured for a CORESET, the same QCL-D is assumed in the UE for different channels/RSs related to the same CORESET pool index, and different QCLs-D are assumed in the UE for different channels/RSs related to different CORESET pool indices.

The above-mentioned embodiment describes an example in which when a plurality of TCI states are applied to a PDSCH, if one of the plurality of TCI states and another DL channel/signal correspond to the same QCL-D, the UE receives both of the PDSCH and such another DL channel/signal, and, if not, prioritizes any of the TCI states.

Note that at least one of the above-mentioned embodiments may be employed only in a UE that has reported a specific UE capability or that supports the specific UE capability.

The specific UE capability may indicate at least one of the following:

Whether to support simultaneous reception

Whether to support simultaneous reception of two or more different QCL type D channels/signals Number of QCLs for simultaneous reception in 1 OFDM symbol The capability related to whether to support the simultaneous reception may be separately defined for each of the above-mentioned embodiments, or may be defined in common for some embodiments. For example, a capability indicating support for simultaneous reception of arbitrary two out of a PDCCH, a PDSCH, a CSI-RS, an SSB, and an A-CSI-RS (even the same channels/signals are allowed) may be defined. For example, a capability indicating that PDSCH-related simultaneous reception is supported may indicate that processing related to the simultaneous reception mentioned in the first embodiment (contention between the PDCCH and PDSCH) and fourth embodiment (contention between the PDSCH and SSB) is supported.

The capability for the number of QCLs for the simultaneous reception in 1 OFDM symbol may be defined for each Bandwidth Part (BWP)/each CC (component carrier)/each band, may be defined across all CCs, or may be defined across all bands. When the capability is defined across all CCs/all bands, the above-described "1 OFDM symbol" may be defined with the intention of using specific subcarrier spacing (SCS). The specific SCS may be, for example, smaller (or larger) SCS out of SCS available (or configured) in all CCs/all bands, and may be, for example, 15 kHz.

Note that the "CSI-RS," the "A-CSI-RS," the "SSB," and the like in the present disclosure may be interpreted as a radio link monitoring reference signal (Radio Link Monitoring RS (RLM-RS)), a beam failure detection RS (BFD-RS), an RS for beam management, or the like.

At least one of the above-mentioned embodiments may be employed in a case where specific information related to the above-mentioned embodiments is configured for the UE by higher layer signaling (when the specific information is not configured, for example, operation in Rel. 15/16 is employed). For example, the specific information may be information indicating enabling of different spatial relations for PUSCH repetition, an arbitrary RRC parameter for specific release (for example, Rel. 17), or the like.

Note that each embodiment mentioned above may be employed in a case where (operation for) multiple TRPs or multiple panels are configured for the UE, or may be employed in a case other than that case.

Embodiment Y

Embodiment Y1 to Embodiment Y2 below will be described under assumption that Embodiment Y1 to Embodiment Y2 are employed in a case where a UE supports simultaneous reception of two or more different QCL type D channels/signals, but may be employed in a case other than the case.

In the present disclosure, "TCI state A is of the same QCL type D as that of TCI state B," "TCI state A and TCI state B are the same," "TCI state A is QCL type D with TCI state B," and the like may be interchangeably interpreted.

Embodiment Y1

Embodiment Y1 relates to an SFN PDCCH repetition scheme.

In Embodiment Y1, two or two or more TCI states may be activated per CORESET. The TCI state activation for the CORESET may be notified to the UE by using a MAC CE.

In Embodiment Y1, in a case where contention between a plurality of different QCL type D PDCCHs occurs, the UE determines, on the basis of at least one priority rule described in Embodiment Y1.1 to Embodiment Y1.3, a PDCCH (CORESET) to be monitored. Each of Embodiment Y1.1 to Embodiment Y1.3 will be described below.

Hereinafter, in the present disclosure, a monitoring target CORESET determined on the basis of a priority rule is also simply referred to as a "prioritized CORESET," a "CORESET with the highest priority," or the like.

Embodiment Y1.1

A priority rule in Embodiment Y1.1 is the same as that in Rel-16 NR. That is, the UE determines the prioritized CORESET in accordance with a priority rule in which a CSS set is preferentially monitored over a USS set and in which, between the same kind of (CSS or USS) SS sets, an SS set with a lower index (that is, one with a lower cell index, and moreover, one with a lower SS set index in a case of the same cell index) is preferentially monitored.

Further, Embodiment Y1.1 is broadly classified into two below:

Embodiment Y1.1.1: the prioritized CORESET has two active TCI states (two QCL types D); and Embodiment Y1.1.2: the prioritized CORESET has one active TCI state (one QCL type D).

Embodiment Y1.1.1

For a CORESET other than the prioritized CORESET, the CORESET having one active TCI state, the UE may monitor this CORESET when the one active TCI state is the same QCL type D as that of either of the two active TCI states for the prioritized CORESET.

For a CORESET other than the prioritized CORESET, the CORESET having two active TCI states, the UE may monitor this CORESET when condition (1.1.1a) or (1.1.1b) below is satisfied:

(1.1.1a) The two active TCI states are the same QCL types D as those of the two active TCI states for the prioritized CORESET; and (1.1.1b) One of the two active TCI states is the same QCL type D as that of one of the two active TCI states for the prioritized CORESET.

Note that when (1.1.1b) described above is satisfied, the UE monitors the above-described CORESET by applying only a TCI state being the same QCL type D as that of one of the two active TCI states for the prioritized CORESET.

Figure 15:
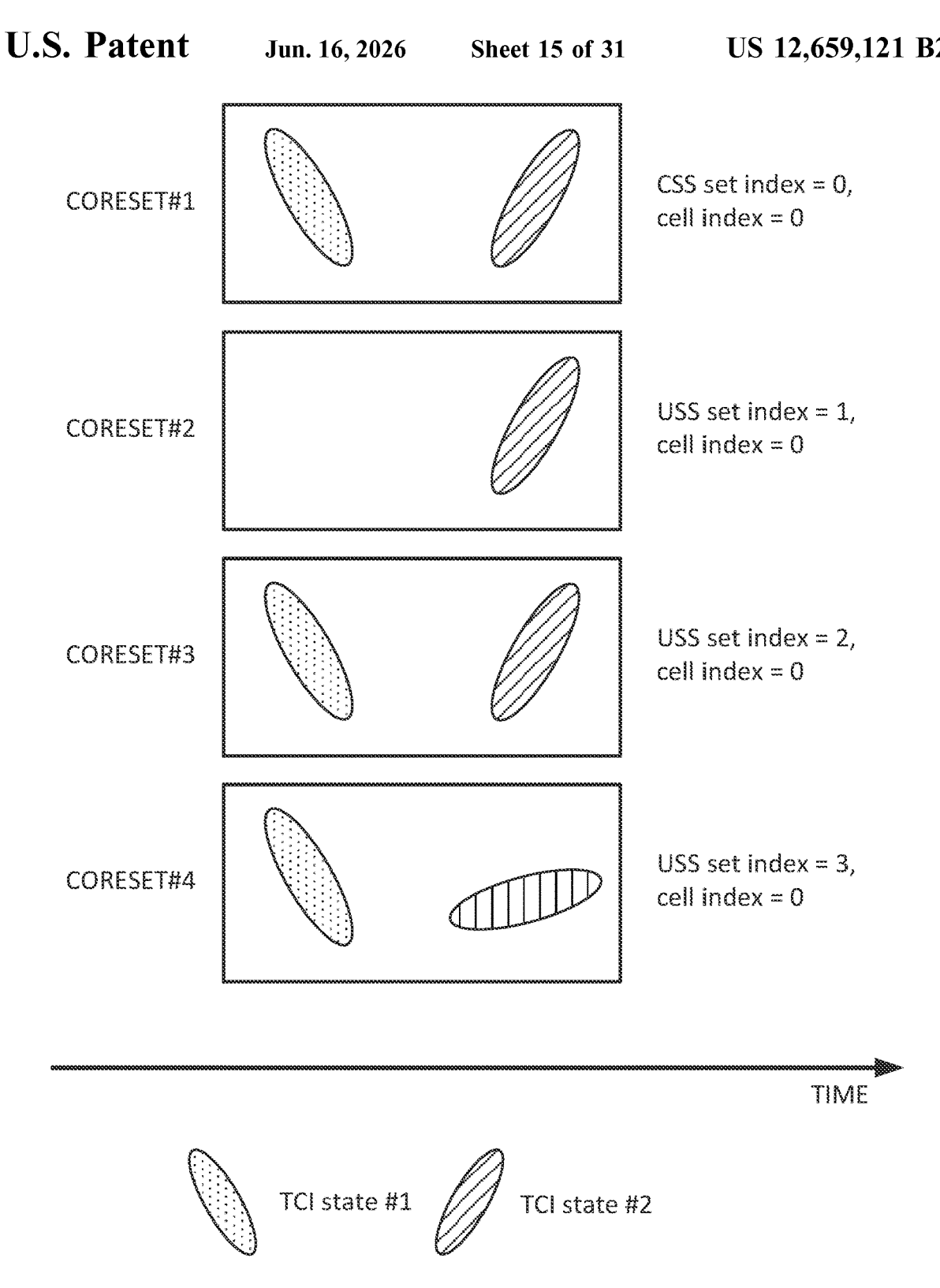
FIG. 15 is a diagram to show an example of a prioritized CORESET and another CORESET to be monitored simultaneously in Embodiment Y1.1.1.

FIG. 15 is a diagram to show an example of the prioritized CORESET and another CORESET to be monitored simultaneously in Embodiment Y1.1.1. In the present example, four CORESETs (CORESET #1 to CORESET #4) temporally overlap with each other.

CORESET #1 corresponds to CSS set index=0 and cell index=0, and has two active TCI states (TCI state #1 and TCI state #2).

CORESET #2 corresponds to USS set index=1 and cell index=0, and has one active TCI state (TCI state #2).

CORESET #3 corresponds to USS set index=2 and cell index=0, and has two active TCI states (TCI state #1 and TCI state #2).

CORESET #4 corresponds to USS set index=3 and cell index=0, and has two active TCI states (TCI state #1 and TCI state #3).

In a case shown in this diagram, the UE first selects, as the prioritized CORESET, CORESET #1 corresponding to the CSS set. CORESET #1 has two active TCI states, and thus operation in Embodiment Y1.1.1 is employed.

One TCI state for CORESET #2 is the same QCL type D as that of TCI state #2 for the prioritized CORESET, and thus the UE monitors CORESET #2.

Two TCI states for CORESET #3 are the same QCL types D as those of TCI state #1 and TCI state #2 for the prioritized CORESET, and thus the UE monitors CORESET #3.

One of two TCI states for CORESET #4 is the same QCL type D as that of TCI state #1 for the prioritized CORESET, but the other is QCL type D (TCI state #3) different from that of TCI state #2 for the prioritized CORESET. Thus, the UE that follows (1.1.1a) described above does not monitor CORESET #4. The UE that follows (1.1.1b) described above monitors CORESET #4 by applying only TCI state #1.

Embodiment Y1.1.2

For Embodiment Y1.1.2, a prioritized CORESET having one active TCI state determined first in accordance with the same priority rule as that in Rel-16 NR is also referred to as a first prioritized CORESET, and a prioritized CORESET determined subsequently other than the first prioritized CORESET is also referred to as a second prioritized CORE-SET. The second prioritized CORESET may be referred to as CORESET X.

The one active TCI state for the first prioritized CORE-SET may be referred to as a first prioritized TCI state (1st priority TCI state). One of the active TCI states for the second prioritized CORESET may be referred to as a second prioritized TCI state (2nd priority TCI state).

Embodiment Y1.1.2 is broadly classified into Embodiment Y1.1.2.1 and Embodiment Y1.1.2.2 by methods for determining the second prioritized CORESET.

Embodiment Y1.1.2.1

The second prioritized CORESET may be determined on the basis of remaining CORESETs with contention except the first prioritized CORESET, in accordance with a priority rule similar to that in Rel. 16. That is, the second prioritized CORESET may correspond to a CSS set with the lowest index, out of the remaining CORESETs with the contention, in a cell with the lowest index including CSS sets, if any, and, if not, may correspond to a USS set with the lowest index, out of the remaining CORESETs with the contention, in a cell with the lowest index. The lowest USS set index is determined across all USS sets having at least one PDCCH candidate in an overlapped PDCCH monitoring occasion.

When a candidate for the second prioritized CORESET derived in accordance with the above-described priority rule has only one active TCI state, and the active TCI state is the same as the first prioritized TCI state, a next candidate (CORESET corresponding to a next SS set/cell with the lowest index) may be looked up as a candidate for the second prioritized CORESET. That is, the UE may continue to look up the second prioritized CORESET for a CORESET having only one active TCI state until the active TCI state is different from the first prioritized TCI state.

When a CORESET having only one active TCI state different from the first prioritized TCI state is identified in accordance with the above-described priority rule, the UE may determine this active TCI state as the second prioritized TCI state, and may determine this CORESET as the second prioritized CORESET.

Note that even when a candidate for the second prioritized CORESET derived in accordance with the above-described priority rule has only one active TCI state, and the active TCI state is the same as the first prioritized TCI state, the UE may determine this active TCI state as the second prioritized TCI state, and may determine this candidate as the second prioritized CORESET. In this case, the second prioritized CORESET is the same as the first prioritized CORESET, and thus it may be indicated that the second prioritized CORESET is absent.

When a candidate for the second prioritized CORESET derived in accordance with the above-described priority rule has two active TCI states, and one of the two active TCI states is the same as the first prioritized TCI state, the UE may determine the other of the two active TCI states as the second prioritized TCI state, and may determine this candidate as the second prioritized CORESET.

When a candidate for the second prioritized CORESET derived in accordance with the above-described priority rule has two active TCI states, and both of the two active TCI states are different from the first prioritized TCI state, the UE may determine one of the two active TCI states as the second prioritized TCI state, and may determine this candidate as the second prioritized CORESET. This one TCI state may be one having the lowest or highest TCI state ID, out of the two active TCI states, or may be one corresponding to the first or second TCI state activated by the MAC CE.

Figure 16:
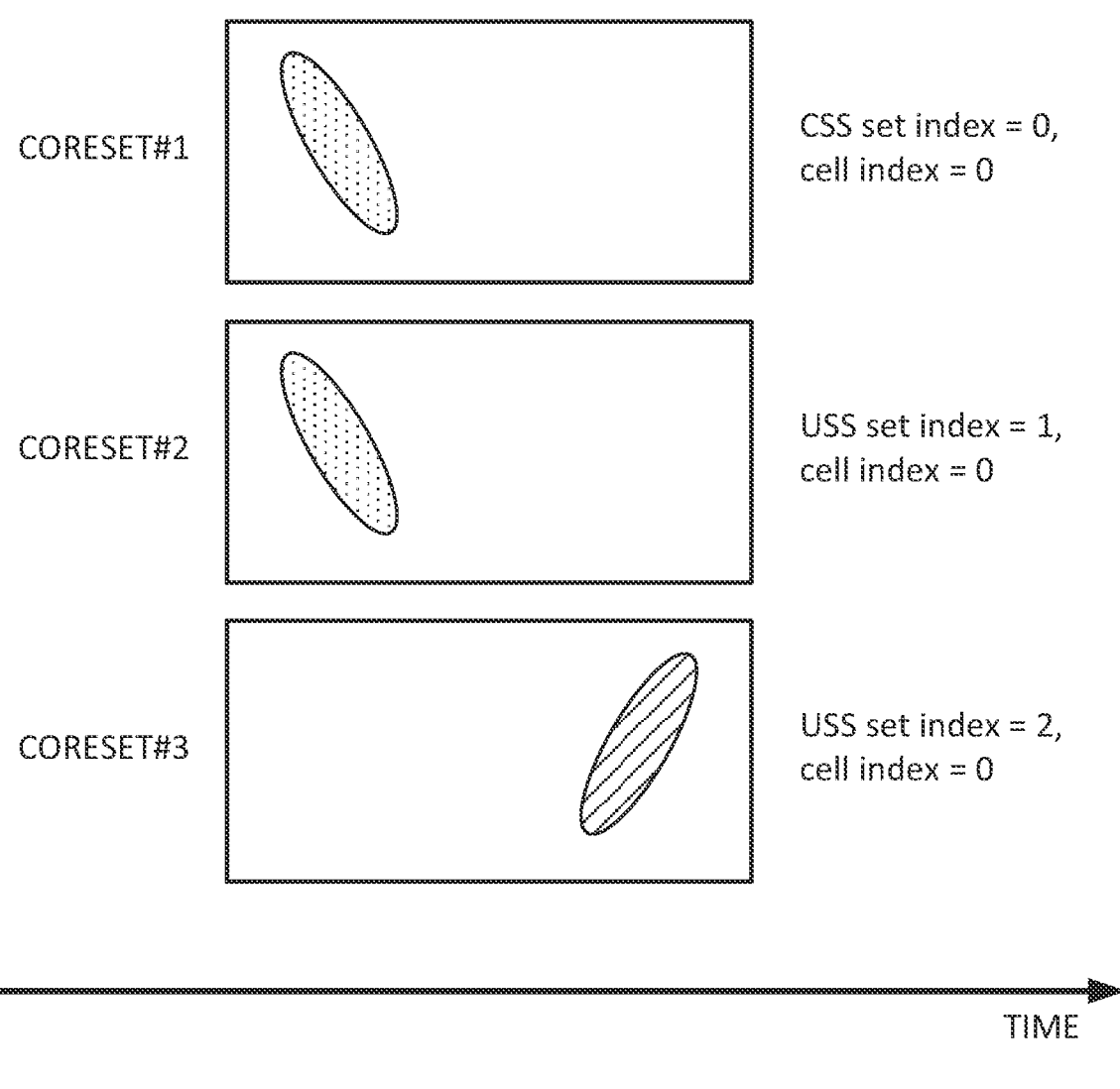
FIG. 16 is a diagram to show an example of a prioritized CORESET in Embodiment Y1.1.2.1.

FIG. 16 is a diagram to show an example of the prioritized CORESET in Embodiment Y1.1.2.1. In the present example, three CORESETs (CORESET #1 to CORESET #3) temporally overlap with each other.

CORESET #1 corresponds to CSS set index=0 and cell index=0, and has one active TCI state (TCI state #1).

CORESET #2 corresponds to USS set index=1 and cell index=0, and has one active TCI state (TCI state #1).

CORESET #3 corresponds to USS set index=2 and cell index=0, and has one active TCI state (TCI state #2).

In a case shown in this diagram, the UE first selects, as the prioritized CORESET, CORESET #1 corresponding to the CSS set. CORESET #1 has one active TCI state, and thus operation in Embodiment Y1.1.2 is employed. This prioritized CORESET corresponds to the first prioritized CORE-SET, and TCI state #1 corresponds to the first prioritized TCI state.

Subsequently, the UE looks up the second prioritized CORESET. One TCI state for CORESET #3 is different from TCI state #1 for the prioritized CORESET, and thus the UE determines this TCI state #2 as the second prioritized TCI state, determines CORESET #3 as the second prioritized CORESET, and monitors CORESET #3.

Figure 17:
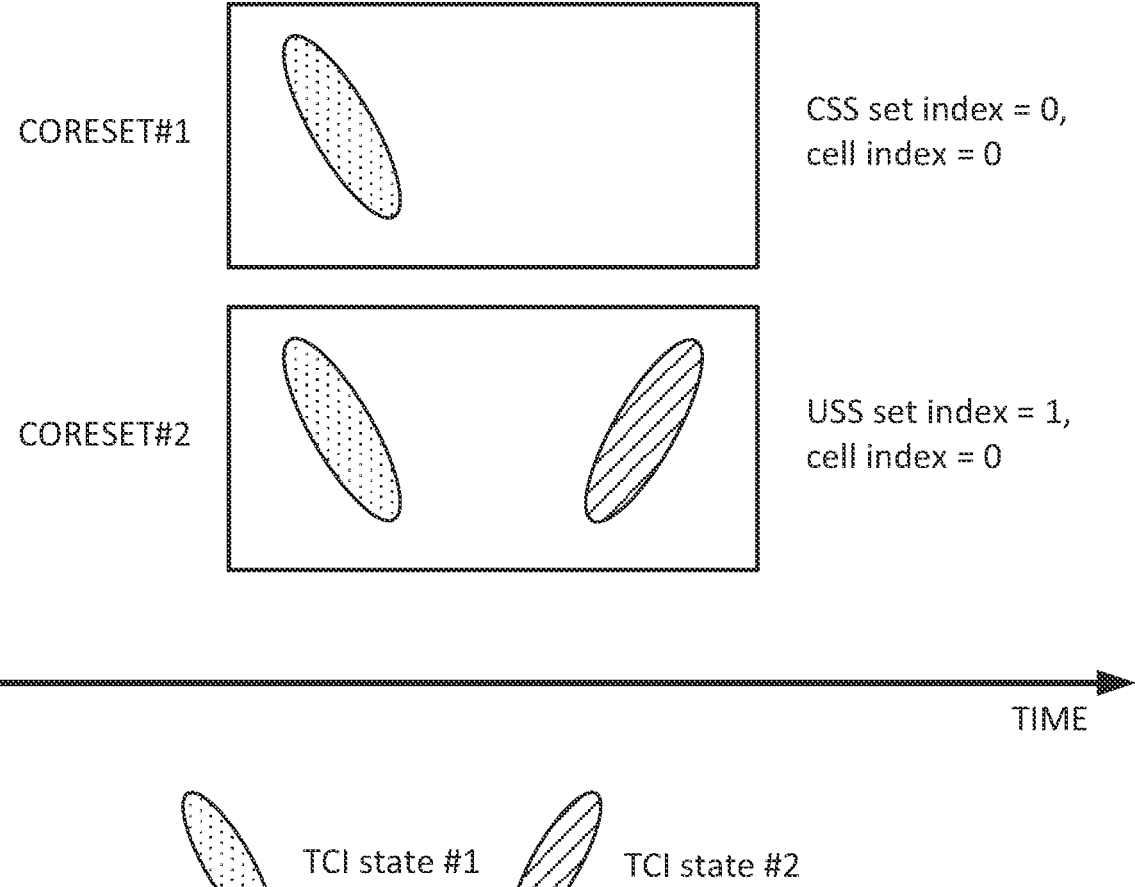
FIG. 17 is a diagram to show an example of a prioritized CORESET in Embodiment Y1.1.2.1.

FIG. 17 is a diagram to show an example of the prioritized CORESET in Embodiment Y1.1.2.1. In the present example, two CORESETs (CORESET #1 to CORESET #2) temporally overlap with each other.

CORESET #1 corresponds to CSS set index=0 and cell index=0, and has one active TCI state (TCI state #1).

CORESET #2 corresponds to USS set index=1 and cell index=0, and has two active TCI states (TCI state #1 and TCI state #2).

In a case shown in this diagram, the UE first selects, as the prioritized CORESET, CORESET #1 corresponding to the CSS set. CORESET #1 has one active TCI state, and thus operation in Embodiment Y1.1.2 is employed. This prioritized CORESET corresponds to the first prioritized CORESET, and TCI state #1 corresponds to the first prioritized TCI state.

Subsequently, the UE looks up the second prioritized CORESET. One of the two active TCI states for CORESET #2 is the same as the first prioritized TCI state, and thus the UE determines the other of the two active TCI states (TCI state #2) as the second prioritized TCI state, determines CORESET #2 as the second prioritized CORESET, and monitors CORESET #2.

Figure 18:
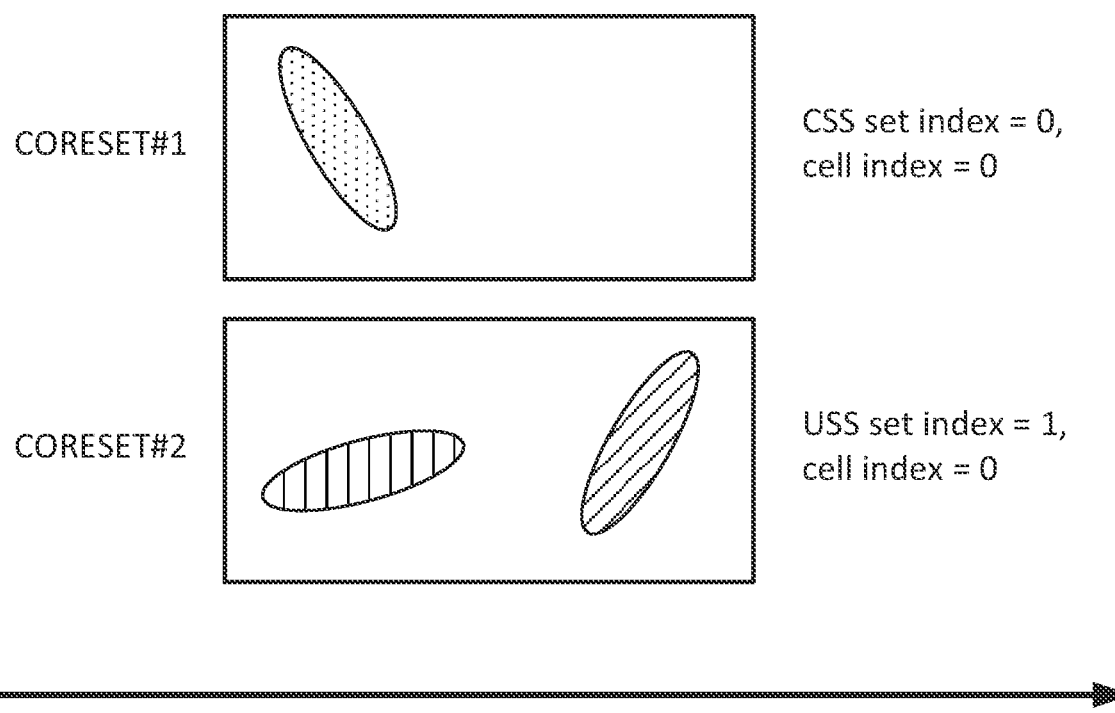
FIG. 18 is a diagram to show an example of a prioritized CORESET in Embodiment Y1.1.2.1.

FIG. 18 is a diagram to show an example of the prioritized CORESET in Embodiment Y1.1.2.1. In the present example, two CORESETs (CORESET #1 to CORESET #2) temporally overlap with each other.

CORESET #1 corresponds to CSS set index=0 and cell index=0, and has one active TCI state (TCI state #1).

CORESET #2 corresponds to USS set index=1 and cell index=0, and has two active TCI states (TCI state #3 and TCI state #2).

In a case shown in this diagram, the UE first selects, as the prioritized CORESET, CORESET #1 corresponding to the CSS set. CORESET #1 has one active TCI state, and thus operation in Embodiment Y1.1.2 is employed. This prioritized CORESET corresponds to the first prioritized CORESET, and TCI state #1 corresponds to the first prioritized TCI state.

Subsequently, the UE looks up the second prioritized CORESET. Both of the two active TCI states for CORESET #2 are different from the first prioritized TCI state, and thus the UE determines, as the second prioritized TCI state, a TCI state having the highest TCI state ID (TCI state #3) out of the two active TCI states, determines CORESET #2 as the second prioritized CORESET, and monitors, in CORESET #2, PDCCH candidates by applying only TCI state #3.

Embodiment Y1.1.2.2

The UE first determines, on the basis of remaining CORESETs with contention except the first prioritized CORESET, a subset of CORESETs having two active TCI states, the CORESETs having one TCI state of the TCI states being the same as the first prioritized TCI state.

The UE determines, on the basis of the subset, the second prioritized CORESET in accordance with a priority rule similar to that in Rel. 16. That is, the second prioritized CORESET may correspond to a CSS set with the lowest index, out of the CORESETs included in the subset, in a cell with the lowest index including CSS sets, if any, and, if not, may correspond to a USS set with the lowest index, out of the CORESETs included in the subset, in a cell with the lowest index. The lowest USS set index is determined across all USS sets having at least one PDCCH candidate in an overlapped PDCCH monitoring occasion.

The second prioritized TCI state corresponds to one different from the first prioritized TCI state, out of active TCI states for the second prioritized CORESET.

In Embodiment Y1.1.2.2, PDCCH candidates (CORESETs) can be monitored in the second prioritized CORESET by using both of the first prioritized TCI and the second prioritized TCI state.

Figure 19:
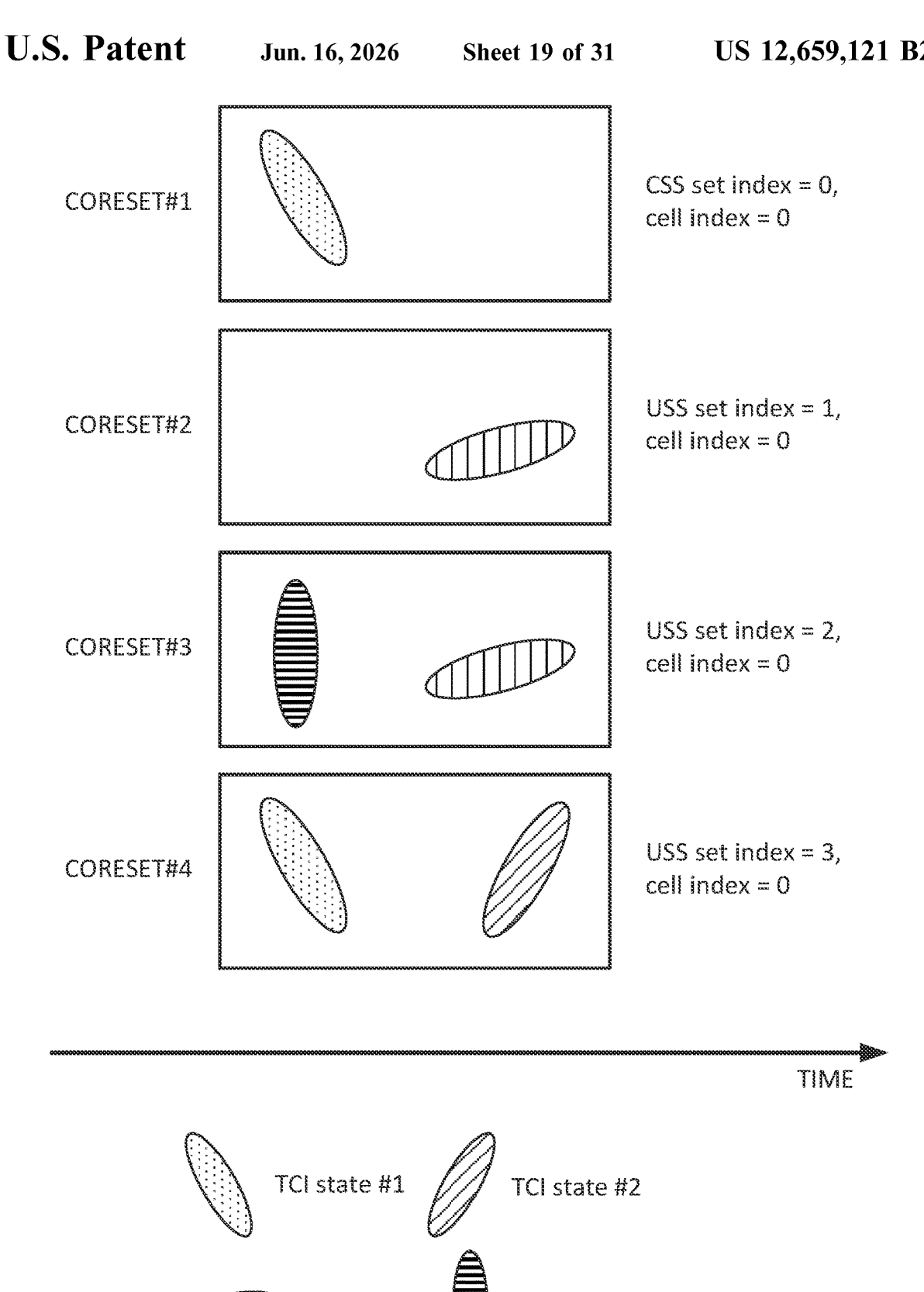
FIG. 19 is a diagram to show an example of a prioritized CORESET in Embodiment Y1.1.2.2.

FIG. 19 is a diagram to show an example of the prioritized CORESET in Embodiment Y1.1.2.2. In the present example, four CORESETs (CORESET #1 to CORESET #4) temporally overlap with each other.

CORESET #1 corresponds to CSS set index=0 and cell index=0, and has one active TCI state (TCI state #1).

CORESET #2 corresponds to USS set index=1 and cell index=0, and has one active TCI state (TCI state #3).

CORESET #3 corresponds to USS set index=2 and cell index=0, and has two active TCI states (TCI state #3 and TCI state #4).

CORESET #4 corresponds to USS set index=3 and cell index=0, and has two active TCI states (TCI state #1 and TCI state #2).

In a case shown in this diagram, the UE first selects, as the prioritized CORESET, CORESET #1 corresponding to the CSS set. CORESET #1 has one active TCI state, and thus operation in Embodiment Y1.1.2 is employed. This prioritized CORESET corresponds to the first prioritized CORESET, and TCI state #1 corresponds to the first prioritized TCI state.

Subsequently, the UE looks up the second prioritized CORESET. A CORESET having two active TCI states and having one TCI state of the TCI states being the same as the first prioritized TCI state, out of remaining CORESET #2 to CORESET #4, is only CORESET #4. Thus, the UE determines, as the second prioritized TCI state, TCI state #2 different from the first prioritized TCI state, out of TCI states for CORESET #4, determines CORESET #4 as the second prioritized CORESET, and monitors, in CORESET #4, PDCCH candidates by applying TCI state #1 and TCI state #2.

[[CORESET Other Than Prioritized CORESET]]

Monitoring of a CORESET other than the prioritized CORESET (the first prioritized CORESET and the second prioritized CORESET) in Embodiment Y1.1.2 will be described.

For a CORESET other than the prioritized CORESETs, the CORESET having one active TCI state, the UE may monitor this CORESET when condition (1.1.2a) or (1.1.2b) below is satisfied:

(1.1.2a) The one active TCI state is the same QCL type D as that of the first prioritized TCI state; and (1.1.2b) The one active TCI state is the same QCL type D as that of the first prioritized TCI state or the second prioritized TCI state.

Figure 20:
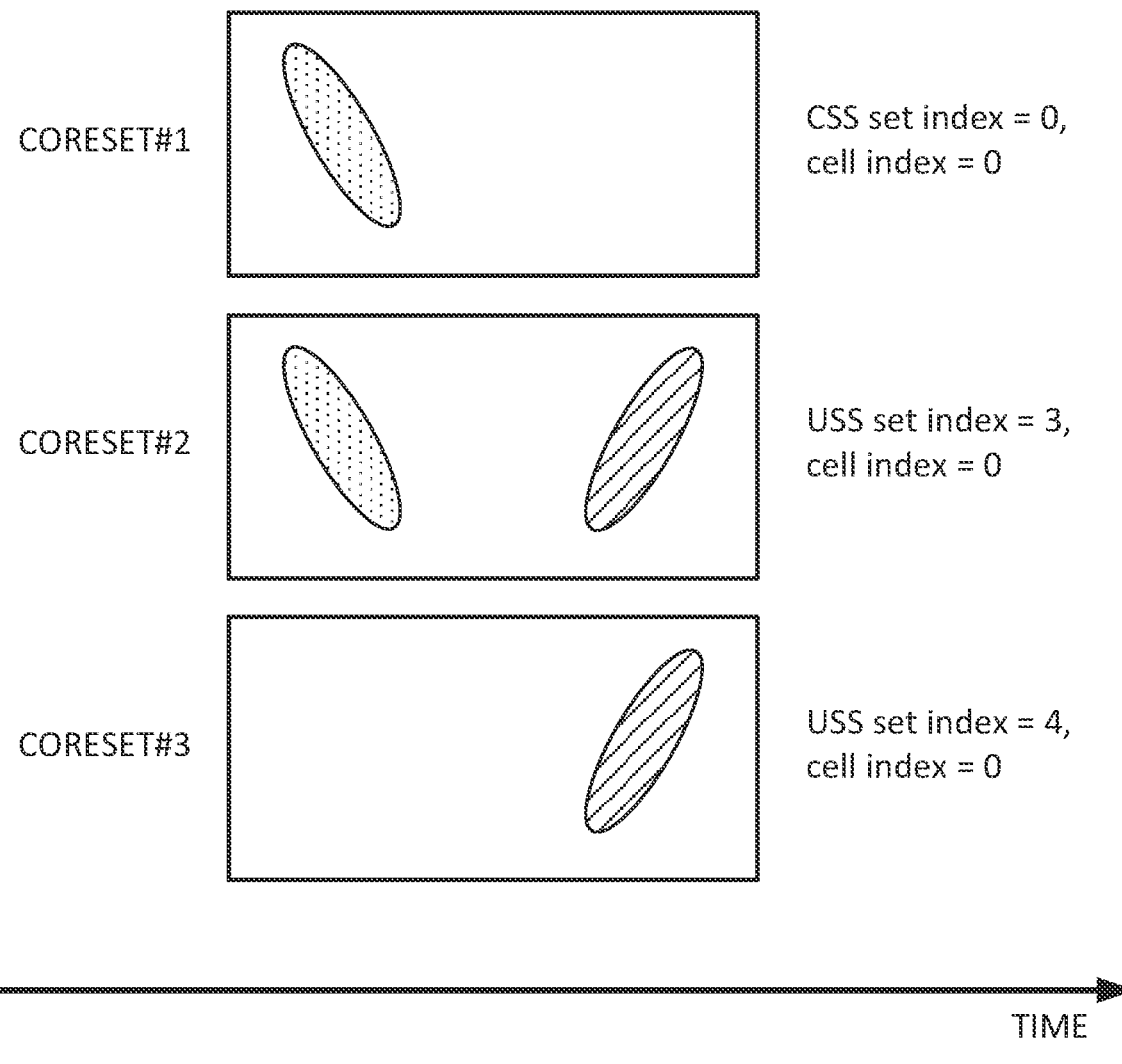
FIG. 20 is a diagram to show an example of a prioritized CORESET and another CORESET to be monitored simultaneously in Embodiment Y1.1.2.

FIG. 20 is a diagram to show an example of the prioritized CORESET and another CORESET to be monitored simultaneously in Embodiment Y1.1.2. In the present example, three CORESETs (CORESET #1 to CORESET #3) temporally overlap with each other.

CORESET #1 corresponds to CSS set index=0 and cell index=0, and has one active TCI state (TCI state #1).

CORESET #2 corresponds to USS set index=3 and cell index=0, and has two active TCI states (TCI state #1 and TCI state #2).

CORESET #3 corresponds to USS set index=4 and cell index=0, and has one active TCI state (TCI state #2).

In a case shown in this diagram, the UE first selects, as the prioritized CORESET, CORESET #1 corresponding to the CSS set. CORESET #1 has one active TCI state, and thus operation in Embodiment Y1.1.2 is employed. This prioritized CORESET corresponds to the first prioritized CORESET, and TCI state #1 corresponds to the first prioritized TCI state.

Subsequently, the UE looks up the second prioritized CORESET. A CORESET having two active TCI states and having one TCI state of the TCI states being the same as the first prioritized TCI state, out of remaining CORESET #2 to CORESET #3, is only CORESET #2. Thus, the UE determines, as the second prioritized TCI state, TCI state #2 different from the first prioritized TCI state, out of TCI states for CORESET #2, determines CORESET #2 as the second prioritized CORESET, and monitors, in CORESET #2, PDCCH candidates by applying TCI state #1 and TCI state #2.

The UE does not monitor CORESET #3 when condition (1.1.2a) is considered. The UE monitors CORESET #3 when condition (1.1.2b) is considered.

For a CORESET other than the prioritized CORESETs, the CORESET having two active TCI states, the UE may monitor this CORESET when condition (1.1.2c), (1.1.2d), or (1.1.2e) below is satisfied:

(1.1.2c) The two active TCI states are the same QCL types D as those of the first prioritized TCI state and the second prioritized TCI;

(1.1.2d) One of the two active TCI states is the same QCL type D as that of the first prioritized TCI state; and (1.1.2e) One of the two active TCI states is the same QCL type D as that of either of the first prioritized TCI state and the second prioritized TCI state.

Note that when (1.1.2d) described above is satisfied, the UE monitors the above-described CORESET by applying only a TCI state being the same QCL type D as that of the first prioritized TCI state.

Note that when (1.1.2e) described above is satisfied, the UE monitors the above-described CORESET by applying only a TCI state being the same QCL type D as that of either of the first prioritized TCI state and the second prioritized TCI state.

Figure 21:
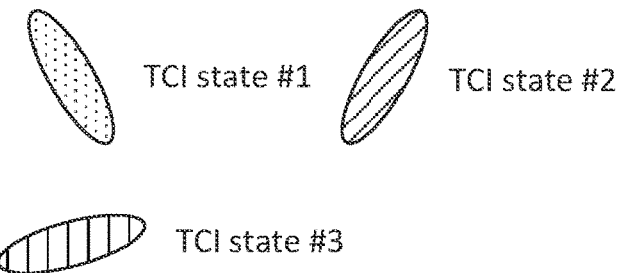
FIG. 21 is a diagram to show an example of a prioritized CORESET and another CORESET to be monitored simultaneously in Embodiment Y1.1.2.

FIG. 21 is a diagram to show an example of the prioritized CORESET and another CORESET to be monitored simultaneously in Embodiment Y1.1.2. In the present example, four CORESETs (CORESET #1 to CORESET #4) temporally overlap with each other.

CORESET #1 corresponds to CSS set index=0 and cell index=0, and has one active TCI state (TCI state #1).

CORESET #2 corresponds to USS set index=3 and cell index=0, and has two active TCI states (TCI state #1 and TCI state #2).

CORESET #3 corresponds to USS set index=4 and cell index=0, and has two active TCI states (TCI state #1 and TCI state #3).

CORESET #4 corresponds to USS set index=5 and cell index=0, and has two active TCI states (TCI state #3 and TCI state #2).

In a case shown in this diagram, the UE first selects, as the prioritized CORESET, CORESET #1 corresponding to the CSS set. CORESET #1 has one active TCI state, and thus operation in Embodiment Y1.1.2 is employed. This prioritized CORESET corresponds to the first prioritized CORESET, and TCI state #1 corresponds to the first prioritized TCI state.

Subsequently, the UE looks up the second prioritized CORESET. CORESETs having two active TCI states and having one TCI state of the TCI states being the same as the first prioritized TCI state, out of remaining CORESET #2 to CORESET #4, are CORESET #2 and CORESET #3. The UE determines, as the second prioritized CORESET, CORESET #2 with a lower SS set index. The UE determines, as the second prioritized TCI state, TCI state #2 different from the first prioritized TCI state, out of TCI states for CORESET #2, and monitors, in CORESET #2, PDCCH candidates by applying TCI state #1 and TCI state #2.

The UE does not monitor CORESET #3 when condition (1.1.2c) is considered. The UE monitors CORESET #3 by applying only TCI state #1 when condition (1.1.2d) or (1.1.2e) is considered.

The UE does not monitor CORESET #4 when condition (1.1.2c) or (1.1.2d) is considered. The UE monitors CORESET #4 by applying only TCI state #2 when condition (1.1.2e) is considered.

Embodiment Y1.2

A priority rule in Embodiment Y1.2 is as follows:

Step 1: If a subset of CORESETs having two active TCI states, out of CORESETs with contention, is present, a priority rule in Rel-16 NR is applied only to them. The step is ended if a prioritized CORESET is identified. If not, proceed to step 2.

Step 2: If the prioritized CORESET is not identified at step 1, the priority rule in Rel-16 NR is applied only to a subset of CORESETs having one active TCI state, out of the CORESETs with the contention.

That is, in Embodiment Y1.2, the UE determines the prioritized CORESET in accordance with a priority rule in which a monitoring target CORESET is preferentially determined in order from a CSS set having two active TCI states to a USS set having two active TCI states to a CSS set having one active TCI state to a USS set having one active TCI state.

Note that, from the same kind of (CSS or USS) SS sets having the same number of active TCI states, an SS set with a lower index (that is, one with a lower cell index, and moreover, one with a lower SS set index in a case of the same cell index) is selected as the prioritized CORESET.

A CORESET to be monitored may be determined on the basis of CORESETs other than the prioritized CORESET, in a manner similar to that described in Embodiment Y1.1.1. That is, for a CORESET other than the prioritized CORESET, the CORESET having one active TCI state, the UE may monitor this CORESET when the one active TCI state is the same QCL type D as that of either of the two active TCI states for the prioritized CORESET.

For a CORESET other than the prioritized CORESET, the CORESET having two active TCI states, the UE may monitor this CORESET when (1.1.1a) or (1.1.1b) mentioned above is satisfied.

Figure 22:
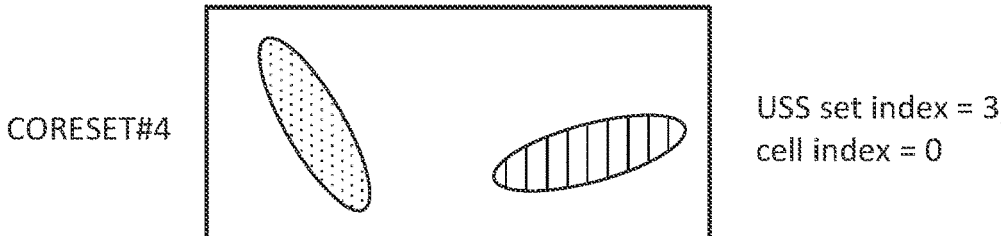
FIG. 22 is a diagram to show an example of a prioritized CORESET and another CORESET to be monitored simultaneously in Embodiment Y1.2.

FIG. 22 is a diagram to show an example of the prioritized CORESET and another CORESET to be monitored simultaneously in Embodiment Y1.2. In the present example, four CORESETs (CORESET #1 to CORESET #4) temporally overlap with each other.

CORESET #1 corresponds to CSS set index=0 and cell index=0, and has one active TCI state (TCI state #1).

CORESET #2 corresponds to USS set index=1 and cell index=0, and has one active TCI state (TCI state #2).

CORESET #3 corresponds to USS set index=2 and cell index=0, and has two active TCI states (TCI state #1 and TCI state #2).

CORESET #4 corresponds to USS set index=3 and cell index=0, and has two active TCI states (TCI state #1 and TCI state #3).

In a case shown in this diagram, the CORESET having two active TCI states is CORESET #3 and CORESET #4, and CORESET #3 corresponding to a lower SS set index is selected as the prioritized CORESET.

One TCI state for CORESET #1 is the same QCL type D as that of TCI state #1 for the prioritized CORESET, and thus the UE monitors CORESET #1.

One TCI state for CORESET #2 is the same QCL type D as that of TCI state #2 for the prioritized CORESET, and thus the UE monitors CORESET #2.

One of two TCI states for CORESET #4 is the same QCL type D as that of TCI state #1 for the prioritized CORESET, but the other is QCL type D (TCI state #3) different from that of TCI state #2 for the prioritized CORESET. Thus, the UE that follows (1.1.1a) described above does not monitor CORESET #4. The UE that follows (1.1.1b) described above monitors CORESET #4 by applying only TCI state #1.

Embodiment Y1.3

A priority rule in Embodiment Y1.3 is as follows:

Step 1: If a CORESET having two active TCI states and corresponding to a CSS set with the lowest index in a cell with the lowest index including CSS sets, out of CORESETs with contention, is present, this CORESET is determined as a prioritized CORESET, and this step is ended. If not, proceed to step 2.

Step 2: If a CORESET having one active TCI state and corresponding to a CSS set with the lowest index in a cell with the lowest index including CSS sets, out of the CORESETs with the contention, is present, this CORE-SET is determined as the prioritized CORESET, and this step is ended. If not, proceed to step 3.

Step 3: If a CORESET having two active TCI states and corresponding to a USS set with the lowest index in a cell with the lowest index including USS sets, out of the CORESETs with the contention, is present, this CORE-SET is determined as the prioritized CORESET, and this step is ended. If not, proceed to step 4.

Step 4: If a CORESET having one active TCI state and corresponding to a USS set with the lowest index in a cell with the lowest index including USS sets, out of the CORESETs with the contention, is present, this CORE-SET is determined as the prioritized CORESET, and this step is ended.

That is, in Embodiment Y1.3, the UE determines the prioritized CORESET in accordance with a priority rule in which a monitoring target CORESET is preferentially determined in order from a CSS set having two active TCI states to a CSS set having one active TCI state to a USS set having two active TCI states to a USS set having one active TCI state.

Note that, from the same kind of (CSS or USS) SS sets having the same number of active TCI states, an SS set with a lower index (that is, one with a lower cell index, and moreover, one with a lower SS set index in a case of the same cell index) is selected as the prioritized CORESET.

When the prioritized CORESET is determined at step 1 or step 3 described above, the UE may further determine, on the basis of Embodiment Y1.1.1, a CORESET to be monitored out of CORESETs other than the prioritized CORE-SET.

When the prioritized CORESET is determined at step 2 or step 4 described above, the UE may further determine, on the basis of Embodiment Y1.1.2, a CORESET to be monitored out of CORESETs other than the prioritized CORE-SET.

According to Embodiment Y1 described above, it is possible to appropriately determine, in contention between a plurality of PDCCHs (CORESETs), a PDCCH to be monitored.

Embodiment Y2

Embodiment Y2 relates to an FDM PDCCH repetition scheme.

In Embodiment Y2, two SS sets having a plurality of corresponding CORESETs may be used for PDCCH repetition. An association between the two SS sets and the plurality of CORESETs may be defined by specifications beforehand, or may be configured for a UE by higher layer signaling (for example, RRC signaling).

In Embodiment Y2, in a case where contention between a plurality of different QCL type D PDCCHs occurs, the UE determines, on the basis of at least one priority rule described in Embodiment Y2.1 to Embodiment Y2.3, a prioritized CORESET. Each of Embodiment Y2.1 to Embodiment Y2.3 will be described below.

Note that an association between a certain CORESET (for example, the prioritized CORESET) and another CORESET may be defined by specifications beforehand, or may be configured for the UE by higher layer signaling (for example, RRC signaling). The association is not limited to an association between CORESETs, and a CORESET and an SS set may be associated with each other, or SS sets may be associated with each other.

In Embodiment Y2, the prioritized CORESET and a "prioritized CORESET/SS set corresponding to a prioritized CORESET" may be interchangeably interpreted. In Embodiment Y2, another CORESET and "another CORE-SET/SS set corresponding to another CORESET" may be interchangeably interpreted.

The "association" in Embodiment Y2 may be referred to as an association for control of contention between a plurality of PDCCHs, an association for CORESET selection for PDCCH monitoring, an association related to a CORE-SET priority, or the like.

Embodiment Y2.1

A priority rule in Embodiment Y2.1 is the same as that in Rel-16 NR. That is, the UE determines the prioritized CORESET in accordance with a priority rule in which a CSS set is preferentially monitored over a USS set and in which, between the same kind of (CSS or USS) SS sets, an SS set with a lower index (that is, one with a lower cell index, and moreover, one with a lower SS set index in a case of the same cell index) is preferentially monitored.

Further, Embodiment Y2.1 is broadly classified into two below:

Embodiment Y2.1.1: the prioritized CORESET is associated with another CORESET; and Embodiment Y2.1.2: the prioritized CORESET is not associated with another CORESET.

Embodiment Y2.1.1

The UE may monitor another CORESET related to the prioritized CORESET simultaneously with the prioritized CORESET.

In Embodiment Y2.1.1, a TCI state for the prioritized CORESET may be referred to as a first prioritized TCI state (1st priority TCI state). Also, a TCI state for such another CORESET may be referred to as a second prioritized TCI state (2nd priority TCI state).

For a remaining CORESET except the prioritized CORE-SET and such another CORESET, the UE may monitor this CORESET when condition (2.1.1a) or (2.1.1b) below is satisfied:

(2.1.1a) The TCI state is the same QCL type D as that of the first prioritized TCI state; and (2.1.1b) The TCI state is the same QCL type D as that of the first prioritized TCI state or the second prioritized TCI state.

Figure 23:
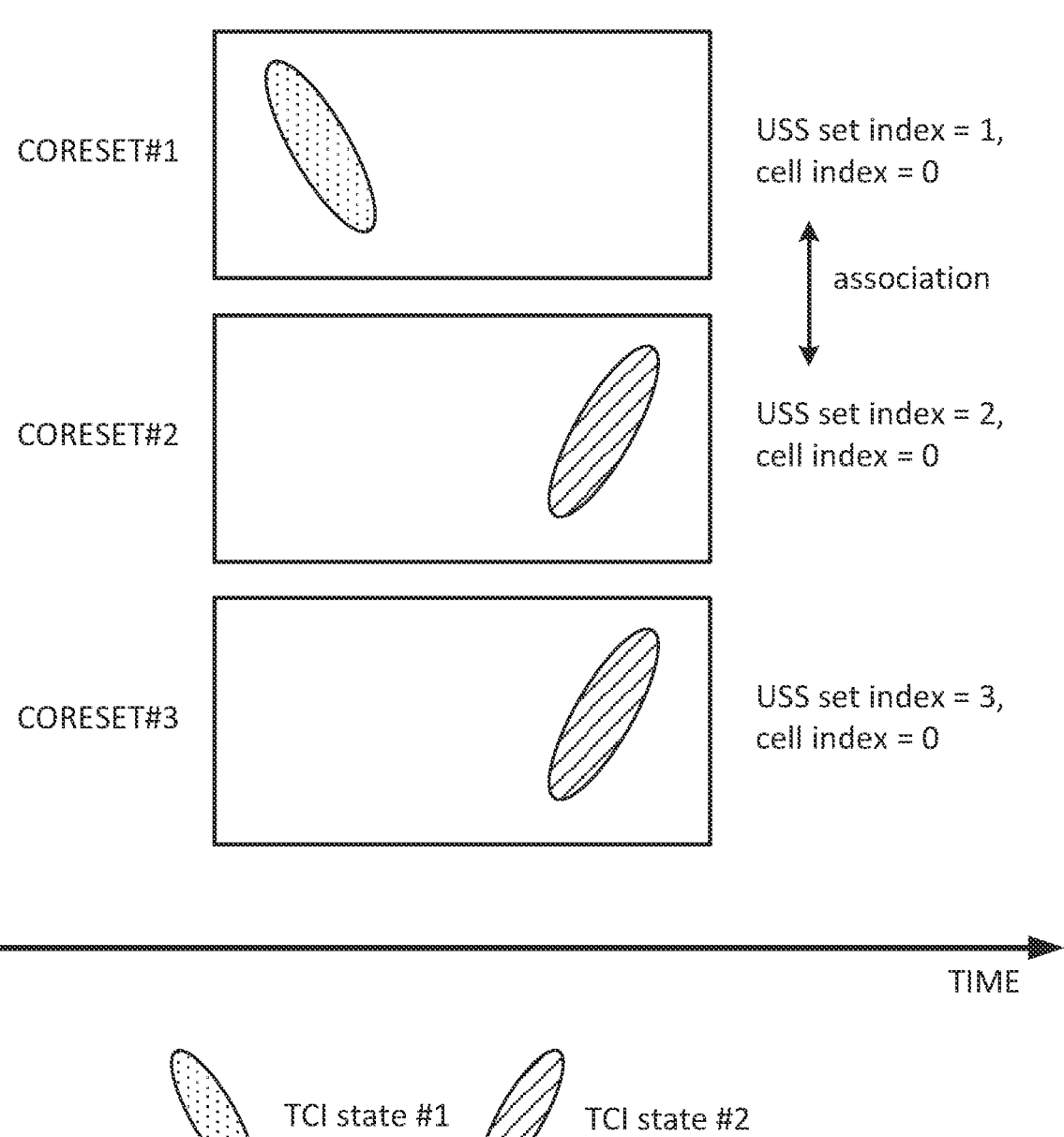
FIG. 23 is a diagram to show an example of a prioritized CORESET and another CORESET to be monitored simultaneously in Embodiment Y2.1.1.

FIG. 23 is a diagram to show an example of the prioritized CORESET and another CORESET to be monitored simultaneously in Embodiment Y2.1.1. In the present example, three CORESETs (CORESET #1 to CORESET #3) temporally overlap with each other.

CORESET #1 corresponds to USS set index=1 and cell index=0, and has one active TCI state (TCI state #1).

CORESET #2 corresponds to USS set index=2 and cell index=0, and has one active TCI state (TCI state #2).

CORESET #3 corresponds to USS set index=3 and cell index=0, and has one active TCI state (TCI state #2).

CORESET #1 and CORESET #2 are associated with each other.

In a case shown in this diagram, the UE first selects, as the prioritized CORESET, CORESET #1 corresponding to a USS set with the lowest USS set index. CORESET #1 has another CORESET to be associated with CORESET #1 (CORESET #2), and thus operation in Embodiment Y2.1.1 is employed.

CORESET #2 is associated with the prioritized CORESET, and thus the UE monitors CORESET #2. The UE determines the active TCI state for CORESET #2 as the second prioritized TCI state.

CORESET #3 is not associated with the prioritized CORESET, but the active TCI state for CORESET #3 is the same QCL type D as that of the second prioritized TCI state. Thus, the UE that follows (2.1.1a) described above does not monitor CORESET #3. The UE that follows (2.1.1b) described above monitors CORESET #3.

Embodiment Y2.1.2

For Embodiment Y2.1.2, a prioritized CORESET determined first in accordance with the same priority rule as that in Rel-16 NR is also referred to as a first prioritized CORESET, and a prioritized CORESET determined subsequently other than the first prioritized CORESET is also referred to as a second prioritized CORESET. The second prioritized CORESET may be referred to as CORESET X.

The active TCI state for the first prioritized CORESET may be referred to as a first prioritized TCI state (1st priority TCI state). The active TCI states for the second prioritized CORESET may be referred to as a second prioritized TCI state (2nd priority TCI state).

Embodiment Y2.1.2 is broadly classified into Embodiment Y2.1.2.1 and Embodiment Y2.1.2.2 by methods for determining the second prioritized CORESET.

Embodiment Y2.1.2.1

The second prioritized CORESET may be determined on the basis of remaining CORESETs with contention except the first prioritized CORESET, in accordance with a priority rule similar to that in Rel. 16. That is, the second prioritized CORESET may correspond to a CSS set with the lowest index, out of the remaining CORESETs with the contention, in a cell with the lowest index including CSS sets, if any, and, if not, may correspond to a USS set with the lowest index, out of the remaining CORESETs with the contention, in a cell with the lowest index. The lowest USS set index is determined across all USS sets having at least one PDCCH candidate in an overlapped PDCCH monitoring occasion.

When an active TCI state for a candidate for the second prioritized CORESET derived in accordance with the above-described priority rule is the same as the first prioritized TCI state, a next candidate (CORESET corresponding to a next SS set/cell with the lowest index) may be looked up as a candidate for the second prioritized CORESET. That is, the UE may continue to look up the second prioritized CORESET until the active TCI state is different from the first prioritized TCI state.

When a CORESET having only one active TCI state different from the first prioritized TCI state is identified in accordance with the above-described priority rule, the UE may determine this active TCI state as the second prioritized TCI state, and may determine this CORESET as the second prioritized CORESET.

Note that even when the active TCI state for the candidate for the second prioritized CORESET derived in accordance with the above-described priority rule is the same as the first prioritized TCI state, the UE may determine this active TCI state as the second prioritized TCI state, and may determine this candidate as the second prioritized CORESET. In this case, the second prioritized CORESET is the same as the first prioritized CORESET, and thus it may be indicated that the second prioritized CORESET is absent.

Figure 24:
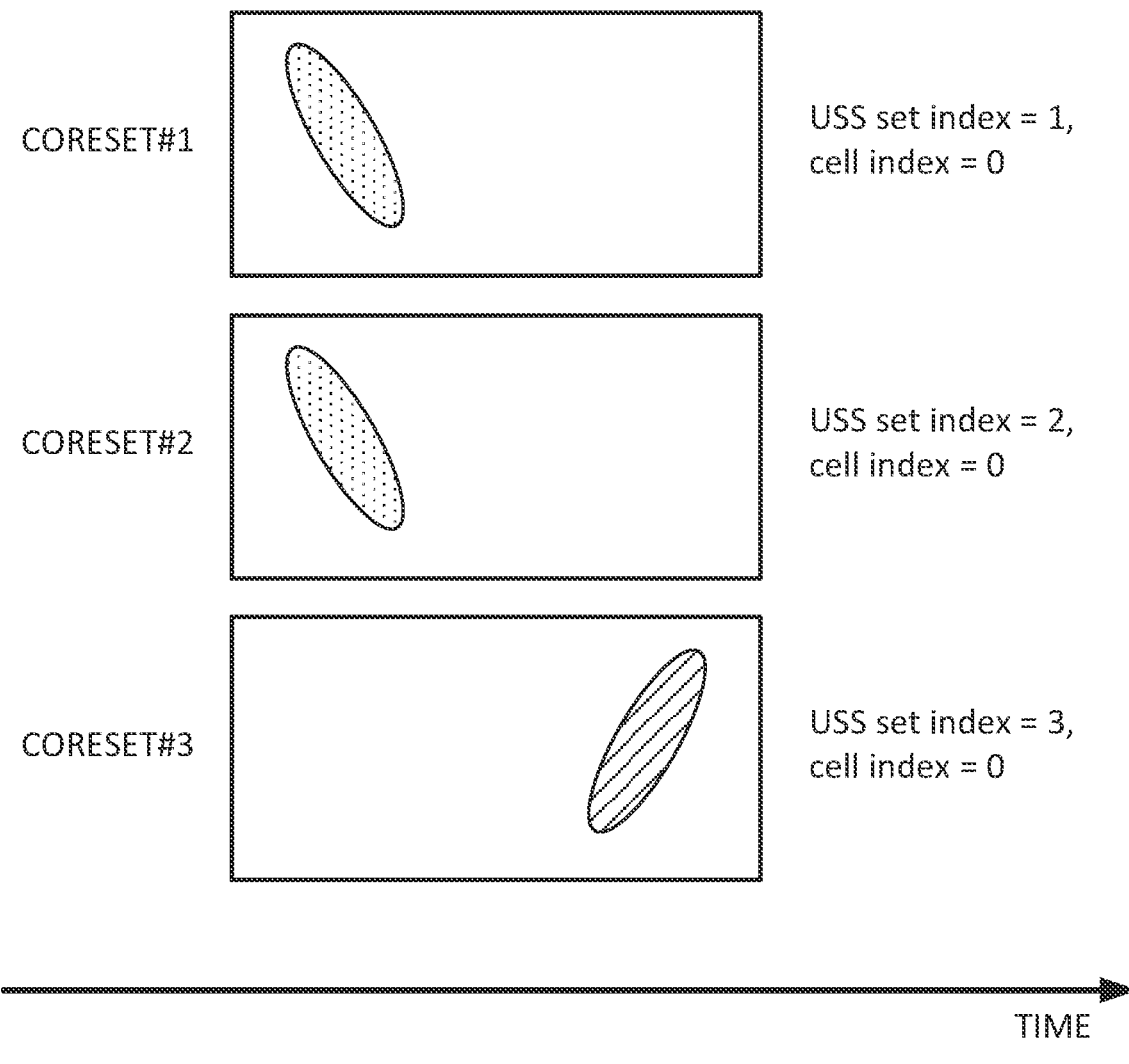
FIG. 24 is a diagram to show an example of a prioritized CORESET in Embodiment Y2.1.2.1.

FIG. 24 is a diagram to show an example of the prioritized CORESET in Embodiment Y2.1.2.1. In the present example, three CORESETs (CORESET #1 to CORESET #3) temporally overlap with each other.

CORESET #1 corresponds to USS set index=1 and cell index=0, and has one active TCI state (TCI state #1).

CORESET #2 corresponds to USS set index=2 and cell index=0, and has one active TCI state (TCI state #1).

CORESET #3 corresponds to USS set index=3 and cell index=0, and has one active TCI state (TCI state #2).

In a case shown in this diagram, the UE first selects, as the prioritized CORESET, CORESET #1 corresponding to a USS set with the lowest USS set index. CORESET #1 does not have another CORESET to be associated with CORESET #1, and thus operation in Embodiment Y2.1.2 is employed. This prioritized CORESET corresponds to the first prioritized CORESET, and TCI state #1 corresponds to the first prioritized TCI state.

Subsequently, the UE looks up the second prioritized CORESET. A TCI state for CORESET #3 (TCI state #2) is different from TCI state #1 for the prioritized CORESET, and thus the UE determines this TCI state #2 as the second prioritized TCI state, determines CORESET #3 as the second prioritized CORESET, and monitors CORESET #3.

Embodiment Y2.1.2.2

The UE first determines, on the basis of remaining CORESETs with contention except the first prioritized CORESET, a subset of CORESETs associated with another CORESET, the CORESETs having a TCI state being the same as the first prioritized TCI state.

The UE may determine, on the basis of the subset, the second prioritized CORESET in accordance with a priority rule similar to that in Rel. 16. That is, the second prioritized CORESET may correspond to a CSS set with the lowest index, out of the CORESETs included in the subset, in a cell with the lowest index including CSS sets, if any, and, if not, may correspond to a USS set with the lowest index, out of the CORESETs included in the subset, in a cell with the lowest index. The lowest USS set index is determined across all USS sets having at least one PDCCH candidate in an overlapped PDCCH monitoring occasion.

The second prioritized TCI state may correspond to an active TCI state for another CORESET associated with the second prioritized CORESET.

Note that the second prioritized CORESET may be a CORESET associated with a CORESET corresponding to a CSS set with the lowest index, out of the CORESETs included in the subset, in a cell with the lowest index including CSS sets, if any, and, if not, may be a CORESET associated with a CORESET corresponding to a USS set with the lowest index, out of the CORESETs included in the subset, in a cell with the lowest index. In this case, the second prioritized TCI state may correspond to an active TCI state for the second prioritized CORESET.

Figure 25:
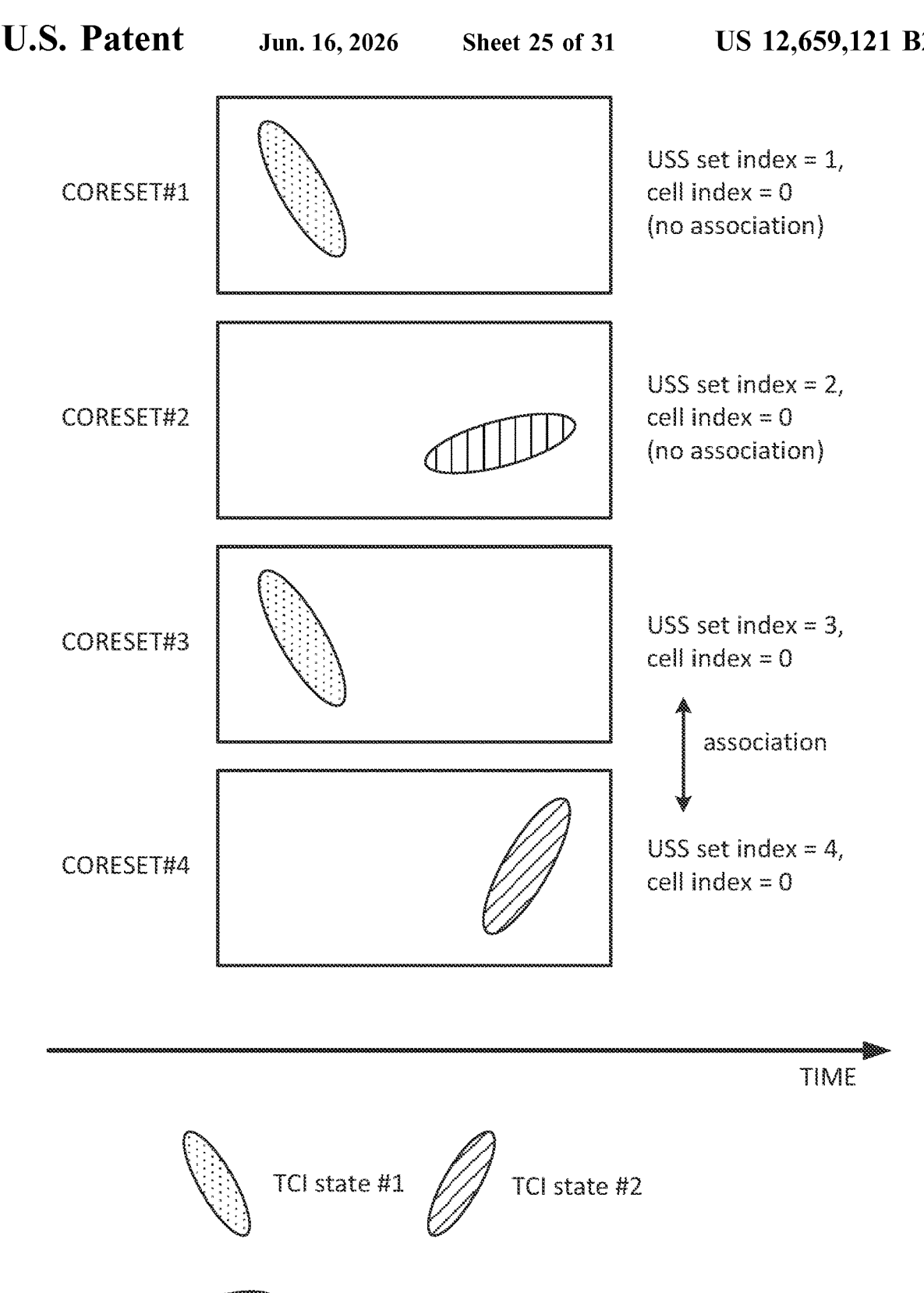
FIG. 25 is a diagram to show an example of a prioritized CORESET in Embodiment Y2.1.2.2.

FIG. 25 is a diagram to show an example of the prioritized CORESET in Embodiment Y2.1.2.2. In the present example, four CORESETs (CORESET #1 to CORESET #4) temporally overlap with each other.

> CORESET #1 corresponds to USS set index=1 and cell index=0, and has one active TCI state (TCI state #1).
> CORESET #2 corresponds to USS set index=2 and cell index=0, and has one active TCI state (TCI state #3).
> CORESET #3 corresponds to USS set index=3 and cell index=0, and has one active TCI state (TCI state #1).
> CORESET #4 corresponds to USS set index=4 and cell index=0, and has one active TCI state (TCI state #2).
> CORESET #1 is not associated with another CORESET. CORESET #2 is not associated with another CORE-SET. CORESET #3 and CORESET #4 are associated with each other.

In a case shown in this diagram, the UE first selects, as the prioritized CORESET, CORESET #1 corresponding to a USS set with the lowest USS set index. CORESET #1 does not have another CORESET to be associated with CORE-SET #1, and thus operation in Embodiment Y2.1.2 is employed. This prioritized CORESET corresponds to the first prioritized CORESET, and TCI state #1 corresponds to the first prioritized TCI state.

Subsequently, the UE looks up the second prioritized CORESET. A CORESET having another CORESET associated with the CORESET and having a TCI state being the same as the first prioritized TCI state, out of remaining CORESET #2 to CORESET #4, is only CORESET #3. Thus, the UE determines CORESET #3 as the second prioritized CORESET, and determines, as the second prioritized TCI state, TCI state #2 for CORESET #4 associated with CORESET #3. The UE monitors PDCCH candidates in CORESET #3 and CORESET #4.

[[CORESET Other Than Prioritized CORESET]]

Monitoring of the prioritized CORESET (the first prioritized CORESET and the second prioritized CORESET) and a CORESET other than CORESETs associated with the prioritized CORESET in Embodiment Y2.1.2 will be described.

For these CORESETs, the UE may monitor this CORE-SET when condition (2.1.2a) or (2.1.2b) below is satisfied:

> (2.1.2a) The TCI state is the same QCL type D as that of the first prioritized TCI state; and
> (2.1.2b) The TCI state is the same QCL type D as that of the first prioritized TCI state or the second prioritized TCI state.

Figure 26:
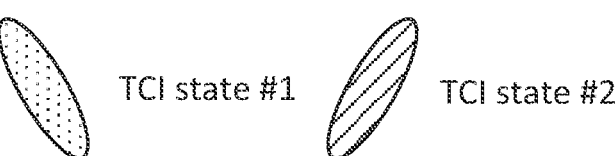
FIG. 26 is a diagram to show an example of a prioritized CORESET and another CORESET to be monitored simultaneously in Embodiment Y2.1.2.

FIG. 26 is a diagram to show an example of the prioritized CORESET and another CORESET to be monitored simultaneously in Embodiment Y2.1.2. In the present example, four CORESETs (CORESET #1 to CORESET #4) temporally overlap with each other.

> CORESET #1 corresponds to USS set index=1 and cell index=0, and has one active TCI state (TCI state #1).

> CORESET #2 corresponds to USS set index=3 and cell index=0, and has one active TCI state (TCI state #1).
> CORESET #3 corresponds to USS set index=4 and cell index=0, and has one active TCI state (TCI state #2).
> CORESET #4 corresponds to USS set index=5 and cell index=0, and has one active TCI state (TCI state #2).
> CORESET #1 is not associated with another CORESET. CORESET #2 and CORESET #3 are associated with each other.

In a case shown in this diagram, the UE first selects, as the prioritized CORESET, CORESET #1 corresponding to a USS set with the lowest USS set index. CORESET #1 does not have another CORESET to be associated with CORE-SET #1, and thus operation in Embodiment Y2.1.2 is employed. This prioritized CORESET corresponds to the first prioritized CORESET, and TCI state #1 corresponds to the first prioritized TCI state.

Subsequently, the UE looks up the second prioritized CORESET. A CORESET having another CORESET associated with the CORESET and having a TCI state being the same as the first prioritized TCI state, out of remaining CORESET #2 to CORESET #4, is only CORESET #2. Thus, the UE determines CORESET #2 as the second prioritized CORESET, and determines, as the second prioritized TCI state, TCI state #2 for CORESET #3 associated with CORESET #2. The UE monitors PDCCH candidates in CORESET #2 and CORESET #3.

The UE does not monitor CORESET #4 when condition (2.1.2a) is considered. The UE monitors CORESET #4 when condition (2.1.2b) is considered.

Embodiment Y2.2

A priority rule in Embodiment Y2.2 is as follows:

Step 1: If a subset of CORESETs associated with another CORESET (in other words, having an association with another CORESET), out of CORESETs with contention, is present, a priority rule in Rel-16 NR is applied only to them. The step is ended if a prioritized CORESET is identified. If not, proceed to step 2.

Step 2: If the prioritized CORESET is not identified at step 1, the priority rule in Rel-16 NR is applied only to a subset of CORESETs not having an association with another CORESET, out of the CORESETs with the contention.

That is, in Embodiment Y2.2, the UE determines the prioritized CORESET in accordance with a priority rule in which a monitoring target CORESET is preferentially determined in order from a CSS set having an association with another CORESET (hereinafter, also simply referred to as an "association" in the present disclosure) to a USS set having an association to a CSS set not having an association to a USS set not having an association.

Note that, from the same kind of (CSS or USS) SS sets having an association (or not having the association), an SS set with a lower index (that is, one with a lower cell index, and moreover, one with a lower SS set index in a case of the same cell index) is selected as the prioritized CORESET.

A CORESET to be monitored may be determined on the basis of CORESETs other than the prioritized CORESET, in a manner similar to that described in Embodiment Y2.1.1. That is, for a remaining CORESET except the prioritized CORESET and another CORESET associated with the prioritized CORESET, the UE may monitor this CORESET when (2.1.1a) or (2.1.1b) mentioned above is satisfied.

Figure 27:
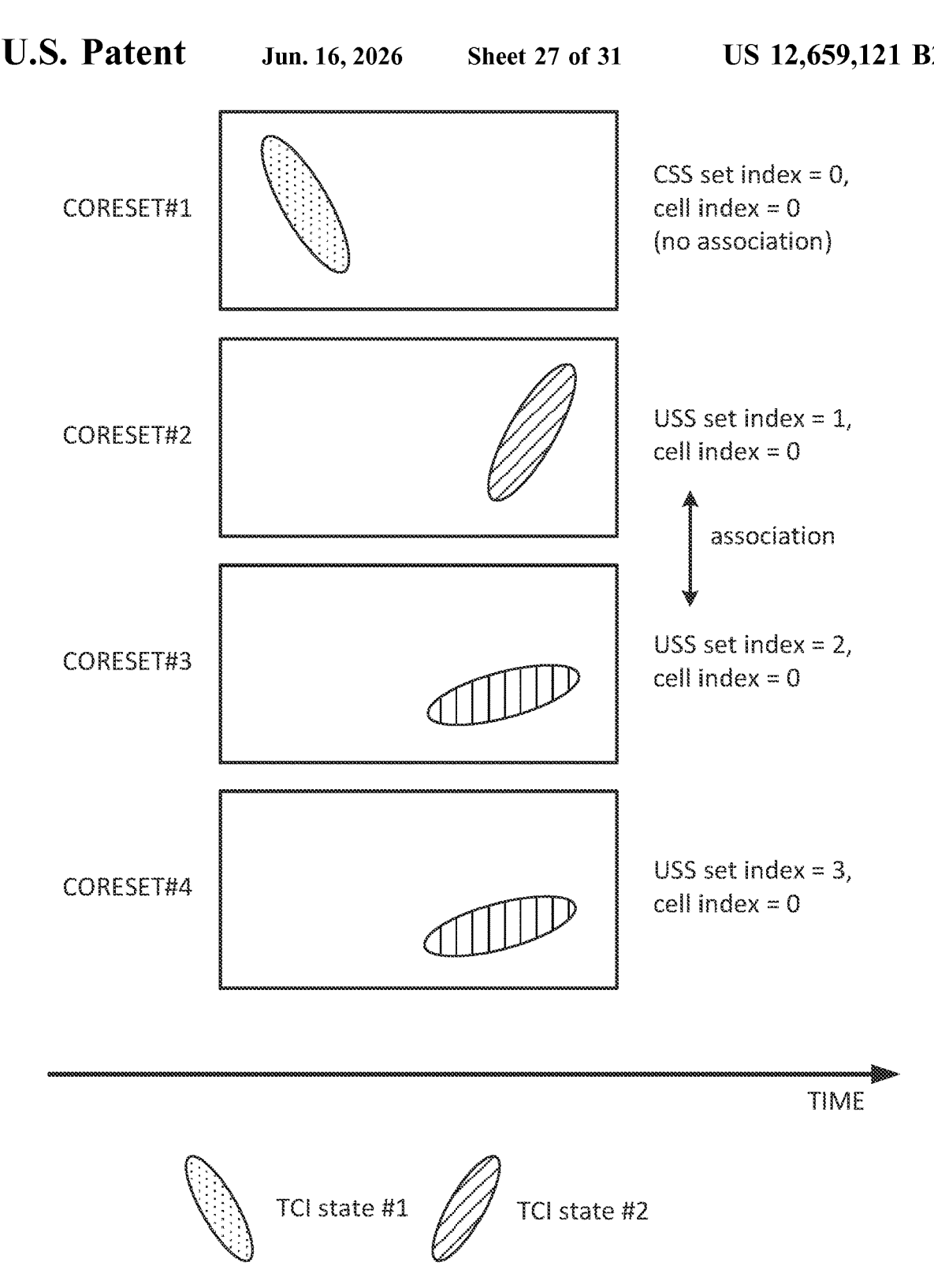
FIG. 27 is a diagram to show an example of a prioritized CORESET and another CORESET to be monitored simultaneously in Embodiment Y2.2.

FIG. 27 is a diagram to show an example of the prioritized CORESET and another CORESET to be monitored simultaneously in Embodiment Y2.2. In the present example, four CORESETs (CORESET #1 to CORESET #4) temporally overlap with each other.

CORESET #1 corresponds to CSS set index=0 and cell index=0, and has one active TCI state (TCI state #1).

CORESET #2 corresponds to USS set index=1 and cell index=0, and has one active TCI state (TCI state #2).

CORESET #3 corresponds to USS set index=2 and cell index=0, and has one active TCI state (TCI state #3).

CORESET #4 corresponds to USS set index=3 and cell index=0, and has one active TCI state (TCI state #3).

CORESET #1 is not associated with another CORESET. CORESET #2 and CORESET #3 are associated with each other.

In a case shown in this diagram, CORESETs associated with such another CORESET are CORESET #2 and CORESET #3, and CORESET #2 corresponding to a lower SS set index is selected as the prioritized CORESET. TCI state #2 for CORESET #2 corresponds to the first prioritized TCI state.

TCI state #3 for CORESET #3 associated with the prioritized CORESET is determined as the second prioritized TCI state. The UE monitors PDCCH candidates in CORESET #2 and CORESET #3.

The TCI state for CORESET #1 is neither the first prioritized TCI state nor the second TCI state, and thus the UE does not monitor CORESET #1. The UE that follows (2.1.1a) described above does not monitor CORESET #4. The UE that follows (2.1.1b) described above monitors CORESET #4.

Embodiment Y2.3

A priority rule in Embodiment Y2.3 is as follows:

Step 1: If a CORESET having an association and corresponding to a CSS set with the lowest index in a cell with the lowest index including CSS sets, out of CORESETs with contention, is present, this CORESET is determined as the prioritized CORESET, and this step is ended. If not, proceed to step 2.

Step 2: If a CORESET not having an association and corresponding to a CSS set with the lowest index in a cell with the lowest index including CSS sets, out of the CORESETs with the contention, is present, this CORESET is determined as the prioritized CORESET, and this step is ended. If not, proceed to step 3.

Step 3: If a CORESET having an association and corresponding to a USS set with the lowest index in a cell with the lowest index including USS sets, out of the CORESETs with the contention, is present, this CORESET is determined as the prioritized CORESET, and this step is ended. If not, proceed to step 4.

Step 4: If a CORESET not having an association and corresponding to a USS set with the lowest index in a cell with the lowest index including USS sets, out of the CORESETs with the contention, is present, this CORESET is determined as the prioritized CORESET, and this step is ended.

That is, in Embodiment Y2.3, the UE determines the prioritized CORESET in accordance with a priority rule in which a monitoring target CORESET is preferentially determined in order from a CSS set having an association to a CSS set not having an association to a USS set having an association to a USS set not having an association.

Note that, from the same kind of (CSS or USS) SS sets having an association (or not having the association), an SS set with a lower index (that is, one with a lower cell index, and moreover, one with a lower SS set index in a case of the same cell index) is selected as the prioritized CORESET.

When the prioritized CORESET is determined at step 1 or step 3 described above, the UE may further determine, on the basis of Embodiment Y2.1.1, a CORESET to be monitored out of CORESETs other than the prioritized CORESET.

When the prioritized CORESET is determined at step 2 or step 4 described above, the UE may further determine, on the basis of Embodiment Y2.1.2, a CORESET to be monitored out of CORESETs other than the prioritized CORESET.

According to Embodiment Y2 described above, it is possible to appropriately determine, in contention between a plurality of PDCCHs (CORESETs), a PDCCH to be monitored.

Variations of Embodiment Y

Note that at least one of the above-mentioned embodiments may be employed only in a UE that has reported a specific UE capability or that supports the specific UE capability.

The specific UE capability may indicate at least one of the following:

Whether to support SFN PDCCH repetition scheme

Whether to support FDM PDCCH repetition scheme

Whether to support SFN PDCCH repetition scheme for CSS set

Whether to support FDM PDCCH repetition scheme for CSS set

Whether to support simultaneous reception of two or more different QCL type D PDCCHs At least one of the above-mentioned embodiments may be employed in a case where specific information related to the above-mentioned embodiments is configured for the UE by higher layer signaling (when the specific information is not configured, for example, operation in Rel. 15/16 is employed). For example, the specific information may be information indicating enabling of the SFN/FDM PDCCH repetition scheme, an arbitrary RRC parameter for specific release (for example, Rel. 17), or the like.

Note that Embodiment Y1 is not limited to a case where the SFN PDCCH repetition scheme is configured for the UE (or used by the UE), and can be employed in a case where two or two or more TCI states are activated per CORESET.

Embodiment Y2 is not limited to a case where the FDM PDCCH repetition scheme is configured for the UE (or used by the UE), and can be employed in a case where two SS sets having a plurality of corresponding CORESETs are used for PDCCHs.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 28:
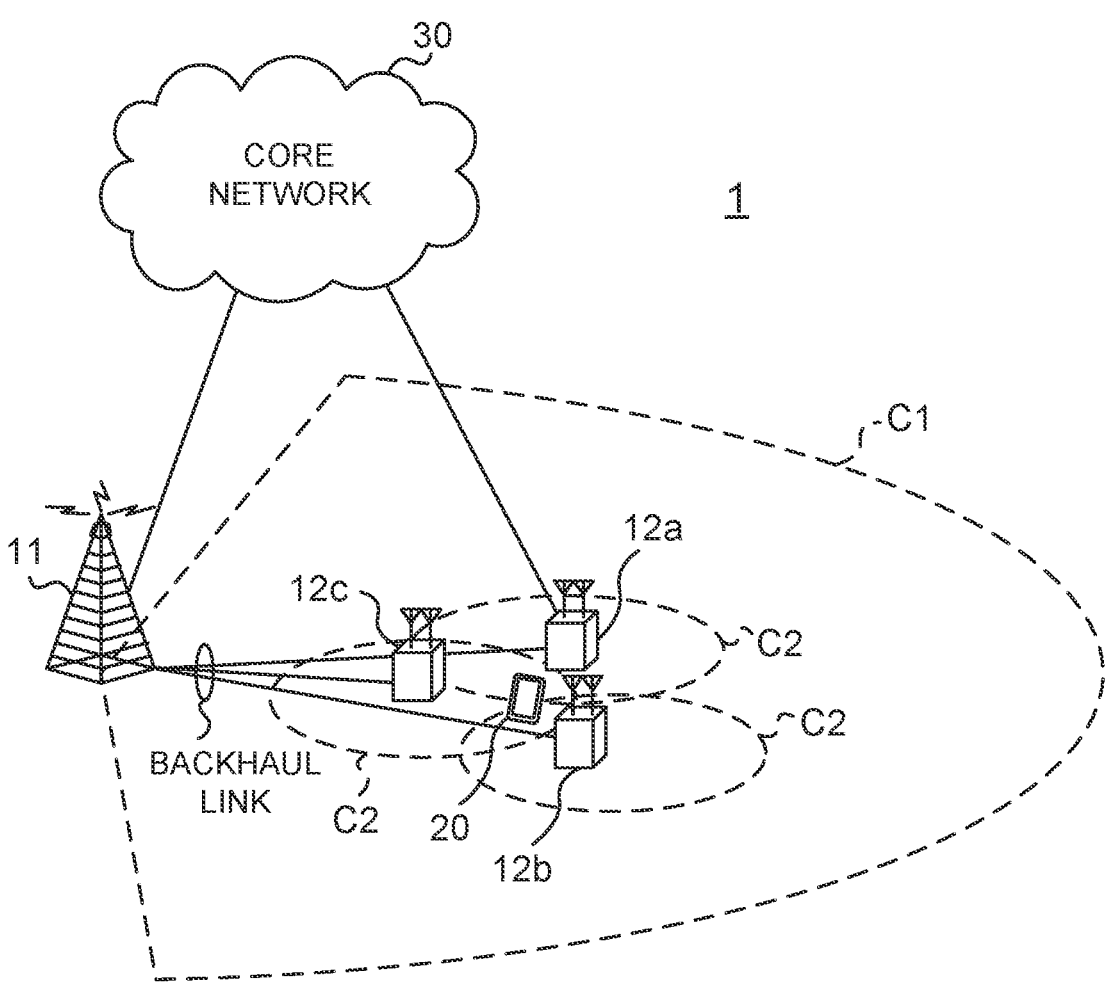
FIG. 28 is a diagram to show an example of a schematic structure of a radio communication system according to one embodiment.

FIG. 28 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-PAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 29:
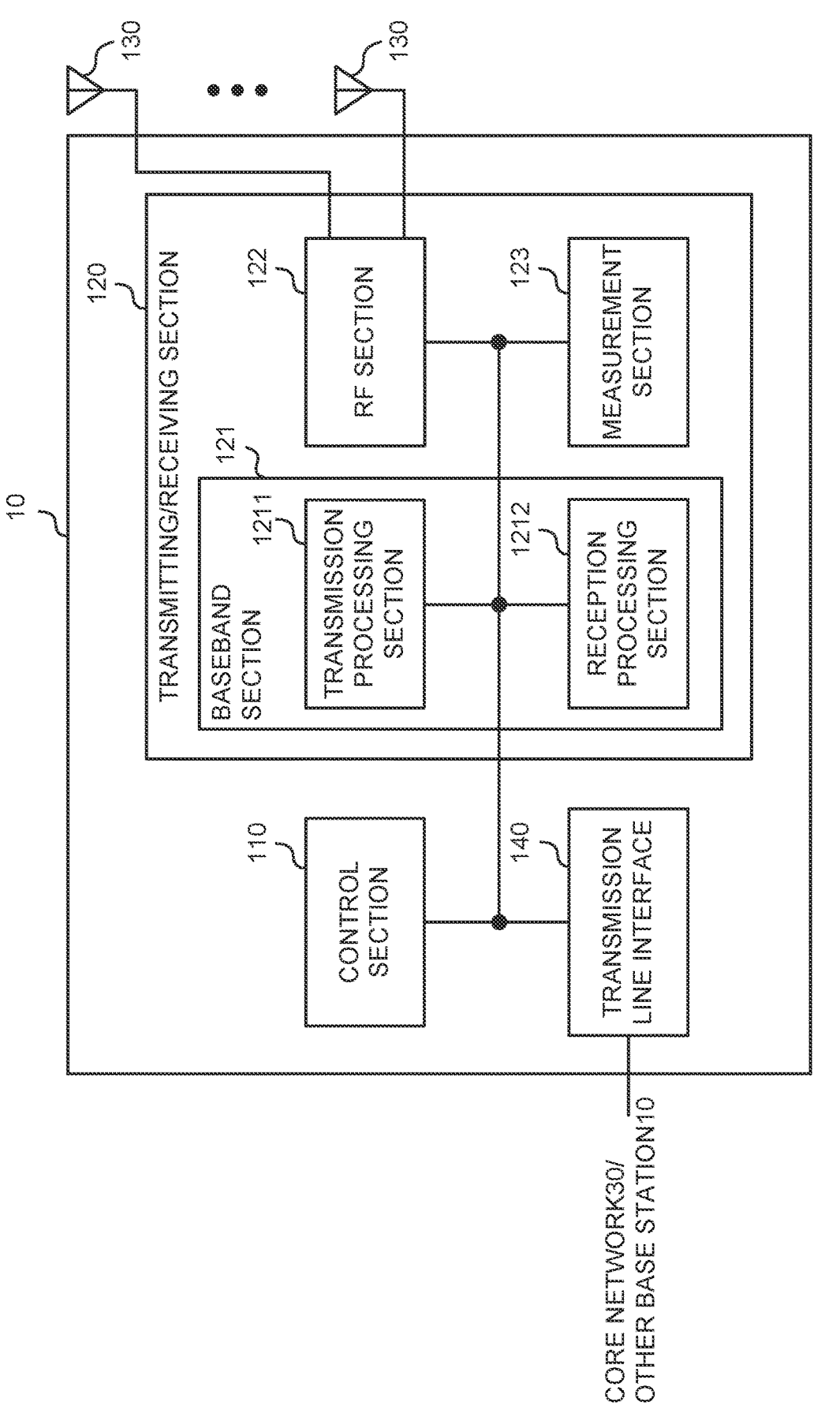
FIG. 29 is a diagram to show an example of a structure of a base station according to one embodiment.

FIG. 29 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RPM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit information (for example, an RRC IE/MAC CE) related to at least two of a control resource set (CORESET) pool index associated with a CORESET, two transmission configuration indication (TCI) states associated with the CORESET, and two search space sets linked to each other. The control section 110 may control, on the basis of the information, transmission of a physical downlink control channel (first embodiment).

The transmitting/receiving section 120 may transmit information (for example, an RRC IE/MAC CE) related to at least one of a control resource set (CORESET) pool index associated with a CORESET, two transmission configuration indication (TCI) states associated with the CORESET, and two search space sets linked to each other. When one or more reference signals for at least one of radio link monitoring and beam failure detection are not configured, the control section 110 may determine the one or more reference signals on the basis of the information (second embodiment).

The transmitting/receiving section 120 may transmit information (for example, an RRC IE/MAC CE) related to at least one of a control resource set (CORESET) pool index associated with a CORESET, two transmission configuration indication (TCI) states associated with the CORESET, and two search space sets linked to each other. When contention between a plurality of quasi co-location (QCL) type D reference signals used for respective receptions of a plurality of downlink signals occurs, the control section 110 may control, on the basis of the information, transmission of one or more downlink signals using the one or more QCL type D reference signals, out of the plurality of downlink signals (third embodiment).

(User Terminal)

Figure 30:
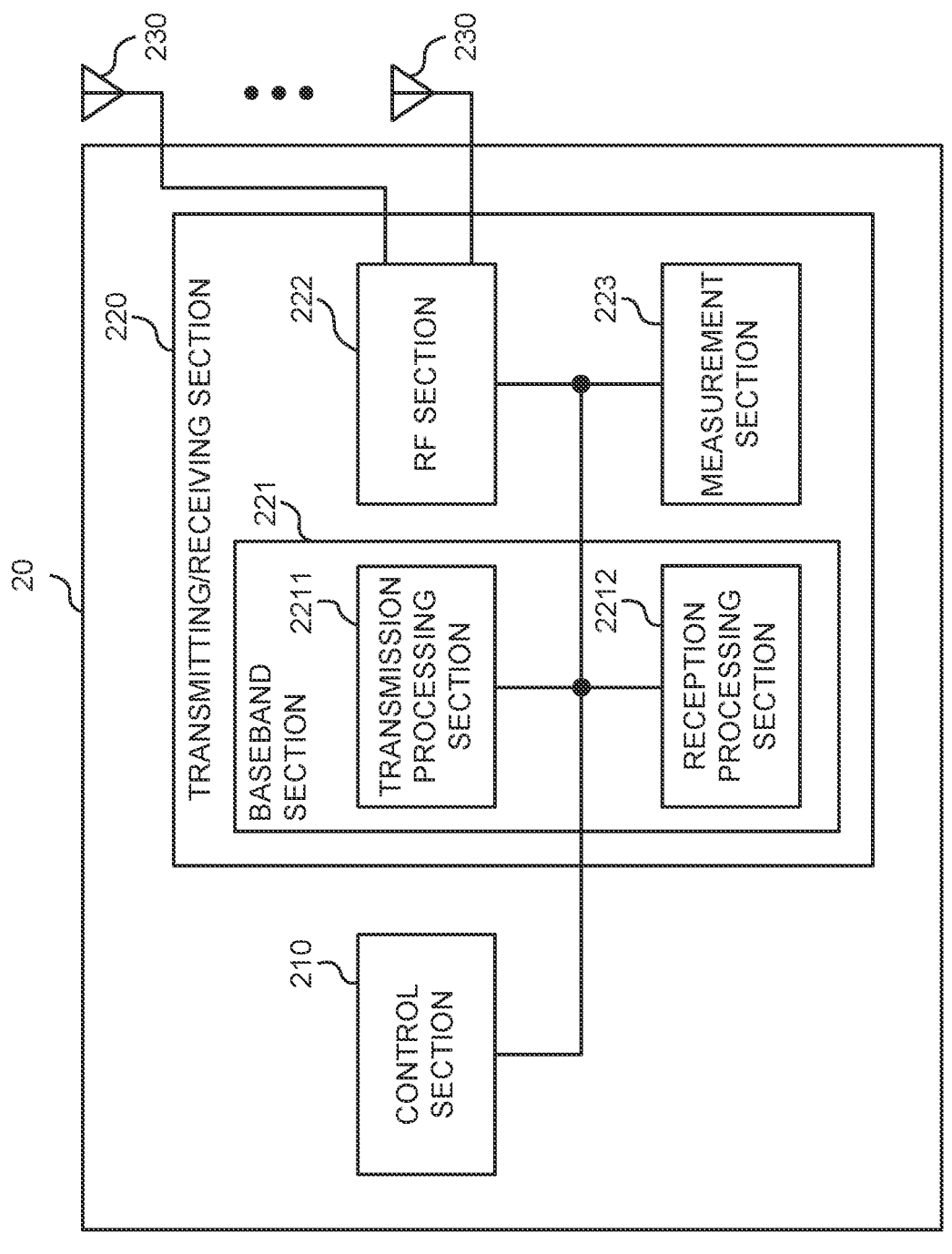
FIG. 30 is a diagram to show an example of a structure of a user terminal according to one embodiment.

FIG. 30 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive information (for example, an RRC IE/MAC CE) related to at least two of a control resource set (CORESET) pool index associated with a CORESET, two transmission configuration indication (TCI) states associated with the CORESET, and two search space sets linked to each other. The control section 210 may control, on the basis of the information, reception of a physical downlink control channel (first embodiment).

The two TCI states may be associated with at least one of two CORESET pool indices.

The two search space sets may be associated with at least one of two CORESET pool indices.

Two CORESETs associated with the two respective search space sets may be associated with one or two TCI states.

The transmitting/receiving section 220 may receive information (for example, an RRC IE/MAC CE) related to at least one of a control resource set (CORESET) pool index associated with a CORESET, two transmission configuration indication (TCI) states associated with the CORESET, and two search space sets linked to each other. When one or more reference signals for at least one of radio link monitoring and beam failure detection are not configured, the control section 210 may determine the one or more reference signals on the basis of the information (second embodiment).

The control section 210 may determine one or more CORESETs out of a plurality of CORESETs on the basis of at least two of a monitoring periodicity of a search space set associated with the CORESET, the number of TCI states associated with the CORESET, an index of the CORESET, and whether the CORESET has a linkage, and may determine the one or more reference signals on the basis of an active TCI state for the one or more CORESETs.

The control section 210 may determine the one or more reference signals for a cell.

The control section 210 may determine the one or more reference signals for each of a plurality of transmission/reception points.

The transmitting/receiving section 220 may receive information (for example, an RRC IE/MAC CE) related to at least one of a control resource set (CORESET) pool index associated with a CORESET, two transmission configuration indication (TCI) states associated with the CORESET, and two search space sets linked to each other. When contention between a plurality of quasi co-location (QCL) type D reference signals used for respective receptions of a plurality of downlink signals occurs, the control section 210 may control, on the basis of the information, reception of one or more downlink signals using the one or more QCL type D reference signals, out of the plurality of downlink signals (third embodiment).

The control section 210 may determine the one or more QCL type D reference signals out of the plurality of QCL type D reference signals on the basis of at least two of whether a search space set associated with the CORESET is a common search space set or a terminal-specific search space set, an index of the search space set, whether the search space set is linked to a second search space set, one index of the search space set and the second search space set linked to each other, whether the second search space set has been monitored, and the number of TCI states associated with the CORESET.

The control section 210 may determine the one QCL type D reference signal on the basis of the plurality of QCL type D reference signals.

The control section 210 may determine the two QCL type D reference signals on the basis of the plurality of QCL type D reference signals.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 31:
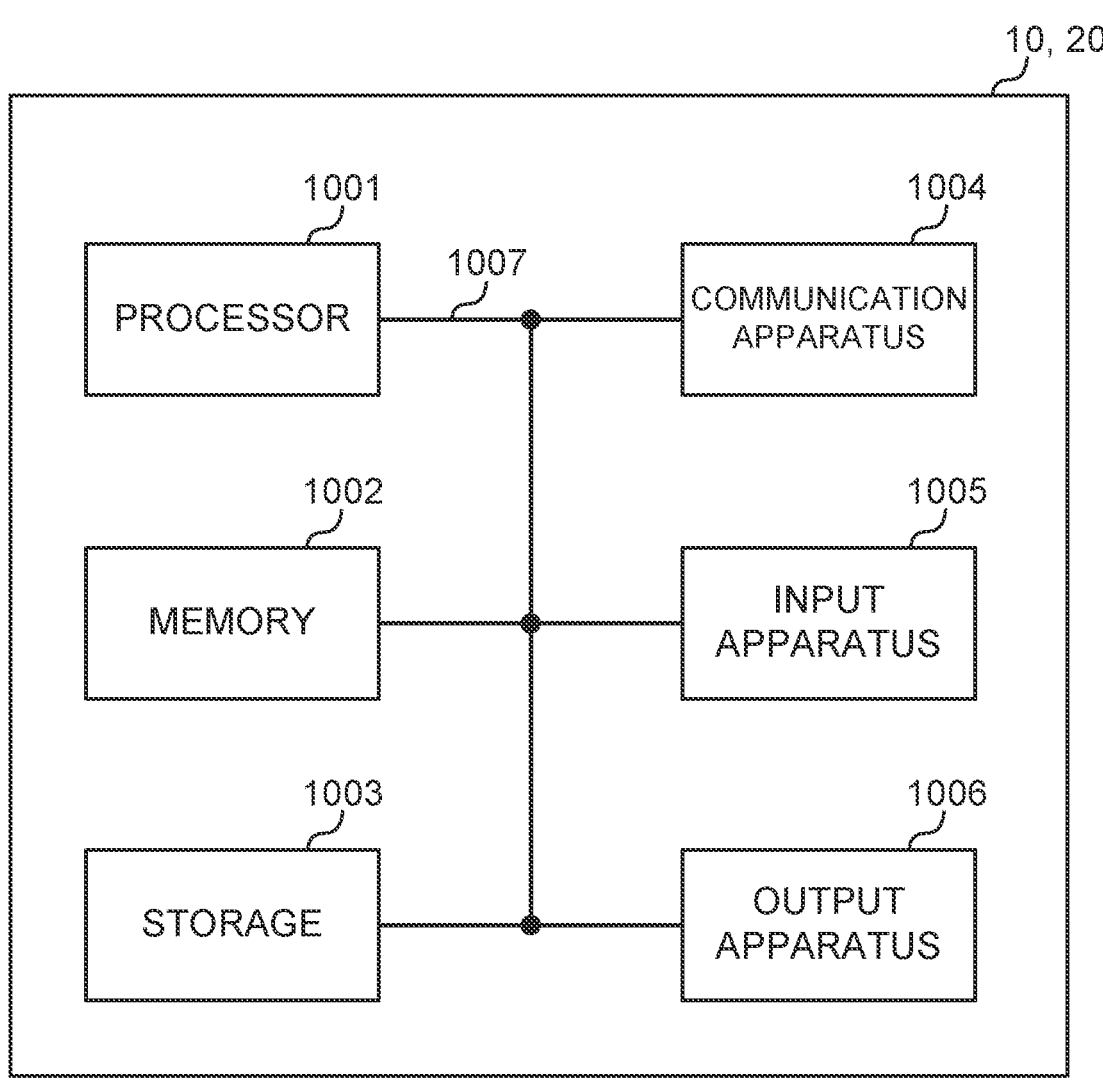
FIG. 31 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 31 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

Variations

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 MS.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a "small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "sidelink"). For example, an uplink channel, a downlink channel and so on may be interpreted as a sidelink channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:

a receiver that receives a medium access control-control element (MAC CE) indicating two transmission configuration indication (TCI) states for a control resource set (CORESET); and a processor that, when a single frequency network (SFN) scheme is configured and a beam failure detection reference signal (BFD-RS) set is not provided, determines to include a plurality of reference signals associated with the two TCI states in the BFD-RS set, and calculates a single block error rate (BLER) based on the two TCI states.

2. A radio communication method for a terminal, comprising:

receiving a medium access control-control element (MAC CE) indicating two transmission configuration indication (TCI) states for a control resource set (CORESET); and when a single frequency network (SFN) scheme is configured and a beam failure detection reference signal (BFD-RS) set is not provided, determining to include a plurality of reference signals associated with the two TCI states in the BFD-RS set, and calculating a single block error rate (BLER) based on the two TCI states.

3. A base station comprising:

a transmitter that transmits a medium access control-control element (MAC CE) indicating two transmission configuration indication (TCI) states for a control resource set (CORESET); and a processor that, when a single frequency network (SFN) scheme is configured for a terminal and a beam failure detection reference signal (BFD-RS) set is not provided for the terminal, determines that a plurality of reference signals associated with the two TCI states are included in the BED-RS set, and determines that a single block error rate (BLER) is calculated based on the two TCI states by the terminal.

4. A system comprising a terminal and a base station, wherein the terminal comprises:

a receiver that receives a medium access control-control element (MAC CE) indicating two transmission configuration indication (TCI) states for a control resource set (CORESET); and a processor that, when a single frequency network (SFN) scheme is configured and a beam failure detection reference signal (BFD-RS) set is not provided, determines to include a plurality of reference signals associated with the two TCI states in the BFD-RS set, and calculates a single block error rate (BLER) based on the two TCI states, and the base station comprises:

a transmitter that transmits the MAC CE.

* * * * *